(12) United States Patent
Kajiyama et al.

(10) Patent No.: US 6,181,668 B1
(45) Date of Patent: Jan. 30, 2001

(54) OPTICAL PICKUP DEVICE AND WAVELENGTH SELECTIVE DIFFRACTION GRATING

(75) Inventors: Seiji Kajiyama; Yasuyuki Kanou, both of Gifu; Masato Yamada, Aichi; Yoichi Tsuchiya; Shuichi Ichiura, both of Gifu, all of (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/125,987

(22) PCT Filed: Mar. 27, 1997

(86) PCT No.: PCT/JP97/01036

§ 371 Date: Aug. 28, 1998

§ 102(e) Date: Aug. 28, 1998

(87) PCT Pub. No.: WO98/13826

PCT Pub. Date: Apr. 2, 1998

(30) Foreign Application Priority Data

Sep. 27, 1996 (JP) .................................................. 8-256255
Nov. 20, 1996 (JP) .................................................. 8-309373
Dec. 27, 1996 (JP) .................................................. 8-350026

(51) Int. Cl.$^7$ ....................................................... G11B 7/12
(52) U.S. Cl. .......................... 369/112; 369/109; 369/103; 369/94; 369/44.12
(58) Field of Search ................................ 369/58, 47, 48, 369/54, 59, 103, 109, 110, 112, 116, 93, 94, 44.23, 44.12, 44.14, 46.37

(56) References Cited

U.S. PATENT DOCUMENTS 4,114,978   9/1978   Bostick et al. ........................ 350/1.7
5,793,734 * 8/1998   Tsuchiya et al. ............. 369/44.23 X
5,912,868   6/1999   Hayashi et al. ......................... 369/58
5,930,219 * 7/1999   Kim ...................................... 369/109

FOREIGN PATENT DOCUMENTS 0 747 893 A2   12/1996   (EP) .
4-129040        4/1992   (JP) .
8-55363         2/1996   (JP) .

\* cited by examiner

Primary Examiner—Muhammad Edun
(74) Attorney, Agent, or Firm—Armstrong, Westerman, Hattori, McLeland & Naughton

(57) ABSTRACT

The optical pickup device includes a two wavelength semiconductor laser (23) selectively generating a laser beam having the wavelength of 635 nm and laser beam having the wavelength of 780 nm, a collimator lens (24), a hologram (25) formed on a surface of collimator lens (24), a polarizing glass (22) having an annular polarizing region (40) and an objective lens (21). Hologram (25) does not diffract the laser beam having the wavelength of 635 nm, and diffracts outward the laser beam having the wavelength of 780 nm. Therefore, virtual light source of the laser beam having the wavelength of 780 nm comes closer to the collimator lens (24) than the light source of the laser beam having the wavelength of 635 nm. Therefore, objective lens (21) focuses the laser beam having the wavelength of 635 nm on a recording surface of a transparent substrate (31) of a DVD, and focuses the laser beam having the wavelength of 780 nm on a recording surface of a transparent substrate (32) of a CD-R. Accordingly, the optical pickup device is capable of reproducing both DVD and CD-R having transparent substrates of different thicknesses.

34 Claims, 56 Drawing Sheets

FIG. 36(a)  FIG. 36(b)
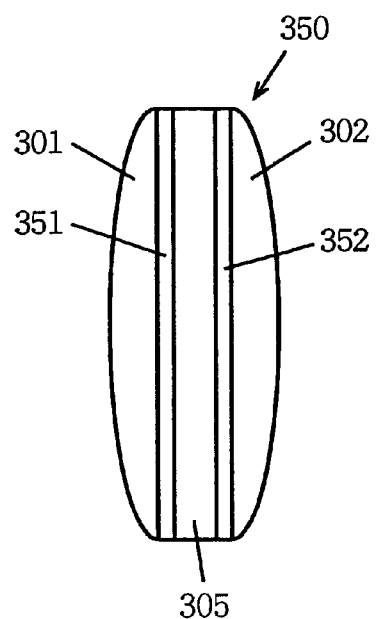 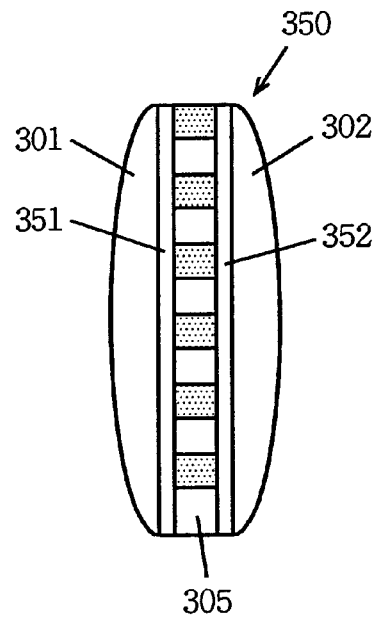
FIG. 37
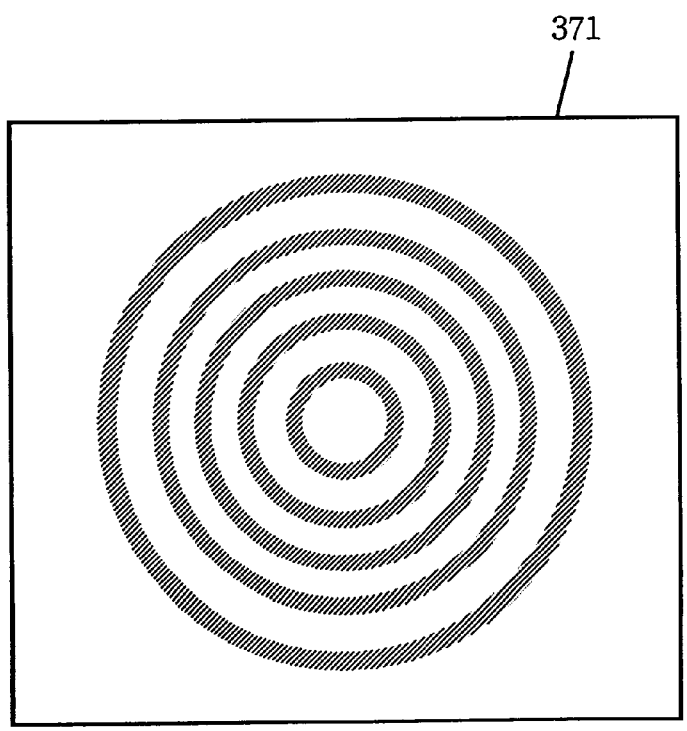

PARALLEL BEAM

FIG. 51
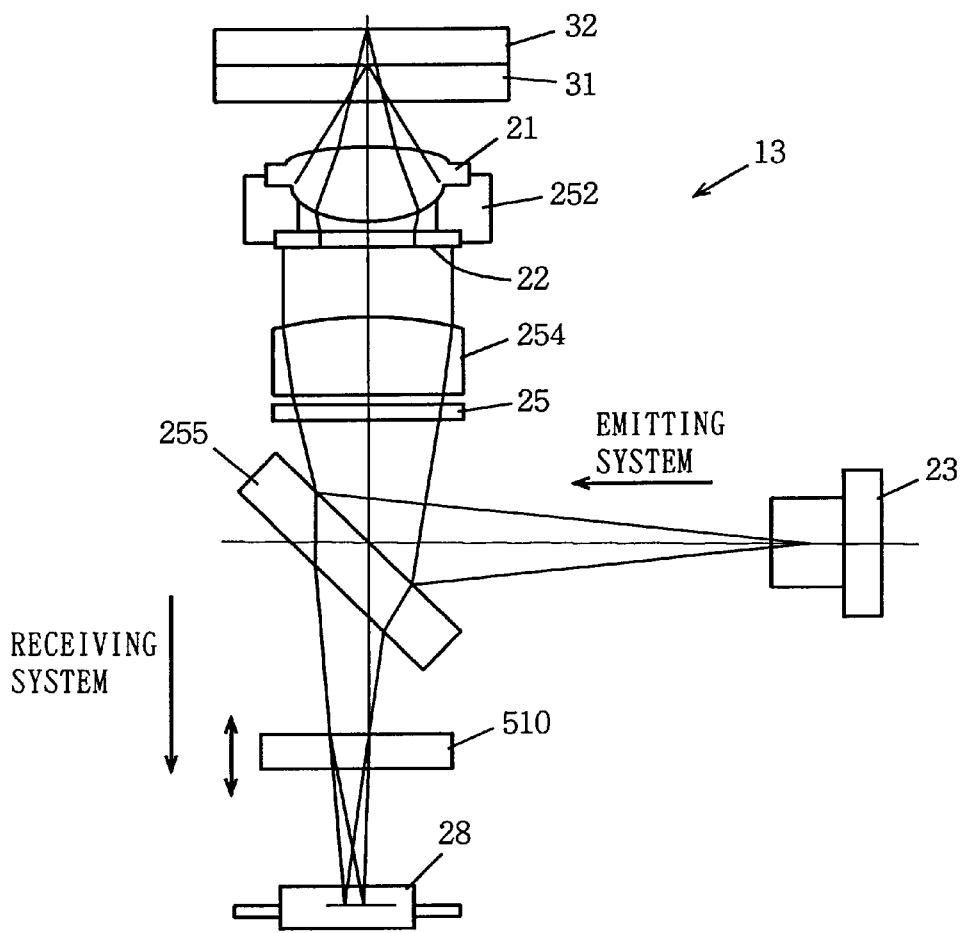
FIG. 52(a)       FIG. 52(b)
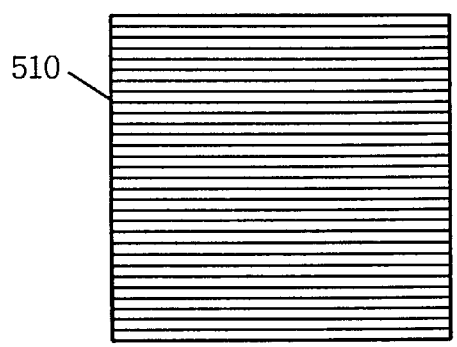
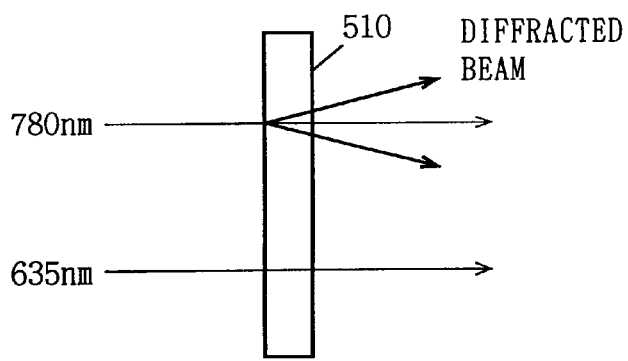

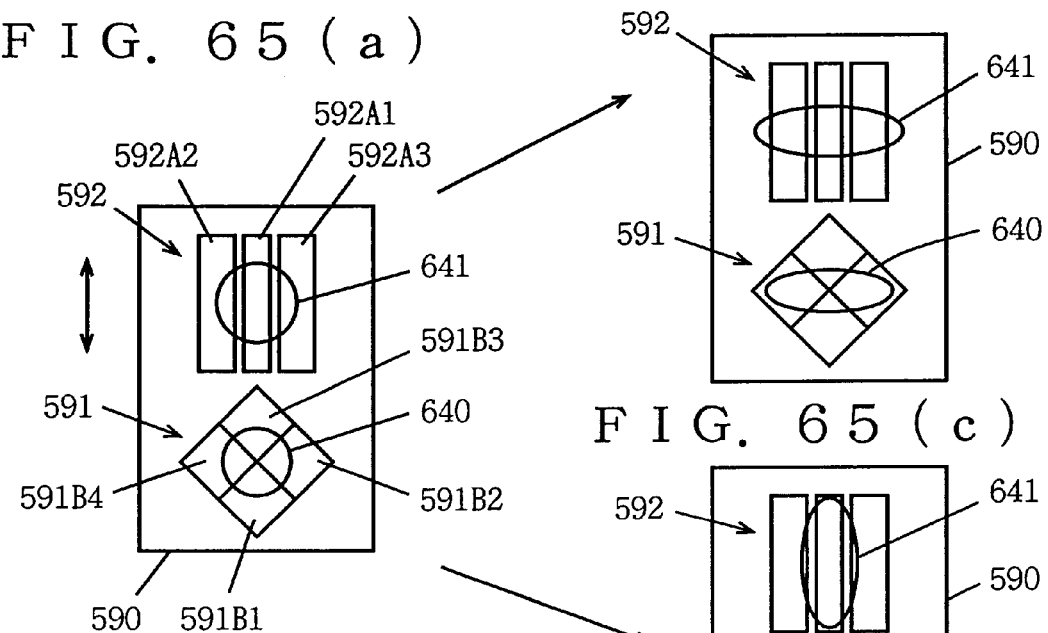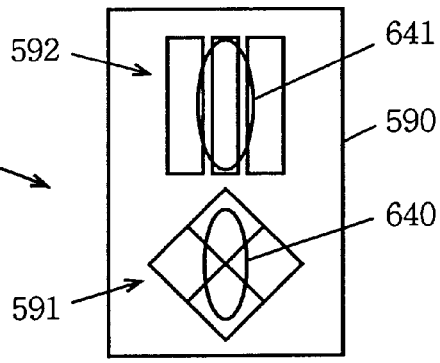
FIG. 65(a)
FIG. 65(b)
FIG. 65(c)
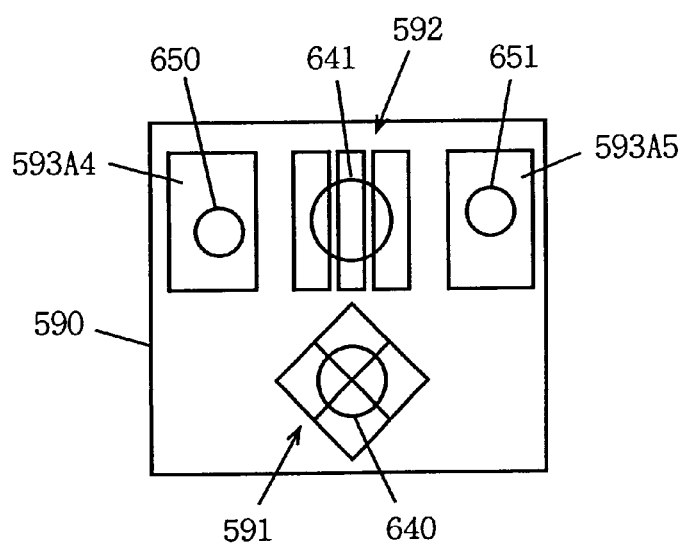
FIG. 66

OPTICAL PICKUP DEVICE AND WAVELENGTH SELECTIVE DIFFRACTION GRATING

TECHNICAL FIELD

The present invention relates to an optical pickup device, and more specifically, to an optical pickup device for recording and/or reproducing digital video disc (DVD) and compact disc (CD).

BACKGROUND ART

An optical device for reading information recorded on an optical disc having a transparent substrate of about of 1.2 mm in thickness, such as a CD, by using a semiconductor laser has been provided. In such an optical pickup device, focus servo and tracking servo control for an objective lens of the pickup device is performed, a pit string on the recording surface is irradiated with laser beam, whereby audio, video and data signals are reproduced.

Referring to FIG. 91, in a recordable compact disc (CD-R) 150 which is one type of CDs, cyanine dye 152 is provided on a recording surface side of transparent substrate 151, and gold 153 is further provided. CD-R has the same track pitch, recording density and pit length as those of a general CD for music, and the CD-R is different from the CD for music only in that it allows one recording. Recording is done by irradiating cyanine dye 152 with laser beam through transparent substrate 151. When cyanine dye 152 is irradiated with laser beam, optical characteristic of the irradiated portion becomes uneven. Accordingly, at a portion not irradiated with laser beam at the time of recording, most laser beam is reflected by gold 153 at the time of reproduction, while at portions irradiated with laser beam at the time of recording, laser beam is hardly reflected at the time of reproduction.

Recently, density has been increased in order to record a motion picture for a long period of time on such an optical disc. For example, a DVD allowing recording of information of about 5 G byte on one side having the same diameter of 12 cm as the CD has been proposed. Thickness of the transparent substrate of the DVD is about 0.6 mm. One DVD formed by adhering two transparent substrates back to back allows recording of information of about 10 G byte.

However, the aforementioned pickup objective lens is designed taking into consideration the thickness of the transparent substrate of the optical disc of interest and wavelength of semiconductor laser used. Therefore, when an optical disc having a thickness different from the design is to be reproduced, laser beam is not focused on the recording surface of the optical disc, and hence reproduction is not possible. For example, an objective lens designed for a CD having transparent substrate of 1.2 mm in thickness is not capable of focusing laser beam on the recording surface of a DVD having a transparent substrate 0.6 mm in thickness.

In CD-R 150 employing cyanine dye 152 mentioned above, maximum reflectance is attained when the laser beam has the wavelength of 800 nm, while reflectance is not higher than 10% when the laser beam has the wavelength of 635 nm, as shown in FIG. 92. Accordingly, reproduction of a CD-R is not possible by the laser beam having the wavelength of 635 nm which is used for reproduction of a DVD. In order to reproduce the CD-R with the laser beam having the wavelength of 635 nm, it may be possible to use dye having higher reflectance to the laser beam having the wavelength of 635 nm in place of cyanine dye 152. However, it is not practical to change CD-R standard to be in line with the DVD.

The present invention was made to solve the above described problem, and its object is to provide an optical pickup device capable of recording and/or reproducing two different types of optical discs having transparent substrate of different thicknesses.

DISCLOSURE OF THE INVENTION

According to an aspect of the present invention, the optical pickup device is for recording and/or reproduction of a first optical disc having a transparent substrate of a first thickness and a second optical disc having a transparent substrate of a second thickness different from the first thickness, and the optical pickup device includes an objective lens opposing to the first or second optical disc, a numerical aperture changing element for changing numerical aperture of the objective lens in accordance with the thickness of the transparent substrate of the first or the second optical disc, a laser beam generating element for selectively generating a first laser beam having a first wavelength and a second laser beam having a second wavelength different from the first wavelength, and an optical unit for guiding the first laser beam to a first direction, guiding the second laser beam to a second direction different from the first direction, and guiding the first or the second laser beam to the objective lens.

Preferably, the optical unit includes a hologram which does not diffract the first laser beam but diffracts the second laser beam.

More preferably, the optical unit further includes a collimator lens receiving the first or the second laser beam from the laser beam generating element and guiding the received laser beam to the objective lens.

More preferably, the hologram is provided on a surface of the collimator lens.

Preferably, the optical pickup device further includes a diffraction grating plate having a main surface on which three beam type diffraction grating for dividing the first or the second laser beam into three is formed. The hologram is provided on a surface opposite to a main surface of diffraction grating plate.

Preferably, the laser beam generating element includes a semiconductor laser and an activating circuit. The semiconductor laser includes a substrate, a first laser element provided on the substrate for generating the first laser beam, and a second laser element provided adjacent to the first laser element on the substrate for generating the second laser beam. The activating circuit selectively activates the first and the second laser elements. The optical pickup device further includes a photodetector formed spaced apart from the first and second laser elements on the substrate of the semiconductor laser, for detecting beam diffracted by the hologram, of the beams reflected from the first or the second optical disc.

Preferably, the optical unit includes a bifocal collimator lens having two points of focus.

More preferably, the bifocal collimator lens includes a first lens, a second lens provided opposing to the first lens, and a member of which diffractive index changes in accordance with the first or the second wavelength sandwiched between the first and second lenses.

More preferably, the member is cyanine dye.

More preferably, the member includes a first transparent electrode, a second transparent electrode provided opposing to the first transparent electrode, and liquid crystal sandwiched between the first and second transparent electrodes.

The optical pickup device further includes an application circuit for applying a prescribed voltage between the first and second transparent electrodes in accordance with the first or the second wavelength.

More preferably, the first and second transparent electrodes are formed in stripes.

More preferably, the optical pickup device further includes a photodetector for detecting a beam reflected from the first or the second optical disc, and a beam splitter receiving the first or the second laser beam from the laser beam generating element and the reflected beam, for guiding part of the received laser beam to the objective lens and part of the received reflective beam to the photodetector. The application circuit includes an optical filter receiving the remaining part of the laser beam received by the beam splitter, for selectively transmitting either one of the first and second laser beams, a converting circuit for converting optical energy of the laser beam transmitted through the optical filter to electric energy, and a driving circuit for driving liquid crystal based on the electric energy from the converting circuit.

Preferably, the laser beam generating element includes a semiconductor laser and an activating circuit. The semiconductor laser includes a substrate, a first laser element provided on the substrate for generating the first laser beam and a second laser element provided on the substrate for generating the second laser beam. The activating circuit selectively activates the first and second laser elements.

Preferably, the first optical disc is a digital video disc, and the second disc is a compact disc.

Preferably, the first wavelength is 620 to 670 nm, and the second wavelength is 765 to 795 nm.

More preferably, the first wavelength is 625 to 645 nm.

Preferably, the numerical aperture changing element is a polarizing glass having an annular polarizing region.

Preferably, the numerical aperture changing element is a diffraction grating with polarization selectivity having an annular polarizing region of which center is the optical axis of the objective lens.

Preferably, the numerical aperture changing element is a polarizing filter having an annular polarizing region of which center is the optical axis of the objective lens.

Preferably, the numerical aperture changing element is a diffraction grating with wavelength selectivity having an annular wavelength selecting region of which center is the optical axis of the objective lens.

Preferably, the diffraction grating with wavelength selectivity includes a diffraction grating plate having a main surface on which the diffraction grating is formed, and a film formed on a main surface of the diffraction grating plate and having diffractive index changing in accordance with the first or the second wavelength.

Preferably, the film is a cyanine dye.

More preferably, magnification of the objective lens is 0.025 to 0.095.

More preferably, magnification of the objective lens is 0.025 to 0.065.

Preferably, the laser beam generating element includes a semiconductor laser including a first laser element for generating the first laser beam and a second laser element provided apart from the first laser element for generating the second laser beam, and an activating circuit for selectively activating the first and second laser elements. The optical unit includes a collimator lens receiving the first or the second laser beam from the laser beam generating element and guiding the received laser beam to the objective lens. The optical pickup device further includes a photodetector for detecting reflected beam from the first or the second optical disc, and a hologram provided between the collimator lens and the photodetector for diffracting the first laser beam but not diffracting the second laser beam.

More preferably, the hologram has polarization selectivity.

More preferably, the hologram has wavelength selectivity.

More preferably, the photodetector includes a first light receiving portion receiving beam reflected from the first optical disc, and a second light receiving portion provided apart in a first direction from the first light receiving portion for receiving beam reflected from the second optical disc. The second light receiving portion includes a first sensor extending in the first direction, a second sensor provided apart from the first sensor in a second direction perpendicular to the first direction, and a third sensor provided apart from the first sensor in a third direction opposite to the second direction.

Preferably, the optical unit and the numerical aperture changing element constitute a single optical element.

More preferably, the optical unit is a hologram formed on a circle with the optical axis of the objective lens being the center, which does not diffract the first laser beam but diffracts the second laser beam. The numerical aperture changing element is a diffraction grating formed on the periphery of the hologram, for not diffracting the first laser beam but diffracting the second laser beam.

More preferably, the diffraction grating has uneven grating constant.

More preferably, the optical pickup device further includes a seivo mechanism for moving the objective lens. The optical element is fixed on the objective lens.

More preferably, the optical pickup device further includes a diffraction grating plate having a main surface on which a three beam type diffraction grating for not diffracting the first laser beam but diffracting and dividing into three the second laser beam is formed.

Therefore, in accordance with the optical pickup device of the present invention, an optical unit for guiding the first laser beam to the first direction and guiding the second laser beam to the second direction different from the first direction is provided, so that the objective lens focuses the first laser beam on the recording surface of the first optical disc having the transparent substrate of the first thickness, and focuses the second laser beam on the recording surface of the second optical disc having the transparent substrate of the second thickness. Recording and/or reproduction of the first and second optical discs is possible by the optical pickup device.

According to another aspect of the present invention, the diffraction grating with wavelength selectivity includes a diffraction grating plate having a main surface on which the diffraction grating is formed, and a film formed on a main surface of the diffraction grating plate and having refractive index changing in accordance with the wavelength of the incident beam.

Preferably, the film is a cyanine dye.

Therefore, in accordance with the diffraction grating with wavelength selectivity of the present invention, a film of which refractive index changes in accordance with the wavelength of the incident beam, a preferably, the cyanine dye, is formed on the main surface of the diffraction grating plate, and therefore the incident beam is selectively diffracted in accordance with its wavelength.

BRIEF DESCRIPTION OF THE DRAWINGS

FIG. 36($a$) is an illustration showing a bifocal collimator lens when voltage is not applied to the transparent electrodes having the patterns shown in FIG. 35, and FIG. 36($b$) is an illustration showing the bifocal collimator lens when a prescribed voltage is applied between the transparent electrodes.

FIG. 37 is a plan view showing another pattern of transparent electrodes in the bifocal collimator lens.

FIG. 51 is a block diagram showing a structure of the optical pickup device in accordance with Embodiment 24 of the present invention.

FIG. 52(a) is a plan view of a hologram plate with wavelength selectivity shown in FIG. 51, and FIG. 52(b) is a side view showing the hologram plate with wavelength selectivity together with its function.

FIGS. 65(a) to 65(c) are illustrations related to focusing servo operation of the optical pickup device shown in FIG. 60.

FIG. 66 is an illustration related to the tracking servo operation of the optical pickup device shown in FIG. 60.

BEST MODE FOR CARRYING OUT THE INVENTION

Figure 1:
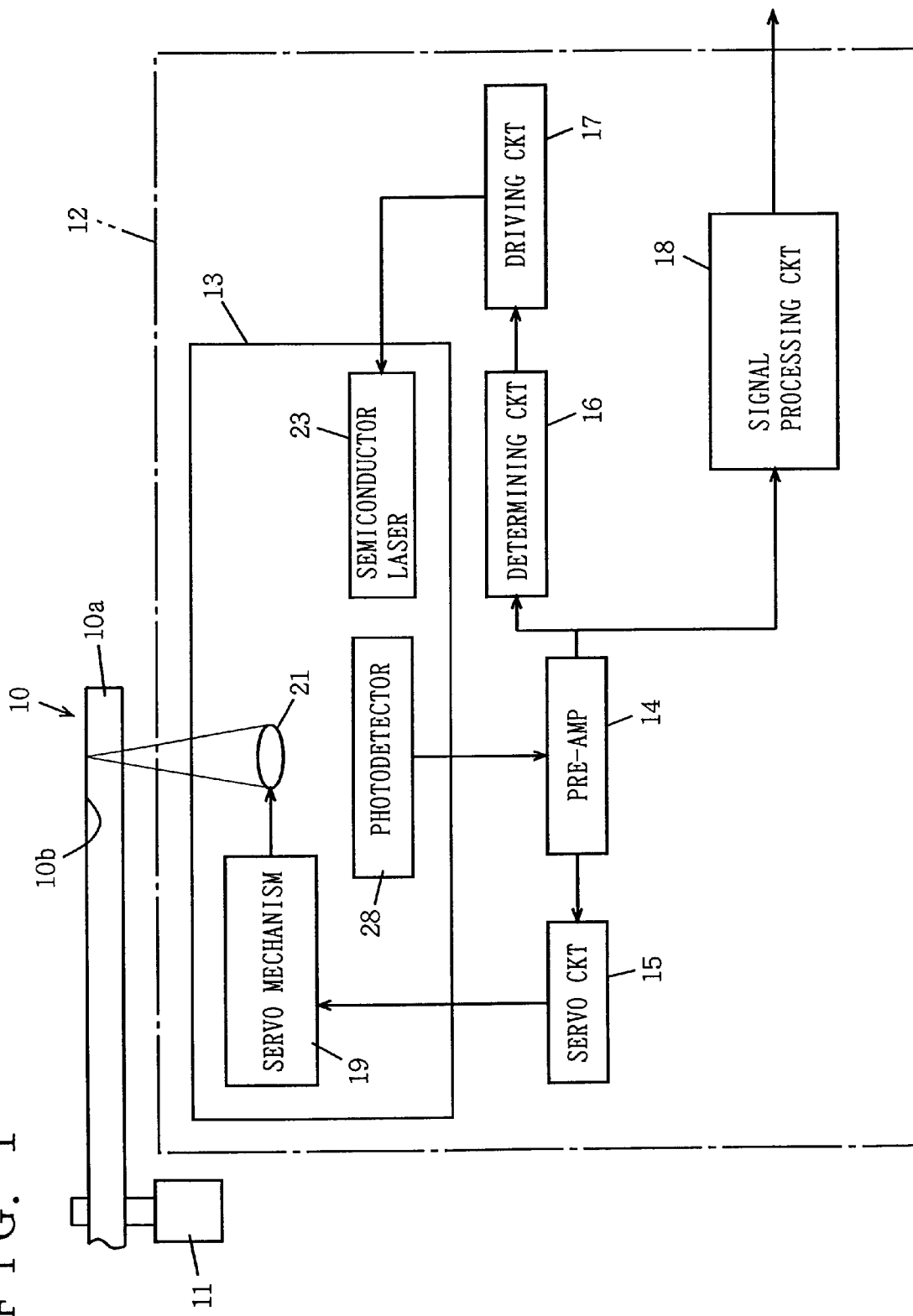
FIG. 1 is a block diagram showing the structure of the optical disc recording/reproducing apparatus including the optical pickup device in accordance with Embodiment 1 of the present invention.

In the following, embodiments of the present invention will be described in detail with reference to the drawings. In the drawings, same or corresponding portions are denoted by the same reference characters and description thereof is not repeated.

[Embodiment 1]

Referring to FIG. 1, an optical disc recording/reproducing apparatus 12 in accordance with Embodiment 1 of the present invention is for recording and reproduction of optical disc 10 mounted on a spindle motor 11, and it includes an optical pickup device 13, a preamplifier 14 for amplifying a detection signal from a photodetector 28 in optical pickup device 13, a servo circuit 15 responsive to the amplified detection signal for generating a control signal for tracking control and focusing control, a determining circuit 16 responsive to a detection signal from preamplifier 14 for determining thickness of a transparent substrate 10a of optical disc 10, a driving circuit 17 for generating a driving signal in response to a determination signal from determining circuit 16 for supplying the driving signal to a two wavelength semiconductor laser 23 in optical pickup device 13, and a signal processing circuit 18 responsive to the detection signal from preamplifier 14 for performing processing such as error correction, and for outputting a reproduced signal.

Figure 2:
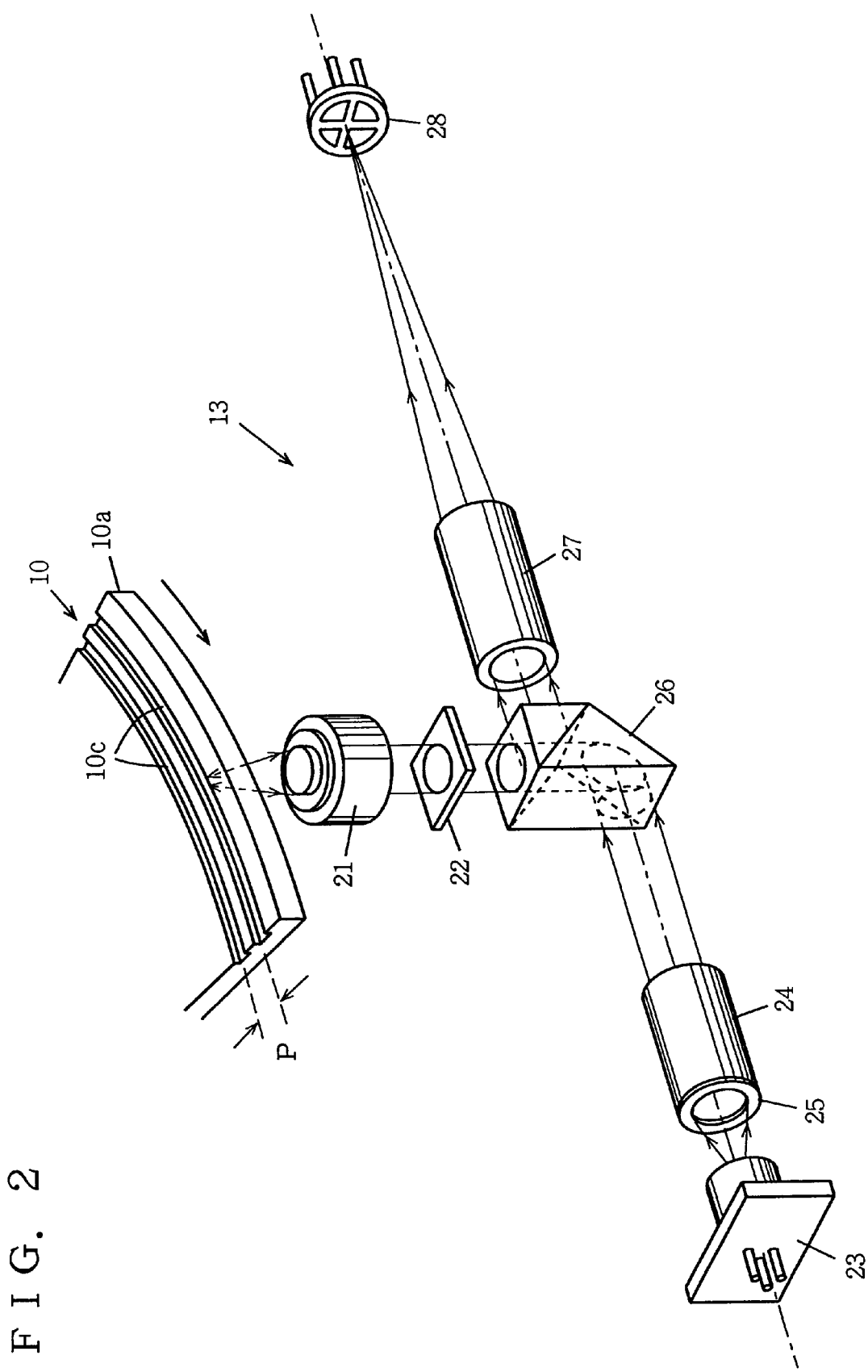
FIG. 2 is a perspective view showing the structure of the optical pickup device shown in FIG. 1.
Figure 3:
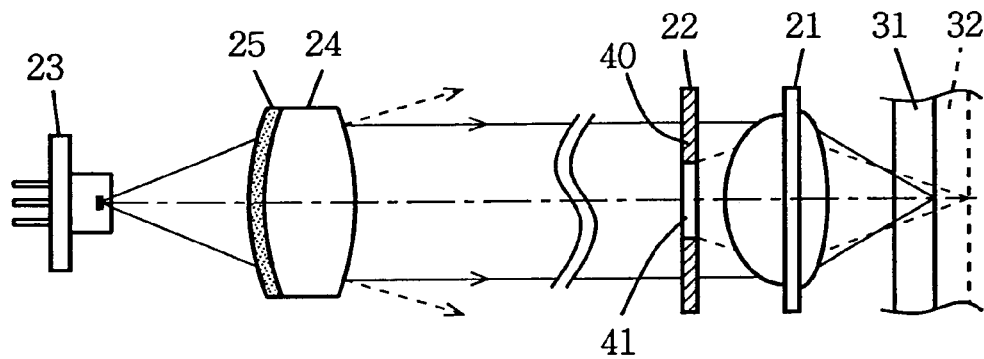
FIG. 3 shows arrangement of a main optical system in the optical pickup device of FIGS. 1 and 2.

Referring to FIGS. 1 to 3, optical pickup device 13 includes an objective lens 21 provided opposing to optical disc 10, a polarizing glass 22 for changing effective numerical aperture of objective lens 21 in accordance with thickness of transparent substrate 10a of optical disc 10, two wavelength semiconductor laser 23 for selectivity generating laser beam having the wavelength of 635 (with the tolerance of ±15, preferably ±10)nm and the wavelength of 780 (with the tolerance ±15)nm, a collimator lens 24 receiving laser beam from semiconductor laser 23 and guiding the received laser beam to objective lens 21, and a hologram 25 adhered on a surface of collimator lens 24 which does not diffract the laser beam having the wavelength of 635 nm but diffracts the laser beam having the wavelength of 780 nm.

Optical pickup device 13 further includes a beam splitter 26 for reflecting and guiding the laser beam from collimator lens 24 to objective lens 21 and for reflecting laser beam reflected at recording surface 10b of optical disc 10, a collective lens 27 receiving the laser beam reflected by beam splitter 26, a photodetector 28 receiving the laser beam collected by collective lens 27, and a servo mechanism 19 responsive to a control signal from servo circuit 15 for moving the objective lens 21.

Therefore, objective lens 21 moves in the axial direction in response to a focus error signal from photodetector 28. Objective lens 21 moves, in response to a tracking error signal from photodetector 28, in tracking direction so that the laser beam traces with fidelity tracks of optical disc 10.

Spec. values and conditions for reproduction of the DVD and CD-R are shown in Table 1. The DVD has a transparent substrate 31 having the thickness of 0.6 (tolerance ±0.05) mm, and is reproduced by a laser beam having the wavelength of 635 nm. The CD-R has a transparent substrate 32 having the thickness of 1.2 (tolerance ±0.1)mm and reproduced by a laser beam having the wavelength of 780 nm.

TABLE 1

|  | Type | CD-R | DVD |
| --- | --- | --- | --- |
| Spec. Value | Substrate thickness of reading surface side | 1.2 mm (1.1~1.3 mm) | 0.6 mm (0.55~0.65 mm) |
|  | Shortest pit length | 0.83 μm (0.80~0.9 μm) | 0.40 μm (0.30~0.50 μm) |
|  | Pit Depth | 156 nm (130~195 nm) | 105 nm (95~115 nm) |
|  | Track Pitch | 1.6 μm (1.5~1.7 μm) | 0.74 μm (0.73~0.75 μm) |
|  | Reflectance | at least 60% | at least 40%   15~40% |
| Condition for Reproduction | Spot Diameter | 1.5 μm (1.4~1.6 μm) | 0.90 μm (0.85~0.95 μm) |
|  | Numerical Aperture | 0.45 (0.40~0.50) | 0.60 (0.55~0.65) |
|  | Wavelength | 780 nm (765~795 nm) | 635 nm (620~650 nm) |

Optical disc 10 such as a DVD or a CD-R has concentrical or spiral tracks 10c. Pitch P of tracks 10c determines recording density of optical disc 10.

In optical pickup device 13, objective lens 21 is designed so as to focus laser beam having the wavelength of 635 nm on the recording surface of the DVD. Therefore, at the time of DVD reproduction, objective lens 21 has numerical aperture of 0.60 (tolerance ±0.05).

Figure 4:
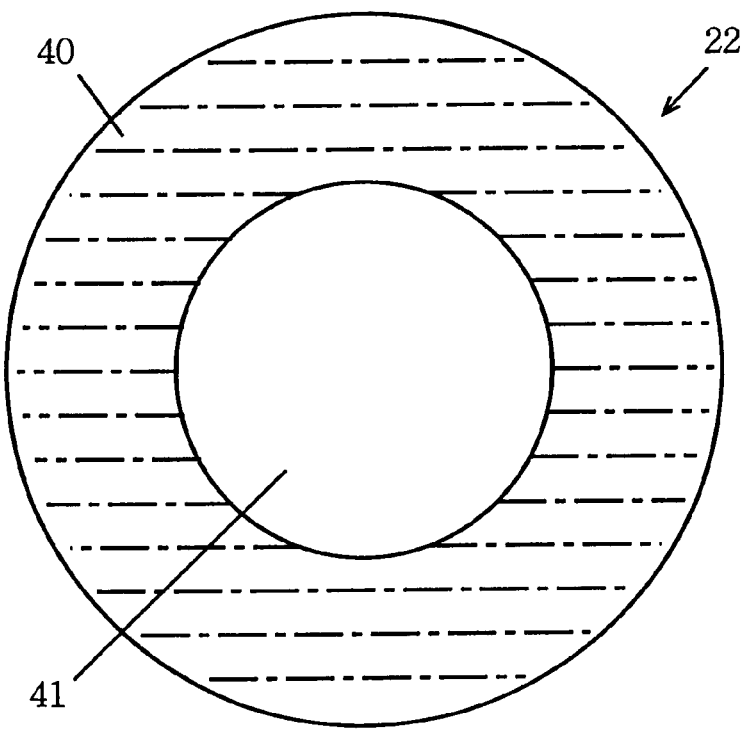
FIG. 4 is a front view of the polarizing glass shown in FIGS. 2 and 3.

Polarizing glass 22 has an annular polarizing region 40 of which center is the optical axis of objective lens 21, as shown in FIG. 4. The annular polarizing region 40 transmits only the laser beam that has a plane of polarization in lateral direction in the figure. A central region 41 of the polarizing glass 22 transmits laser beam having plane of polarization in any direction. Here, the laser beam having the wavelength of 635 nm is incident on polarizing glass 22 with its plane of polarization being lateral in the figure, and the laser beam having the wavelength of 780 nm is incident on the polarizing glass 22 with its plane of polarization being longitudinal in the figure. Therefore, the laser beam having the wavelength of 635 nm is fully transmitted through the polarizing glass 22 and enters objective lens 21, while the laser beam having the wavelength of 780 nm has its outer peripheral portion intercepted by polarizing glass 22 and only the central part enters the objective lens 21. When effective diameter of the laser beam having the wavelength of 635 nm is 4.32 mm, the diameter of central region 41 of polarizing glass 22 is set to 2.88 (tolerance ±0.1)mm. The diameter of central region 41 is such that when the effective diameter of the laser beam having the wavelength of 780 nm is 4 mm, the effective numerical aperture of objective lens 21 attains to 0.40 (tolerance ±0.05).

Figure 5:
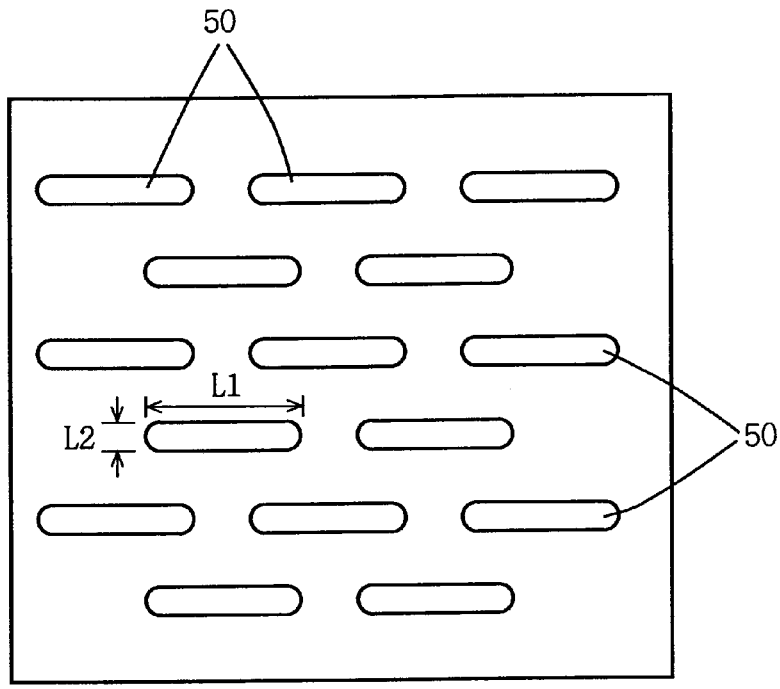
FIG. 5 is an enlarged view of a polarizing region of the polarizing glass shown in FIG. 4.

In polarizing region 40 of polarizing glass 22, silver compound is arranged in a prescribed direction in the glass and the surface of the compound is reduced so that silver 50 is precipitated, as shown in FIG. 5. The reduced silver film has polarization characteristic. Here, silver 50 is stretched with the aspect ratio (L1:L2) of 2:1 to 5:1. Absorption wavelength of polarizing region 40 can be controlled by varying the aspect ratio.

Figure 6:
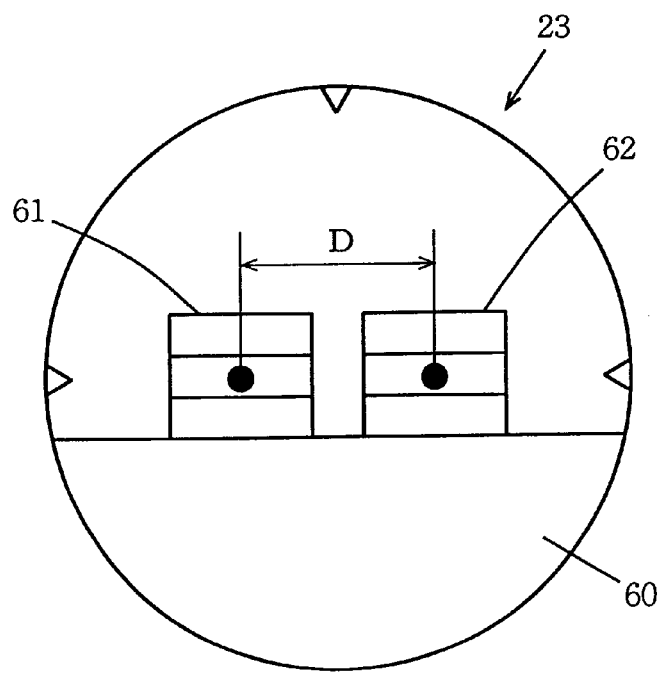
FIG. 6 is a top view of the two wavelength semiconductor laser of FIGS. 2 and 3.

Two wavelength semiconductor laser 23 includes a substrate 60, a laser element 61 of TM mode mounted on substrate 60, and a laser element 62 of TE mode mounted on substrate 60, as shown in FIG. 6. Laser element 61 generates the laser beam having the wavelength of 635 nm and a plane of polarization in longitudinal direction in the figure. Laser element 62 generates the laser beam having the wavelength of 780 nm and a plane of polarization in lateral direction in the figure. Laser elements 61 and 62 are mounted apart from each other so that space between respective emitting openings is 100 to 400 $\mu$m.

Figure 7:
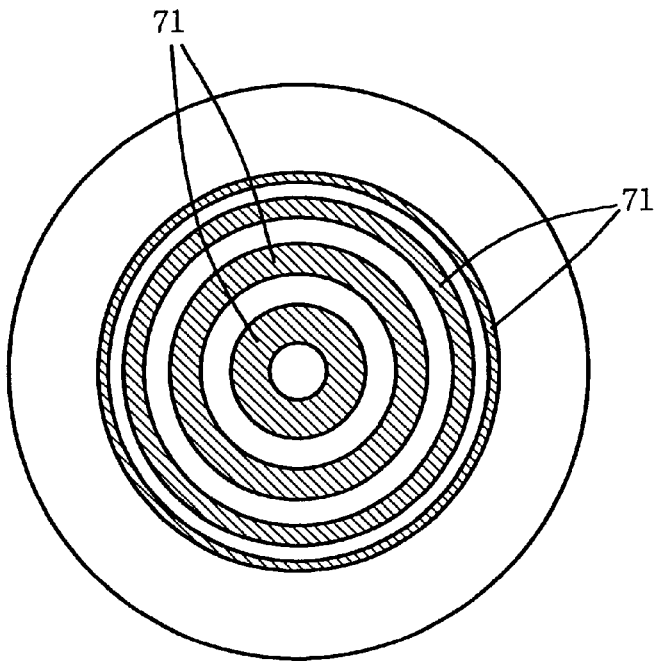
FIG. 7 is a plan view showing an example of the hologram of FIGS. 2 and 3.
Figure 8:
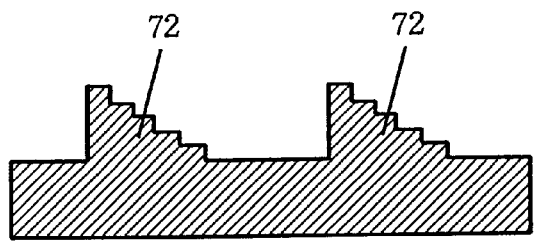
FIG. 8 is a partial cross section of an annular region of the hologram shown in FIG. 7.

A known hologram such as shown in FIGS. 7 and 8 is used as hologram 25. The hologram has a plurality of concentrically formed annular regions 71 as shown in FIG. 7. The width of each annular region 71 and space between annular regions 71 are gradually reduced from the inner to the outer periphery. Each annular region 71 is provided with a plurality of protruded portions 72 having stepped shape as shown in FIG. 8. Each protruded portion 72 has a plurality of steps. Such shape is formed by etching glass. Outer annular region 71 may have lower step at the protruded portion 72. Though cross sectional shape of each protruded portion 72 is stepwise, it may be triangular with the stepped portion replaced by one plane surface.

Figure 9:
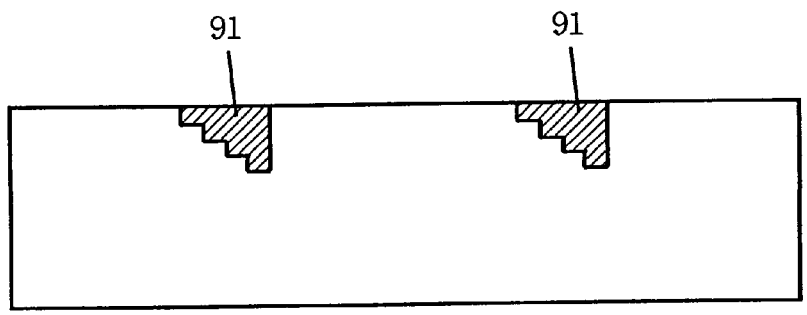
FIG. 9 is a partial cross section of the annular region of another example of the hologram shown in FIGS. 2 and 3.

Further, the protruded portion 72 may be formed not by etching glass as mentioned above, but by proton exchange of prescribed portion of transparent lithium tantalate or lithium niobate, so as to form a plurality of refractive regions 91 having the stepped shape, as shown in FIG. 9. Here, proton exchange is known method of partially changing refractive index of a material by introducing hydrogen ions to the material.

The operation of optical pickup device 13 structured as above will be described.

When a DVD is to be reproduced, a DVD is mounted on spindle motor 11. Then, determining circuit 16 determines, in response to a focus error signal obtained from photodetector 28 through amplifier 14, that the mounted optical disc 10 is a DVD. In response to a determination signal from determining circuit 16, driving circuit 17 applies a driving signal to laser element 61 of semiconductor laser 23, so as to activate laser element 61.

When laser element 61 is activated, semiconductor laser 23 generates the laser beam having the wavelength of 635 nm with plane of polarization being perpendicular to the sheet of FIG. 3. The laser beam from semiconductor laser 23 is transmitted through hologram 25 formed on a surface of collimator lens 24 and is transmitted through collimator lens 24. Hologram 25 does not at all diffract the laser beam having the wavelength of 635 nm, and therefore collimator lens 2 collimates the laser beam having the wavelength of 635 nm. In FIG. 3, the laser beam having the wavelength of 635 nm is represented by a solid line. The laser beam having the wavelength of 635 nm represented by the solid line is 0th order diffraction beam coming from hologram 25.

The collimated laser beam having the wavelength of 635 nm from collimator lens 24 is reflected by beam splitter 26 and enters polarizing glass 22. Polarizing glass fully transmits the laser beam having the wavelength of 635 nm with plane of polarization perpendicular to the sheet of FIG. 3, and therefore, the laser beam having the wavelength of 635 nm from collimator lens 24 fully enters the objective lens 21. Accordingly, objective lens 21 focuses the laser beam having the wavelength of 635 nm on the recording surface of transparent substrate 31 of the DVD, and forms a spot having the diameter of 0.9 (tolerance ±0.1)$\mu$m.

The beam reflected from the recording surface of the DVD passes through objective lens 21, polarizing glass 22, beam splitter 26 and collective lens 27 to reach photodetector 28.

When a CD-R is to be reproduced, a CD-R is mounted on spindle motor 11. Therefore, as described above, when determining circuit 16 determines that the mounted optical disc 10 is a CD-R, driving circuit 17 activates laser element 62 of semiconductor laser 23. When semiconductor element 62 is activated, semiconductor laser 23 generates the laser beam having the wavelength of 780 nm and plane of polarization parallel to the sheet of FIG. 3. The laser beam having the wavelength of 780 nm from semiconductor laser 23 is transmitted through hologram 25 and thereafter collimator lens 24. However, since hologram 25 diffracts the laser beam having the wavelength of 780 nm, collimator lens 24 does not fully collimate the laser beam having the wavelength of 780 nm. In FIG. 3, the laser beam having the wavelength of 780 nm is represented by a dotted line. The laser beam having the wavelength of 780 nm represented by the dotted line is first order diffraction beam diffracted by hologram 25.

The laser beam having the wavelength of 780 nm from collimator lens 24 is reflected by beam splitter 26 and thereafter enters polarizing glass 22. Annular polarizing region 40 of polarizing glass 22 intercepts the laser beam having the wavelength of 780 nm with plane of polarization parallel to the sheet of FIG. 3, and therefore only the central portion of the laser beam having the wavelength of 780 nm is transmitted through polarizing glass 22 and enters objective lens 21. Therefore, the effective numerical aperture of objective lens 21 attains to 0.40. Since the laser beam having the wavelength of 780 nm is the first order diffraction beam, the beam goes out from the central region 41 of polarizing glass 22 and enters objective lens 21 with its diameter enlarged. Therefore, objective lens 21 focuses the laser beam having the wavelength of 780 nm on the recording surface of transparent substrate 32 of the CD-R, and forms a spot having the diameter of 1.5 (tolerance ±0.1)$\mu$m.

The beam reflected from the recording surface of the CD-R passes through objective lens 21, polarizing glass 22, beam splitter 26 and collective lens 27 and reaches photodetector 28, in the similar manner as described above.

According to Embodiment 1 described above, hologram 25 does not diffract the laser beam having the wavelength of 635 nm but diffracts the laser beam having the wavelength of 780 nm. Therefore, objective lens 21 focuses the laser beam having the wavelength of 635 nm on the recording surface of the DVD, and focuses the laser beam having the wavelength of 780 nm on the recording surface of the CD-R. Therefore, optical pickup device 13 is capable of recording and reproducing not only the DVD but also the CD-R.

Further, since hologram 25 is formed on the surface of collimator lens 24, it is not necessary to significantly modify the structure of a conventional optical pickup device. Further, according to the first embodiment, there is not a portion operating mechanically. Therefore, failure is not likely.

Though Embodiment 1 has been described in detail in the foregoing, the scope of the present invention is not limited to Embodiment 1 described above.

[Embodiment 2]

Figure 10:
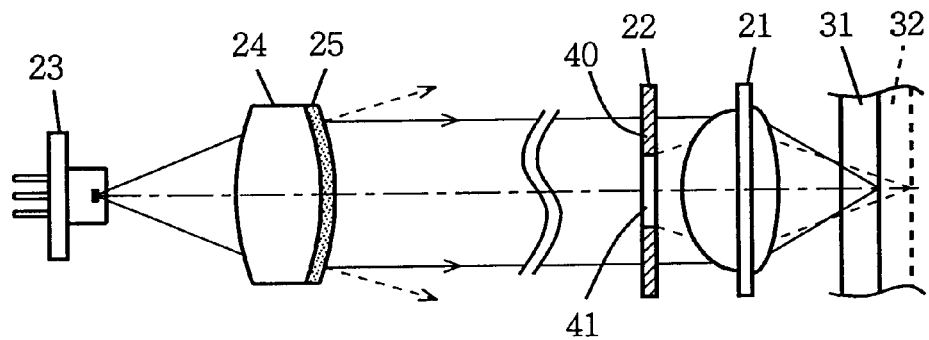
FIG. 10 shows arrangement of main optical system of the optical pickup device in accordance with Embodiment 2 of the present invention.

In Embodiment 1 described above, hologram 25 is formed on an upstream surface of collimator lens 24 which is the side receiving laser beam. However, hologram 25 may be formed on a down stream surface of collimator lens 24 which is the side emitting laser beam, as shown in FIG. 10.

[Embodiment 3]

Figure 11:
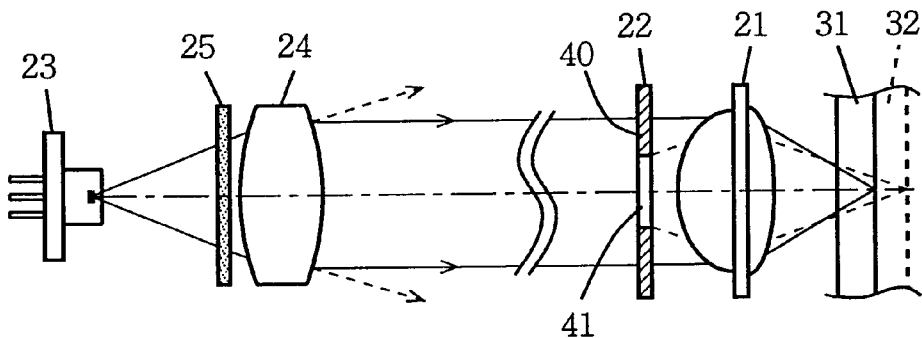
FIG. 11 shows an arrangement of a main optical system of the optical pickup device in accordance Embodiment 3 of the present invention.

Though hologram 25 is structured integrally with collimator lens 24 in Embodiment 1 described above, a plate shaped hologram 25 may be provided immediately preceding collimator lens 24, as shown in FIG. 11.

[Embodiment 4]

Figure 12:
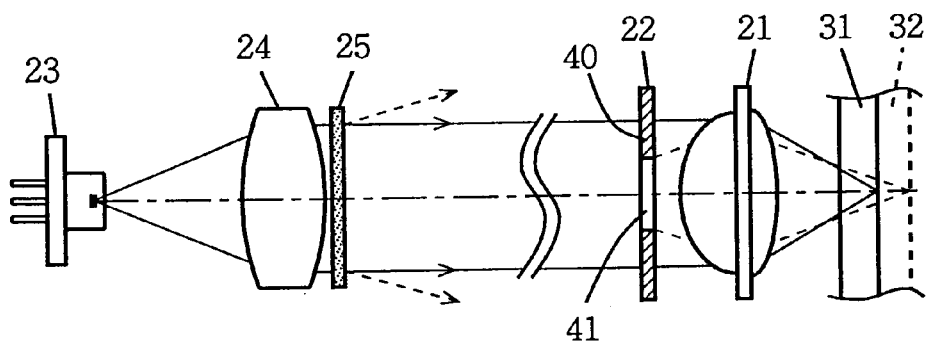
FIG. 12 shows an arrangement of a main optical system of the optical pickup device in accordance with Embodiment 4 of the present invention.

Further, the plate-shaped hologram 25 may be provided immediately succeeding collimator lens 24 as shown in FIG. 12.

In place of hologram 25 shown in FIGS. 3 and 10 to 12, a diffraction grating having wavelength selectivity or polarization selectivity may be used.

In Embodiments 1 to 4 described above, the laser beam having the wavelength of 635 nm is not diffracted by hologram 25. In other words, 0th order diffraction beam is used. However, first order diffraction beam of the laser beam having the wavelength of 635 nm and second order diffraction beam of the laser beam having the wavelength of 780 nm may be used. In short, what is necessary is that collimator lens 24 and hologram 25 as a whole constitute a bifocal lens which deflects one laser beam in a certain direction and the other laser beam in a different direction.

[Embodiment 5]

Figure 13:
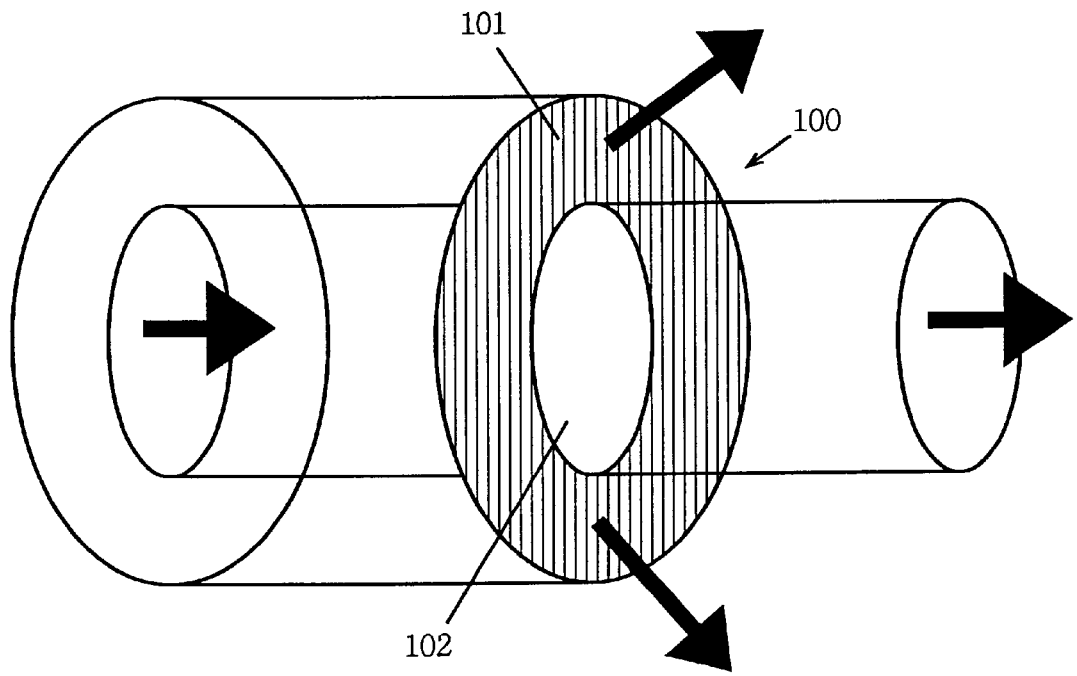
FIG. 13 shows function of the diffraction grating with polarization selectivity when laser beam having the wavelength of 780 nm is incident on the diffraction grating with polarization selectivity used in place of the polarizing glass shown in FIGS. 2 and 3.
Figure 14:
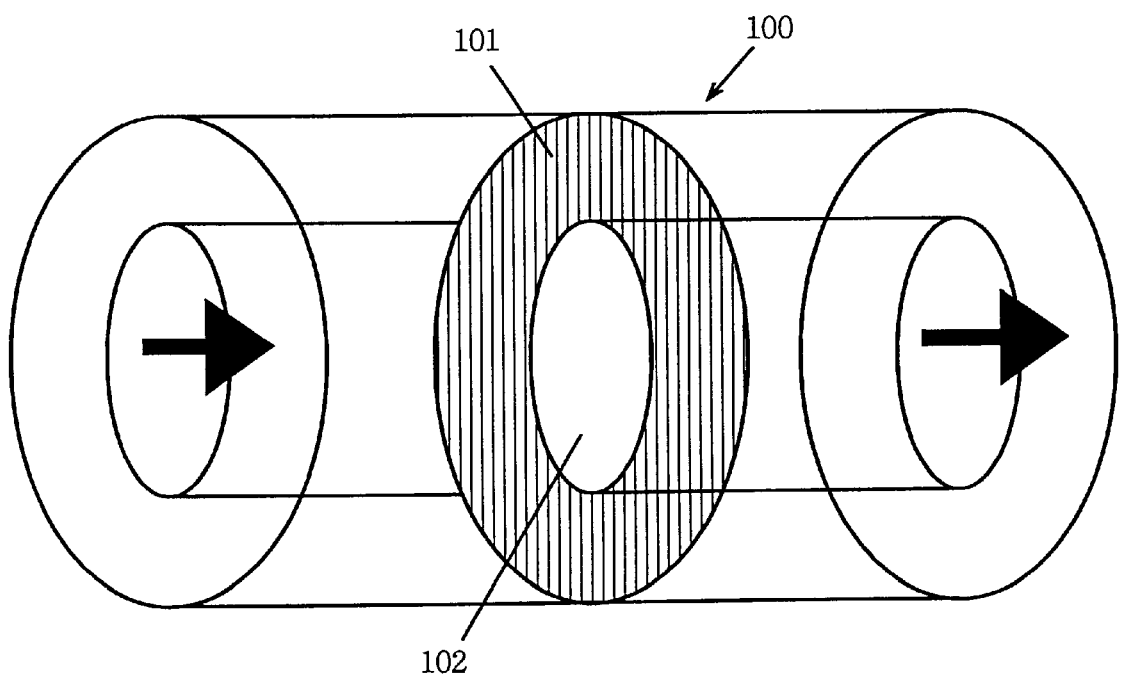
FIG. 14 shows function of the diffraction grating with polarization selectivity when laser beam having the wavelength 635 nm is incident on the diffraction grating with polarization selectivity shown in FIG. 13.

Though polarizing glass 22 is used for changing effective numerical aperture of objective lens 21 in Embodiment 1 described above, a diffraction grating 100 with polarization selectivity such as shown in FIGS. 13 and 14 may be used as an alternative. Diffraction grating 100 with polarization selectivity has an annular polarizing region 101 which center is the optical axis of objective lens 21. Polarizing region 101 transmits laser beam having plane of polarization parallel to the sheet. However, it diffracts outward the laser beam having plane of polarization perpendicular to the sheet. A central region 102 of diffraction grating 100 with polarization selectivity transmits laser beam having plane of polarization in any direction, as it is. Therefore, peripheral portion of the laser beam having the wavelength of 780 nm with plane of polarization being perpendicular to the sheet is diffracted outward at the polarizing region 101 of diffraction grating 100 with polarization selectively, so that only the central portion of the laser beam having the wavelength of 780 nm is transmitted through diffraction grating 100 with polarization selectivity and enters objective lens 21. The laser beam having the wavelength of 635 nm with plane of polarization being parallel to the sheet is fully transmitted through diffraction grating 100 with polarization selectivity and directly enters objective lens 21, as shown in FIG. 14.

[Embodiment 6]

Figure 15:
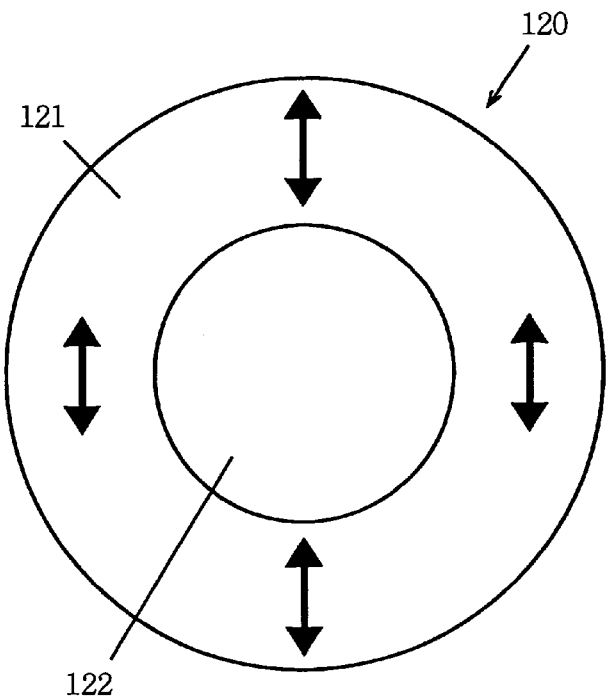
FIG. 15 is a plan view showing a polarizing film used in place of the polarizing glass shown in FIGS. 2 and 3.

In place of polarizing glass 22 in Embodiment 1 described above, a polarizing film 120 as shown in FIG. 15 may be used. Polarizing film 120 has an annular polarizing region 121 of which center is the optical axis of objective lens 21. Polarizing region 121 of polarizing film 120 has polarization characteristic that transmits only the laser beam polarized in longitudinal direction in the figure. However, a central region 122 thereof does not have any polarization characteristic. Therefore, peripheral portion of the laser beam having the wavelength of 780 nm with plane of polarization in lateral direction in the figure is intercepted by the polarizing region 121, so that only the central portion of the laser beam having the wavelength of 780 nm is transmitted through polarizing film 120 and enters objective lens 21. The laser beam having the wavelength of 635 nm having longitudinal plane of polarization in the figure is fully transmitted through polarizing film 120 and enters objective lens 21 directly.

[Embodiment 7]

Figure 16:
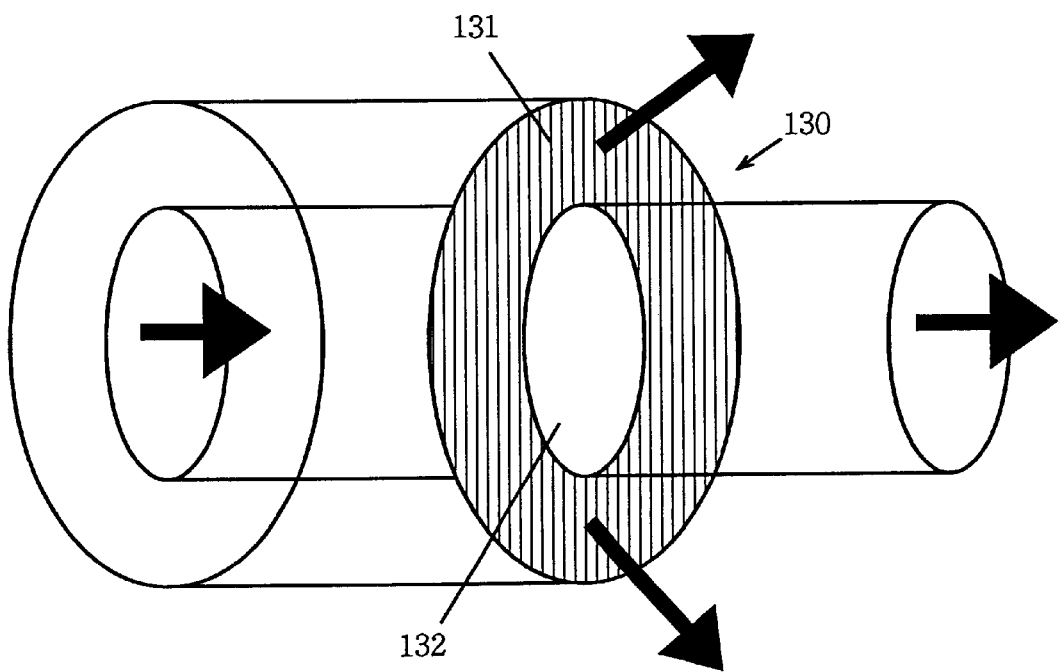
FIG. 16 shows function of the diffraction grating with wavelength selectivity when laser beam having the wavelength of 780 nm is incident on the diffraction grating with wavelength selectivity used in place of the polarizing glass shown in FIGS. 2 and 3.
Figure 17:
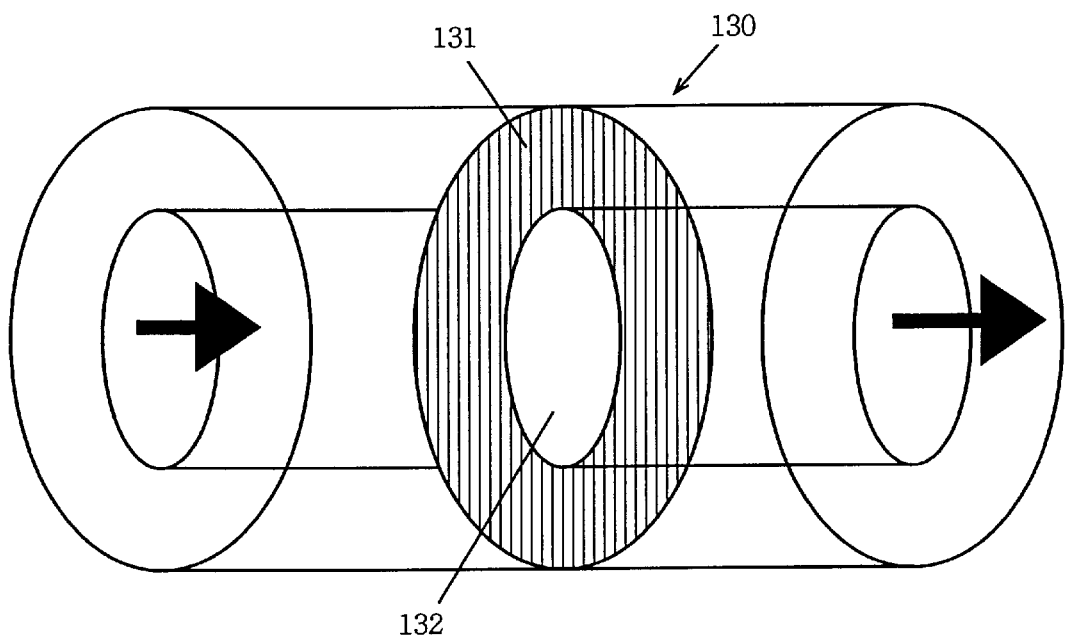
FIG. 17 shows function of the diffraction grating with wavelength selectivity when laser beam having the wavelength of 635 nm is incident on the diffraction grating with wavelength selectivity shown in FIG. 16.

In place of polarizing glass 22 of Embodiment 1 described above, a diffraction grating 130 with wavelength selectivity such as shown in FIGS. 16 and 17 may be used. Diffraction grating 130 with wavelength selectivity has an annular wavelength selecting region 131 of which center is the optical axis of objective lens 21. At wavelength selecting region 131 of diffraction grating 130 with wavelength selectively, the laser beam having the wavelength of 780 nm is diffracted outward. However, at a central region 132, laser beam having wavelengths of 780 nm and 635 nm are both transmitted as they are without diffraction. Therefore, as shown in FIG. 16, the peripheral portion of the laser beam having the wavelength of 780 nm is diffracted outward at wavelength selecting region 131 of diffraction grating 130 with wavelength selectivity, only the central portion of the laser beam having the wavelength of 780 nm is transmitted through diffraction grating 130 with wavelength selectivity, and enters objective lens 21. Meanwhile, the laser beam having the wavelength of 635 nm is fully transmitted through diffraction grating 130 with wavelength selectivity and directly enters the objective lens 21.

[Embodiment 8]

Examples of diffraction grating 130 with wavelength selectivity will be described.

Figure 18:
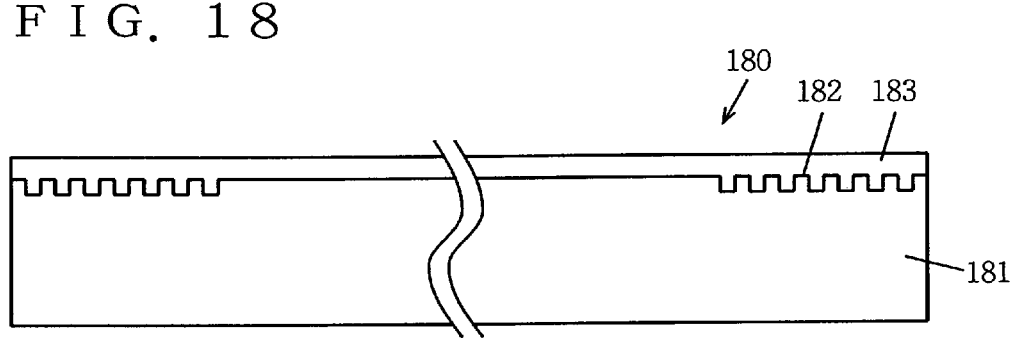
FIG. 18 is a side view showing an example of the diffraction grating with wavelength selectivity shown in FIGS. 16 and 17.

A diffraction grating 180 with wavelength selectivity shown in FIG. 18 includes a diffraction grating plate 181 having a main surface on which a diffraction grating 182 is formed, and a film 183 of which refractive index changes in accordance with wavelength of incident light beam formed on a main surface of diffraction grating plate 181. As shown in the plan view of FIG. 19, in the annular wavelength selecting region 184 other than a central region 185, recesses and protrusion of diffraction grating 182 are formed as linear stripes. Diffraction grating plate 181 is formed of glass, for example. Film 183 is of cyanine acid.

Preferably used cyanine dye includes 3-ethyl-2-[3-(3-ethyl-2-naphth[2,1-d]thiazolinylydene)-1-propenyl]naphth[2,1-d]thiazolium iodide (also referred to as; 3,3'-dyethyl-2,2'-(6,7,6',7'-dibenzo)thiacarbocyanine iodide, represented by the following chemical formula (1).

(1)

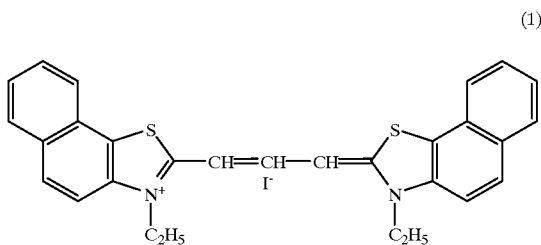

3-ethyl-2-[3-(1-ethyl-4(1H)-quinolilydene)-1-propenyl] benzooxazololium iodide (also referred to as; 1,3'-dyethyl-4,2'-quinoxacarbocianine iodide), represented by the following chemical formula (2), (2)

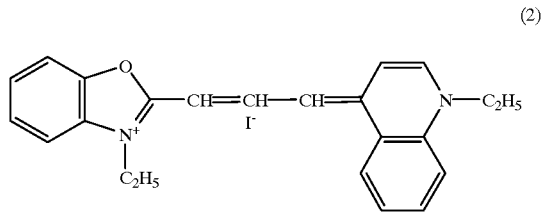

and 3-ethyl-2-[3-(3-ethyl-2-naphth[1,2-d]thiazolinylydene)-1-propenyl]naphth[1,2-d)thiazolium iodine (also referred to as; 3,3'-dyethyl-2,2'-(4,5,4',5'-dibenzo) thiacarbocyanine iodide) represented by the following chemical formula (3).

(3)

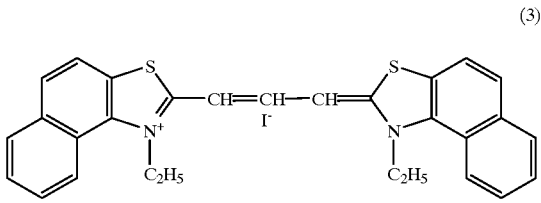

The cyanine dye has refractive index of 1.50 for the laser beam having the wavelength of 635 nm, and refractive index of 1.65 for the laser beam having the wavelength of 780 nm. In other words, refractive index of cyanine dye changes dependent on the wavelength. Meanwhile, diffraction grating plate 181 formed of glass has diffractive index of 1.50 for both laser beams having the wavelengths of 635 nm and 780 nm. Therefore, diffraction grating 182 does not function when the laser beam has the wavelength of 635 nm. Accordingly, in the wavelength selecting region 184 of diffraction grating 180 with wavelength selectivity, the laser beam having the wavelength of 780 nm is diffracted, while the laser beam having the wavelength of 635 nm is not diffracted.

[Embodiment 9]

Figure 19:
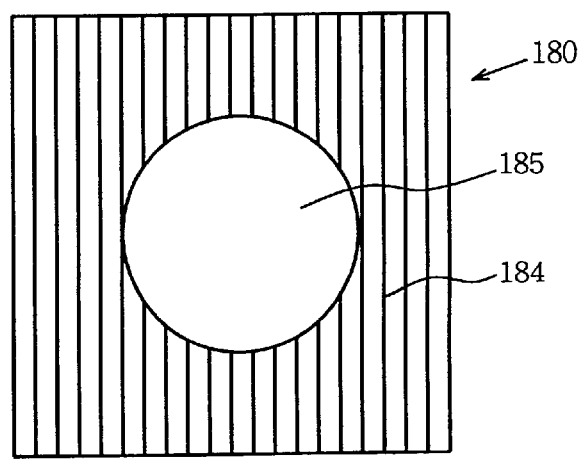
FIG. 19 is a plan view of the diffraction grating with wavelength selectivity shown in FIG. 18.
Figure 20:
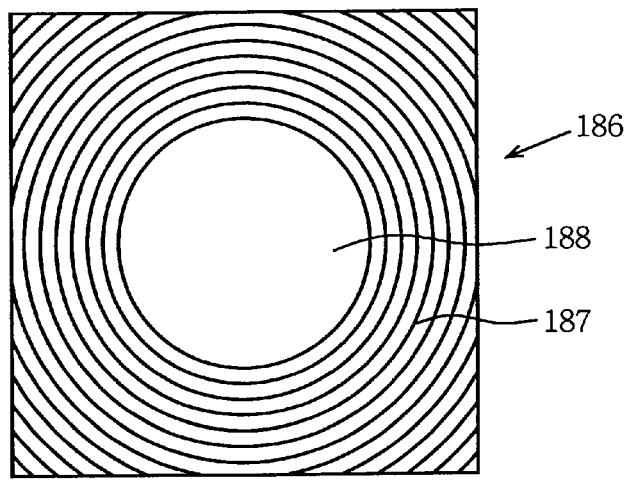
FIG. 20 is a plan view showing another example of the diffraction grating with wavelength selectivity shown in FIGS. 16 and 17.

In place of diffraction grating 180 with wavelength selectivity shown in FIGS. 18 and 19, a diffraction grating 186 with wavelength selectivity such as shown in FIG. 20 may be used. In an annular wavelength selecting region 187 other than a central region 188 of diffraction grating 186 with wavelength selectivity, the recesses and protrusion of the diffraction grating are formed as concentrical stripes.

[Embodiment 10]

Figure 21:
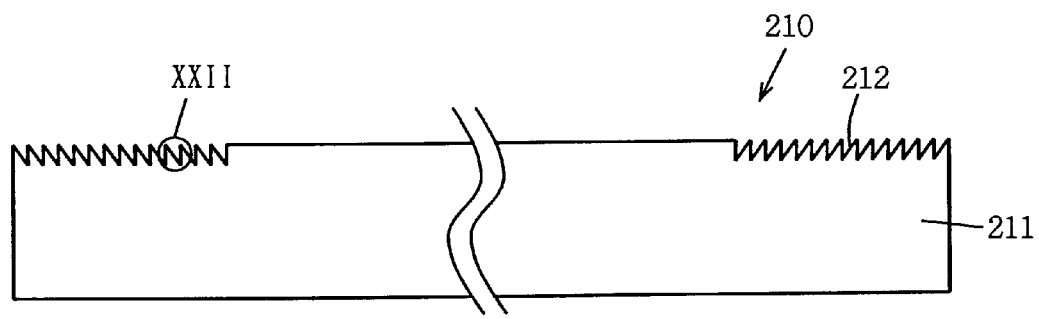
FIG. 21 is a side view showing a further example of the diffraction grating with wavelength selectivity shown in FIGS. 16 and 17.

A diffraction grating 210 with wavelength selectivity such as shown in FIG. 21 may be used. Diffraction grating 210 with wavelength selectivity is formed of a glass plate 211 having a surface on which diffraction grating 212 is formed. Diffraction grating 212 has stepwise recesses and protrusion as shown in the enlarged view of FIG. 22(a). The recesses and protrusion are formed with a pitch P of 8 to 30 μm, for example, preferably 20 to 30 μm. One step H is of an integer multiple of 635 nm. Each recessed and protruded structure has 4 to 6 steps.

Figure 22A:
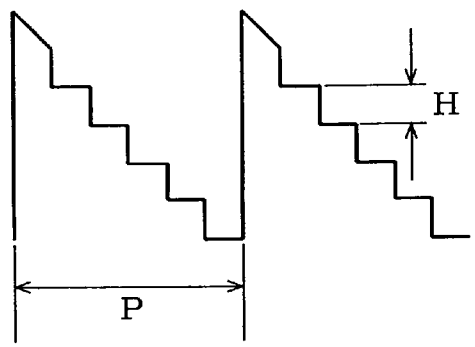
FIG. 22($a$) is an enlarged view showing an example of the portion XXII of the diffraction grating in the diffraction grating with wavelength selectivity shown in FIG. 21, and FIG. 22($b$) is an enlarged view showing another example.
Figure 22B:
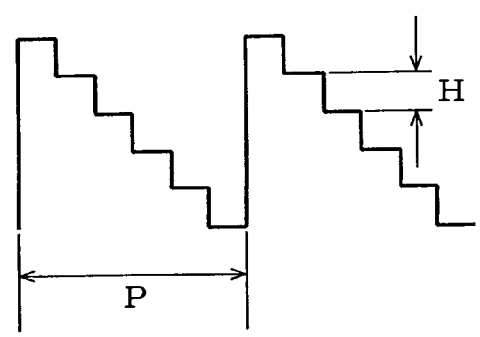

Though the tip end portion of the recessed and protruded structure shown in FIG. 22(a) is acute, it may be flat as shown in FIG. 22(b).

Figure 23:
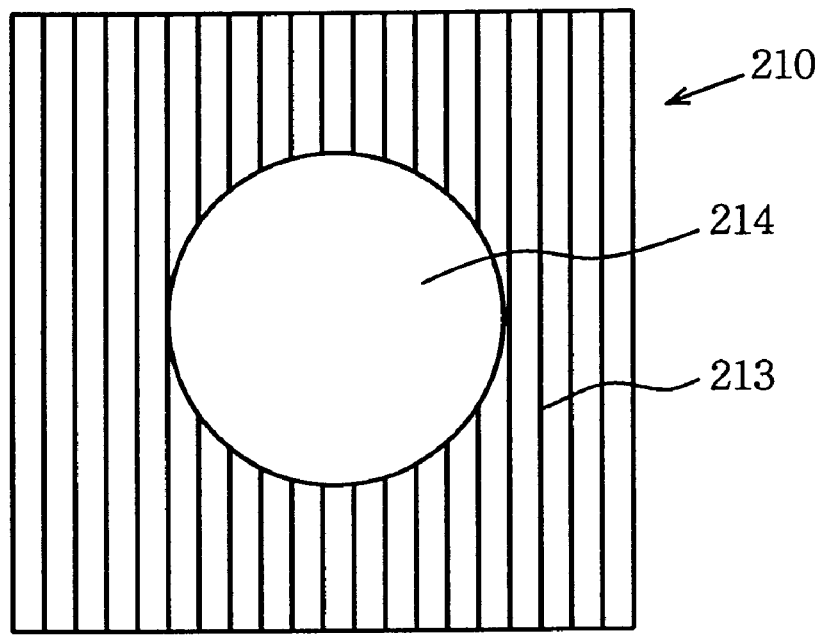
FIG. 23 is a plan view of the diffraction grating in the diffraction grating with wavelength selectivity shown in FIG. 21.

As shown in the plan view of FIG. 23, in an annular wavelength selecting region 213 other than central region 214 of diffraction grating 210 with wavelength selectivity, the recesses and protrusions of diffraction grating 212 are formed as linear stripes.

Therefore, in wavelength selecting region 213 of diffraction grating 210 with wavelength selectivity, laser beam having the wavelength of 780 nm is diffracted, while laser beam having the wavelength of 635 nm is not diffracted.

[Embodiment 11]

Figure 24:
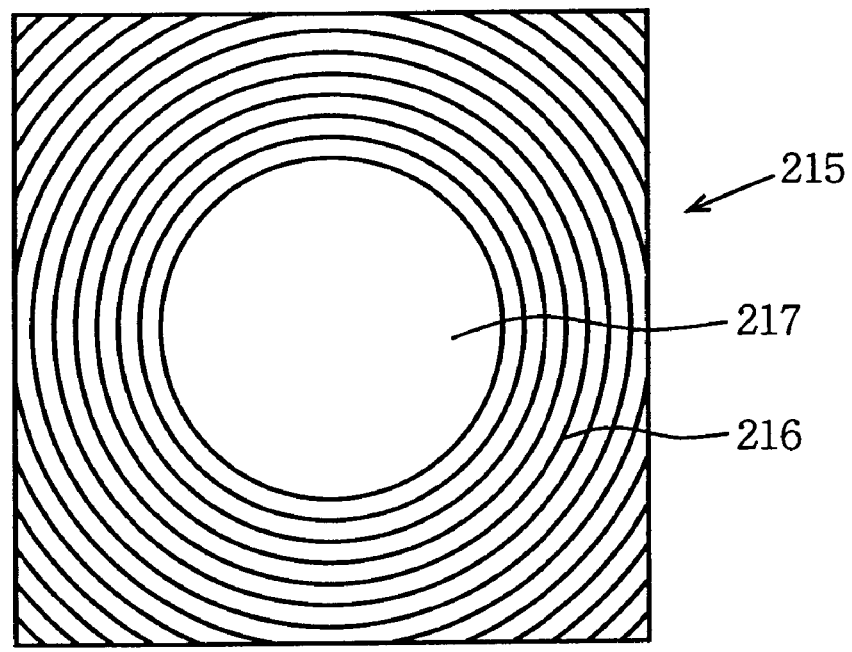
FIG. 24 is a plan view of a diffraction grating with recesses and protrusions in a pattern different from that of the diffraction grating shown in FIG. 23.

In place of diffraction grating 210 with wavelength selectivity shown in FIGS. 21 to 23, a diffraction grating 215 with wavelength selectivity such as shown in FIG. 24 may be used. In an annular wavelength selecting region 216 other than a central region 217 of diffraction grating 215 with wavelength selectivity, recesses and protrusions of the diffraction grating are formed as concentrical stripes.

[Embodiment 12]

Figure 25:
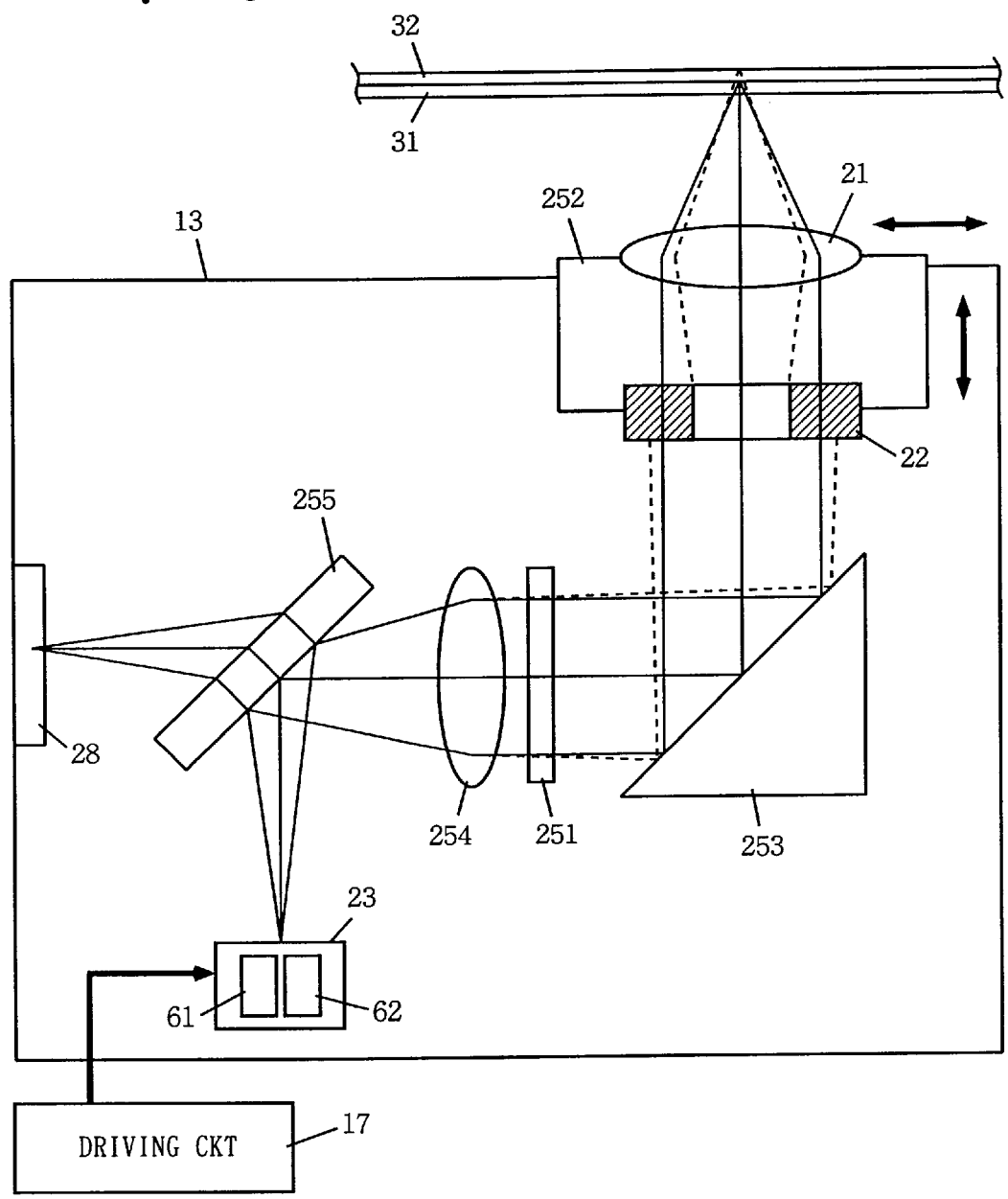
FIG. 25 shows an arrangement of an optical system of the optical pickup device in accordance with Embodiment 12 of the present invention.

Referring to FIG. 25, optical pickup device 13 in accordance with Embodiment 12 of the present invention is characterized in that it is provided with a diffraction grating plate 251 with a hologram. Further, optical pickup device 13 includes a polarizing mirror 253 for reflecting a laser beam parallel to the recording surface of the optical disc to a direction perpendicular to the recording surface, a half mirror 255 which is one type of beam splitters, used in place of beam splitter 26 shown in FIG. 2, and a collimator lens 254 used in place of collimator lenses 24 and 27 shown in FIG. 2. Objective lens 21 and polarizing glass 22 are fixed on an actuator 252.

Optical pickup device 13 employs a well known three beam method for tracking control. In the general three beam method, a diffraction grating plate is provided for dividing one laser beam into three. In Embodiment 12, not on the surface of a collimator lens but on a surface of the diffraction grating plate for the three beam method, a hologram is formed.

Figure 26:
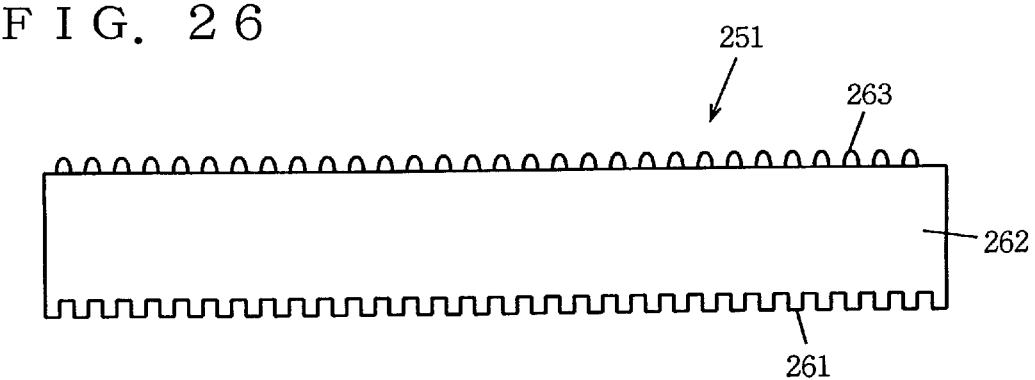
FIG. 26 is a side view showing a diffraction grating plate with a hologram shown in FIG. 25.

Referring to FIG. 26, diffraction grating plate 251 with a hologram consists of a glass plate 262 having a main surface on which a diffraction grating 261 for the three beam method is formed, and a hologram 263 formed on a surface opposite to the main surface.

In optical pickup device 13, the laser beam having the wavelength of 635 nm enters objective lens 21 without being diffracted by diffraction grating plate 251 with the hologram, as shown by the solid line in FIG. 25. The laser beam having the wavelength of 780 nm enters objective lens 21 after being diffracted by diffraction grating plate 251 with the hologram, as shown by the dotted line in FIG. 25. Therefore, in the similar manner as in the embodiment described above, optical pickup device 13 is capable of recording and reproducing not only a DVD but also a CD-R.

According to Embodiment 12, since hologram 263 is formed on diffraction grating plate 251 for the three beam method, it is not necessary to significantly modify the structure of a conventional optical pickup device.

[Embodiment 13]

Figure 27:
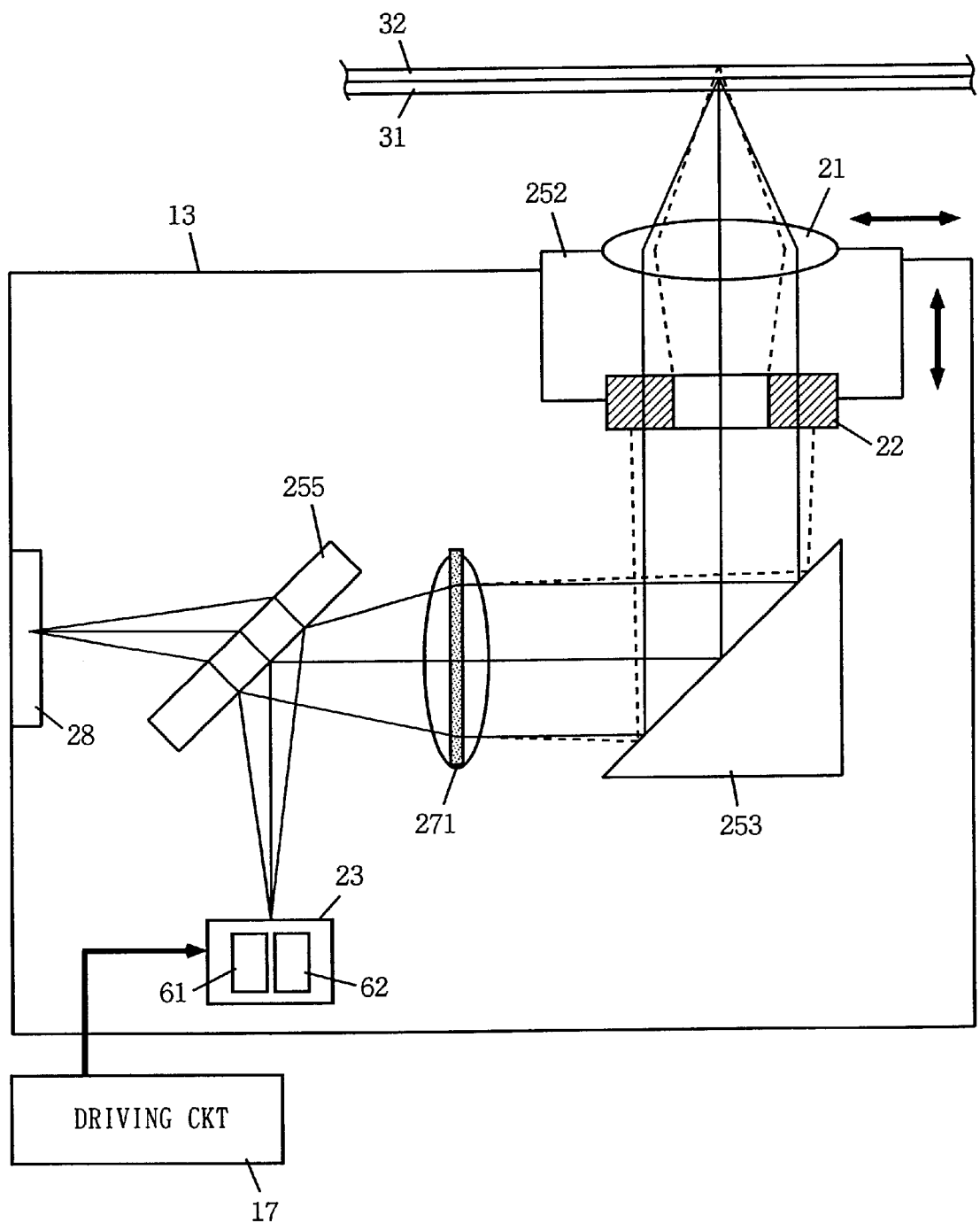
FIG. 27 shows arrangement of the optical system of optical pickup device in accordance with Embodiment 13 of the present invention.

Referring to FIG. 27, optical pickup device 13 in accordance with Embodiment 13 of the present invention is characterized in that it is provided with a bifocal collimator lens 271 having two points of focus.

Figure 28:
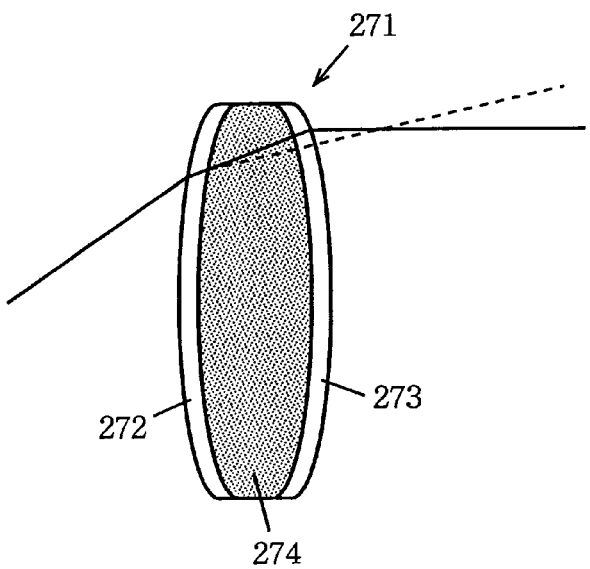
FIG. 28 is a side view showing a bifocal collimator lens of FIG. 27.

As shown in FIG. 28, bifocal collimator lens 271 includes a lens 272, a lens 273 provided opposing to lens 272, and a cyanine dye 274 sandwiched between lenses 272 and 273. Cyanine dye 274 has refractive index of 1.50 for the laser beam having the wavelength of 635 nm, and refractive index of 1.65 for the laser beam having the wavelength of 780 nm. Lenses 272 and 273 have refractive index of 1.50.

Figure 29:
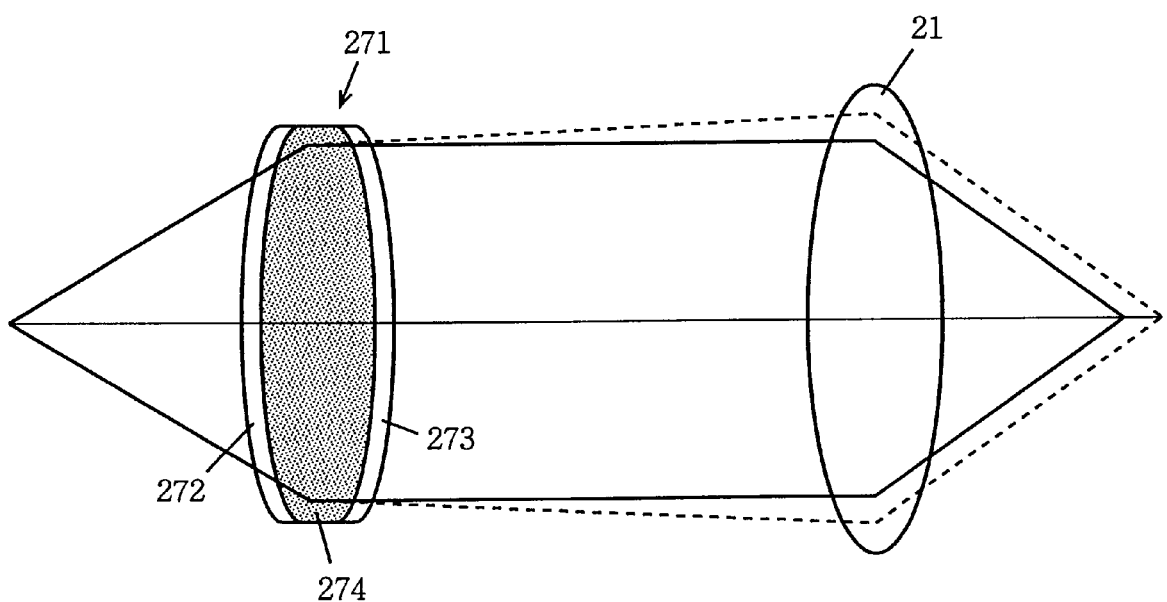
FIG. 29 is an illustration showing function of the bifocal collimator lens of FIG. 28.

Therefore, when laser beam having the wavelength of 635 nm enters, bifocal collimator lens 272 functions in the similar manner as a single collimator lens 254. Accordingly, the laser beam having the wavelength of 635 nm is refracted at the surface of lens 272 and the surface of lens 273 as shown by the solid line in FIG. 28, and is collimated as shown by the solid line in FIG. 29. The laser beam having the wavelength of 780 nm is refracted at the surfaces of lenses 272 and 273, and in addition, at interfaces between each of lenses 272 and 273 and cyanine dye 274. Therefore, as shown by the dotted line in FIG. 29, the laser beam having the wavelength of 780 nm enters objective lens 21 not collimated but slightly enlarged. Therefore, objective lens 21 focuses the laser beam having the wavelength of 780 nm on a position different from that of the laser beam having the wavelength of 635 nm.

[Embodiment 14]

Figure 30:
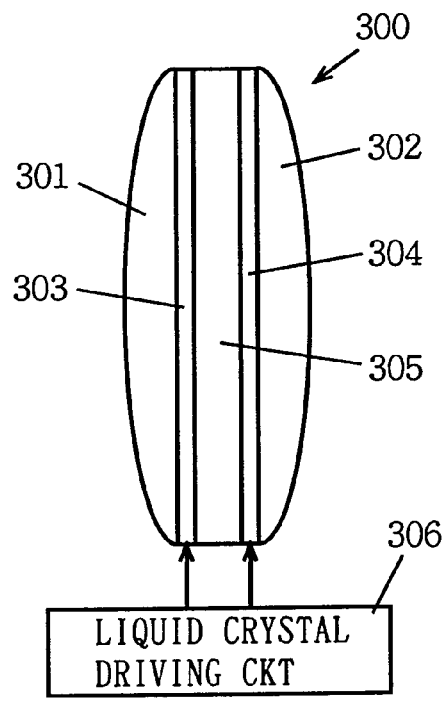
FIG. 30 is a side view of another bifocal collimator lens as an alternative to the bifocal collimator lens of FIG. 27.

In place of bifocal collimator lens 271 described above, a bifocal collimator lens 300 such as shown in FIG. 30 may be used. Bifocal collimator lens 300 includes a lens 301, a lens 302 provided opposing to lens 301, a transparent electrode 303 formed on an inner surface of lens 301, a transparent electrode 304 formed on an inner surface of lens 302, and a TN liquid crystal 305 sandwiched between transparent electrodes 303 and 304. A liquid crystal driving circuit 306 formed of an oscillating circuit is provided for driving TN liquid crystal 305. When reproduction of a CD-R is to be performed, that is, when the laser beam having the wavelength of 780 nm is incident on bifocal collimator lens 300, liquid crystal driving circuit 306 applies a prescribed voltage between transparent electrodes 303 and 304.

When voltage is not applied, TN liquid crystal 305 has refractive index of 1.50 and when the voltage is applied, it has refractive index of 1.65. In place of TN liquid crystal 305, an STN liquid crystal may be used.

Figures 31A, 31B:
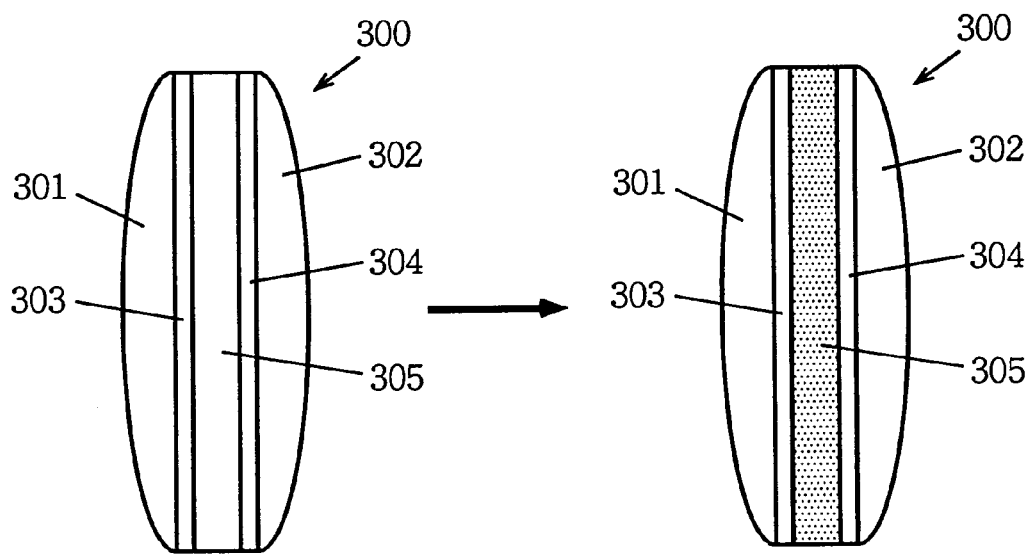
FIG. 31($a$) is an illustration showing function when voltage is not applied between transparent electrodes of the bifocal collimator lens shown in FIG. 30, and FIG. 31($b$) is an illustration showing the function when a prescribed voltage is applied between the transparent electrodes.

As shown in FIG. 31(a), when voltage is not applied between transparent electrodes 303 and 304, TN liquid crystal 305 has refractive index of 1.50, and therefore, bifocal collimator lens 300 functions in the similar manner a single collimator lens 254. Referring to FIG. 31(b), when a prescribed voltage is applied between transparent electrodes 303 and 304, refractive index of TN liquid crystal 305 as a whole changes to 1.65, and therefore incidence light beam is refracted not only at the surfaces of lenses 301 and 302 but also at interface between each of lenses 301 and 302 and TN liquid crystal 305.

Figure 32:
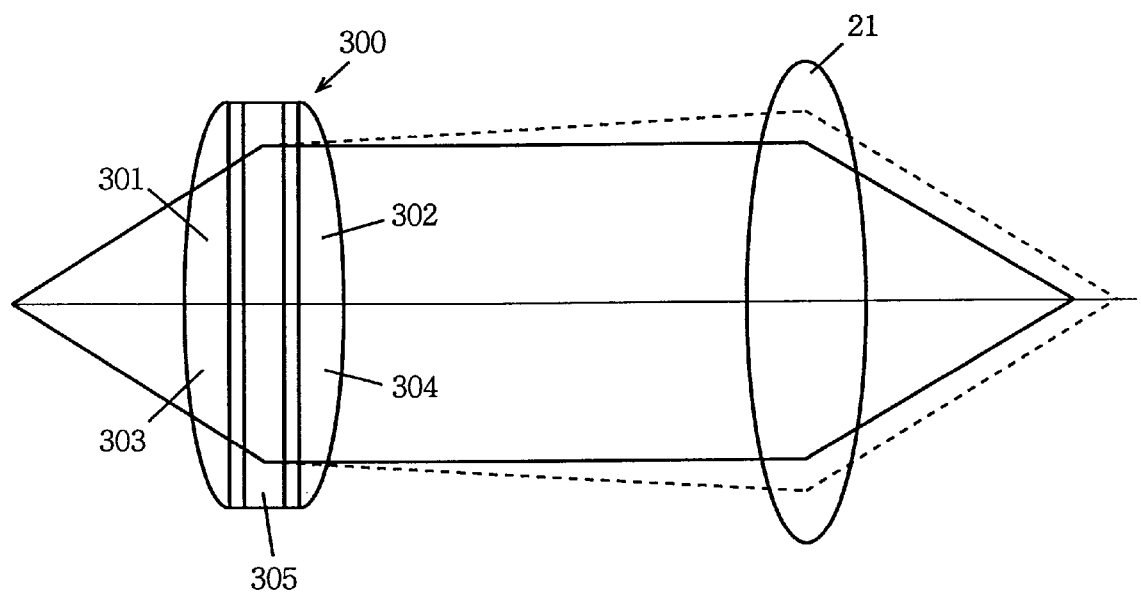
FIG. 32 is an illustration showing the function of the bifocal collimator lens of FIG. 30.

When DVD is to be reproduced, that is, when the laser beam having the wavelength of 635 nm enters bifocal collimator lens 300, voltage is not applied between transparent electrodes 303 and 304. Therefore, bifocal collimator lens 300 collimates the laser beam having the wavelength of 635 nm and guides the laser beam to objective lens 21, as represented by the solid line in FIG. 32. When a CD-R is to be reproduced, that is, when the laser beam having the wavelength of 780 nm enters bifocal collimator lens 300, a prescribed voltage is applied between transparent electrodes 303 and 304. Therefore, bifocal collimator lens 300 guides the laser beam having the wavelength of 780 nm not collimated but slightly expanded, as represented by the dotted line in FIG. 32. Therefore, objective lens 21 focuses the laser beam having the wavelength of 780 nm on a position different from that of the laser beam having the wavelength of 635 nm.

Figure 33:
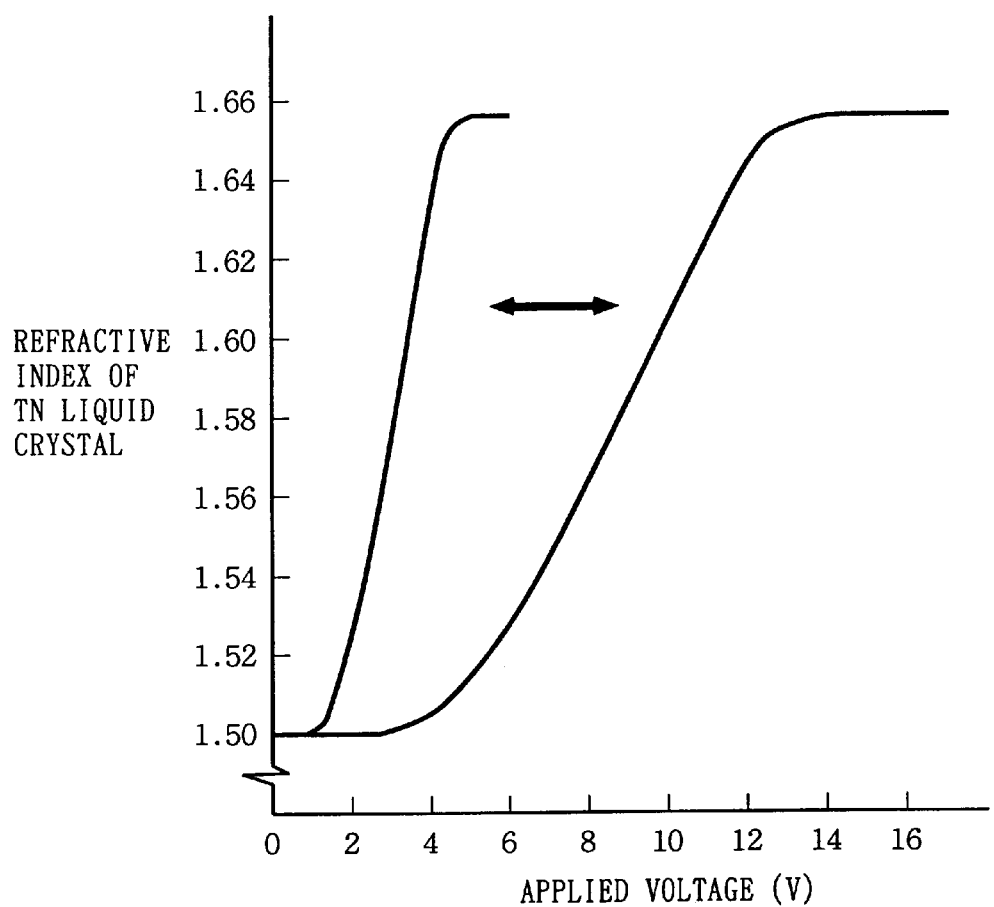
FIG. 33 is a graph showing relation between voltage applied between the transparent electrodes of the bifocal collimator lens of FIG. 30 and refractive index of TN liquid crystal.

Relation between the applied voltage and refractive index of the TN liquid crystal is shown in FIG. 33. The voltage at which refractive index of TN liquid crystal 305 begins to increase from 1.50 and the voltage at which the refractive index is saturated at 1.65 may be set freely. However, the voltage applied is preferably used within the range of 5 to 12 V.

[Embodiment 15]

Figure 34:
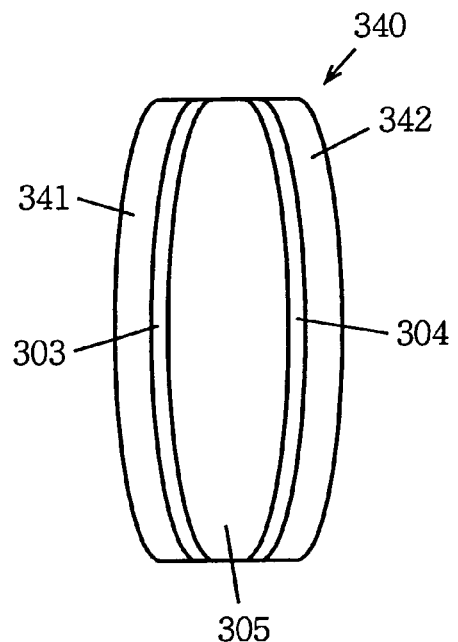
FIG. 34 is a side view showing a still further bifocal collimator lens which is an alternative to the bifocal collimator lens of FIG. 27.

Though inner surfaces of lenses 301 and 302 of bifocal collimator lens 300 are both flat, inner surfaces of lenses 341 and 342 may be curved as in a bifocal collimator lens 340 shown in FIG. 34.

[Embodiment 16]

Figure 35:
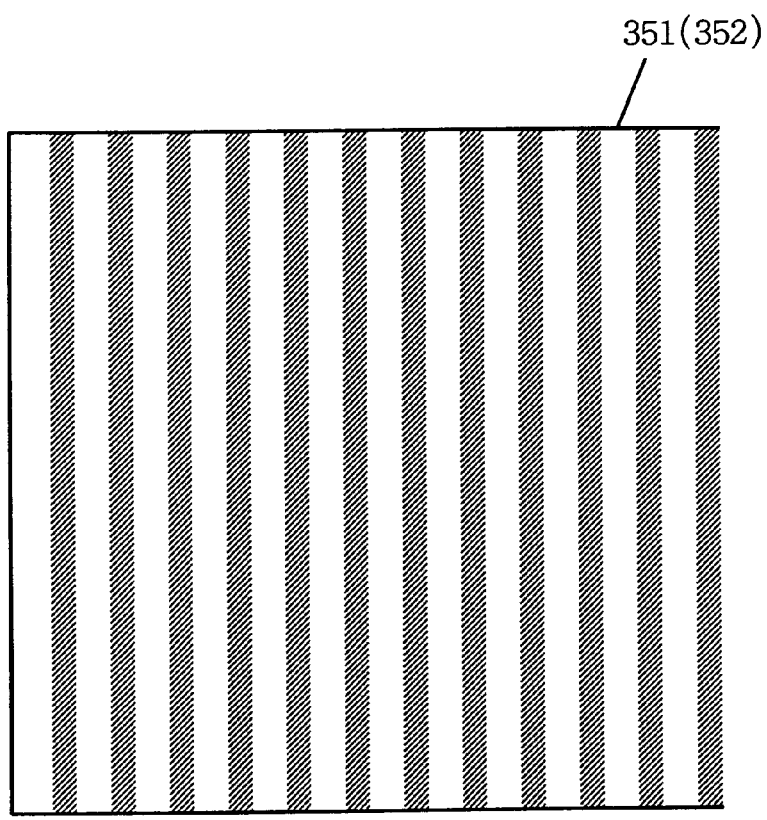
FIG. 35 is a plan view showing an example of a pattern of transparent electrodes of the bifocal collimator lens.

In bifocal collimator lenses 300 and 340, transparent electrodes 303 and 304 are formed entirely over the inner surfaces of lenses 301, 302, 341 and 342. However, transparent electrodes 351 and 352 may have a linear striped pattern as shown in FIG. 35.

Referring to FIG. 36(a), when a voltage is not applied between the stripe transparent electrodes 351 and 352, refractive index of TN liquid crystal 305 as a whole is 1.50. However, referring to FIG. 36(b), when a prescribed voltage is applied between the stripe transparent electrodes 351 and 352, refractive index of TN liquid crystal 305 changes partially. More specifically, refractive indexes of 1.50 and 1.65 appear as linear stripes.

According to Embodiment 16, since transparent electrodes 351 and 352 are pattern as linear stripes, TN liquid crystal 305 has further polarization selectivity.

[Embodiment 17]

Though transparent electrodes 351 and 352 of bifocal collimator lens 350 are patterned as linear stripes, a transparent electrode 371 may be patterned as concentrical stripes as shown in FIG. 37.

According to Embodiment 17, since transparent electrode 371 is patterned as a concentrical stripes, TN liquid crystal further functions as a hologram. As a result, difference between two points of focus of the collimator lens is further increased.

[Embodiment 18]

Figure 38:
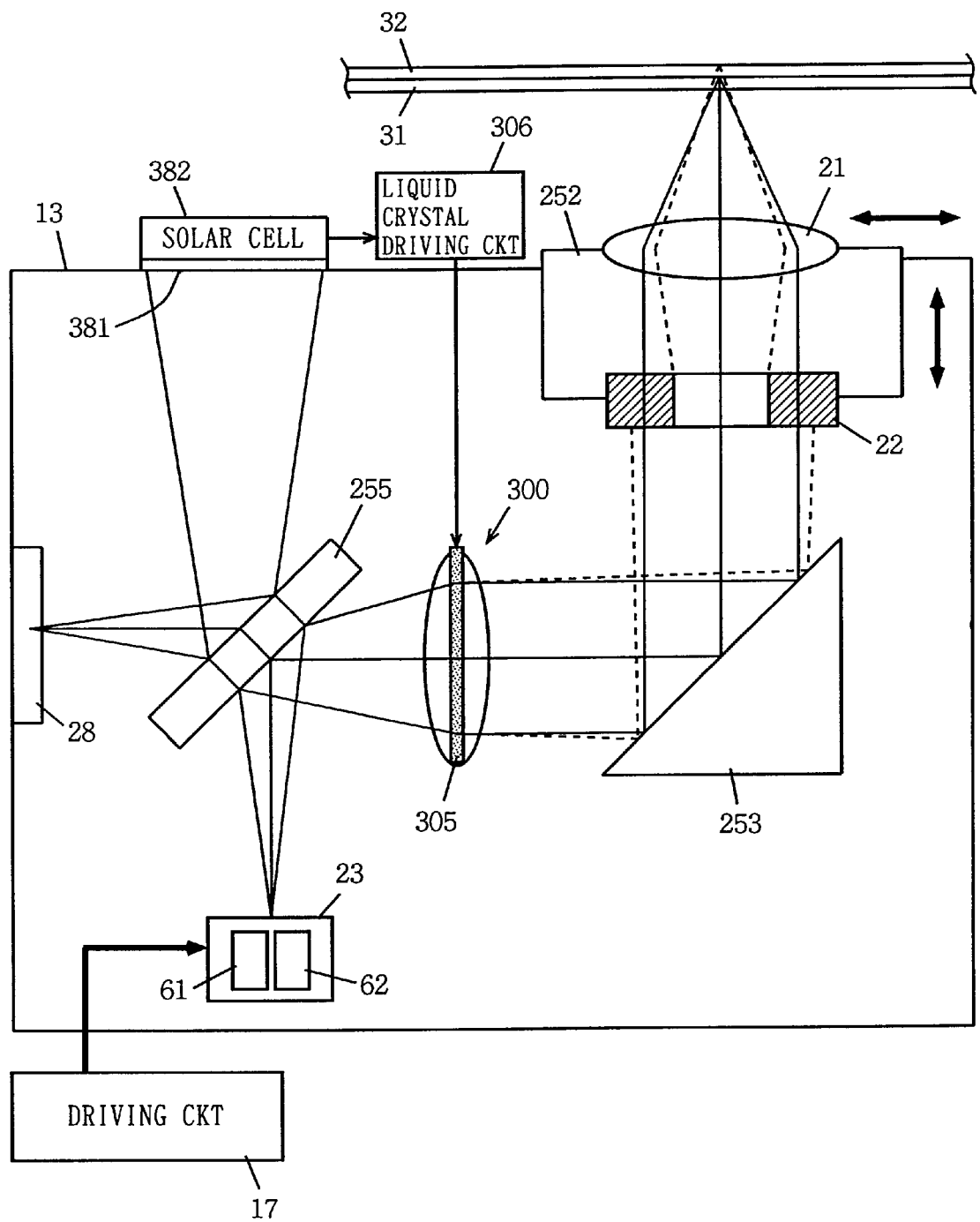
FIG. 38 shows arrangement of the optical system of the optical pickup device in accordance with Embodiment 18 of the present invention.

Part of the laser beam from semiconductor laser 23 is reflected by half mirror 255, while remaining part is transmitted through half mirror 255, as shown in FIG. 38. Embodiment 18 is directed to effective use of the laser beam which has been transmitted through half mirror 255.

Referring to FIG. 38, optical pickup device 13 in accordance with Embodiment 18 of the present invention is characterized in that it includes a solar cell 382, an optical filter 381 attached to a light receiving surface of solar cell 382 and liquid crystal driving circuit 306 for driving TN liquid crystal 305 of bifocal collimator lens 300 using power supplied from solar cell 382.

Optical filter 381 intercepts laser beam having the wavelength of 635 nm and transmits laser beam having the wavelength of 780 nm. In place of optical filter 381 having such wavelength selectivity, a polarizing optical filter of which direction of polarization matches the direction of polarization of the laser beam having the wavelength of 780 nm may be used.

Figure 39:
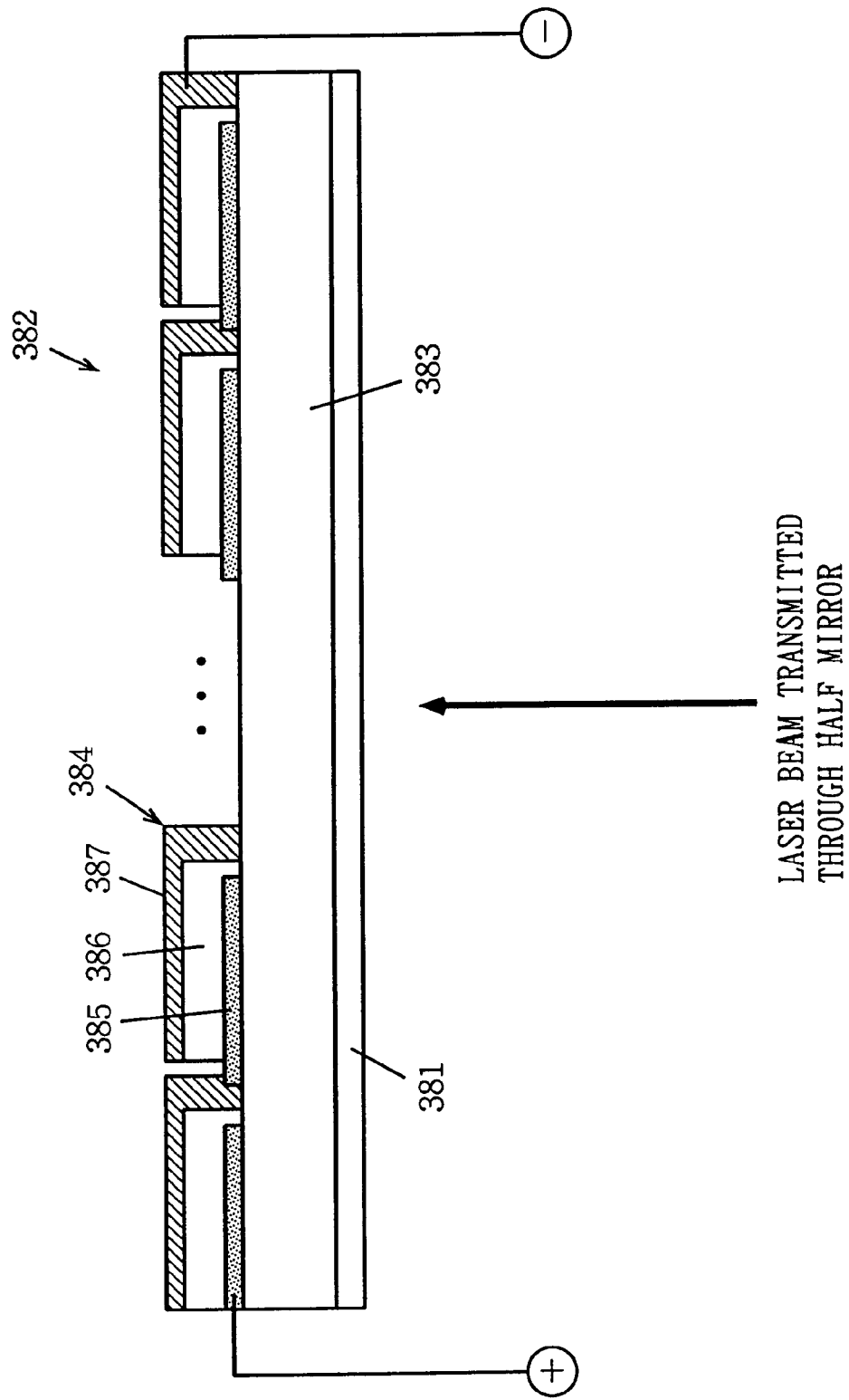
FIG. 39 is a cross section showing a structure of an optical filter and a solar cell shown in FIG. 38.
Figure 40:
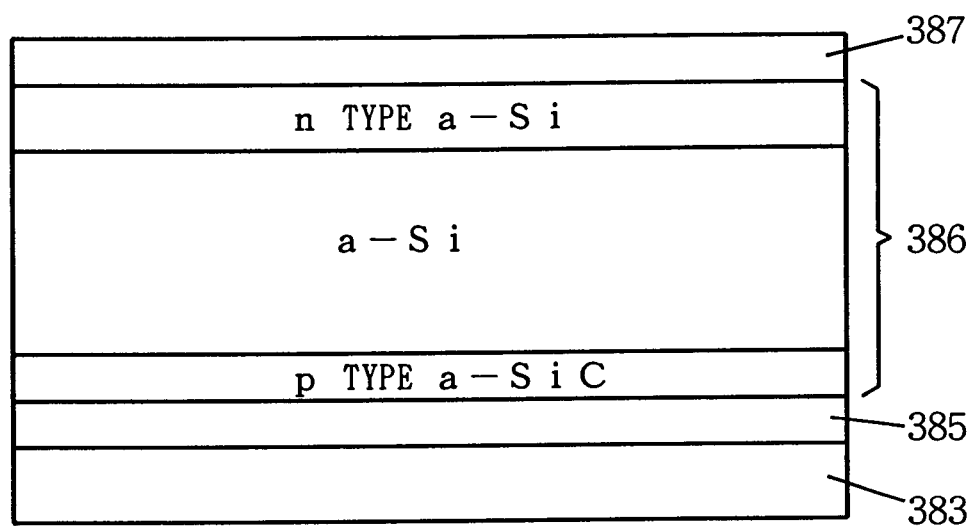
FIG. 40 is a cross section showing a specific structure of an amorphous silicon layer of FIG. 39.

As shown in FIG. 39, solar cell 382 includes a transparent substrate 383 formed of glass, polycarbonate, plastic film or the like, and a plurality of photocells 384 formed on a main surface of transparent substrate 383. Optical filter 381 is formed on a surface opposite to the main surface of transparent substrate 383.

Each of photocells 384 includes a transparent electrode 385 formed of ITO, $SnO_2$, ZnO or the like formed on the main surface of transparent substrate 383, an amorphous silicon (a-Si) layer 386 having a PIN structure formed on transparent electrode 385, and a back plate 387 formed of aluminum, silver or the like. Each photocell 384 converts optical energy of the laser beam which has passed optical filter 381 to electric energy. The plurality of photocells 384 are connected in series. Therefore, the voltage generated between opposing ends of solar cells 382 can be set freely by changing the number of photocells 384.

Amorphous silicon layer 386 includes a p type amorphous silicon carbide (a-SiC) layer formed on transparent electrode 385, an intrinsic amorphous silicon layer, and an n type amorphous silicon layer.

Again referring to FIG. 38, when a DVD is to be reproduced, laser element 61 generates the laser beam having the wavelength of 635 nm. Part of the laser beam having the wavelength of 635 nm is reflected by half mirror 255, and the remaining part is transmitted through half mirror 255. However, the laser beam having the wavelength of 635 nm is not transmitted through optical filter 381, and therefore photocells 382 does not generate any voltage. As a result, liquid crystal driving circuit 306 does not operate, and hence TN liquid crystal 305 in bifocal collimator lens 300 has refractive index of 1.50. Therefore, the laser beam having the wavelength of 635 nm reflected at half mirror 255 is collimated by bifocal collimator lens 300.

Meanwhile, when a CD-R is to be reproduced, laser element 62 generates laser beam having the wavelength of 780 nm. Part of the laser beam having the wavelength of 780 nm is reflected by half mirror 255, and the remaining part is transmitted through half mirror 255. The laser beam having the wavelength of 780 nm which has been transmitted through half mirror 255 is also transmitted through optical filter 381, and therefore solar cell 382 supplies power to liquid crystal driving circuit 306. Accordingly, refractive index of TN liquid crystal 305 of bifocal collimator lens 300 changes to 1.65. Therefore, the laser beam having the wavelength of 780 nm reflected by half mirror 255 is refracted to expand slightly from parallel, by bifocal collimator lens 300.

According to Embodiment 18, the laser beam which has been transmitted through half mirror 255 is effectively utilized by solar cell 382 to drive TN liquid crystal 305, and therefore it is not necessary to externally supply any power to drive TN liquid crystal 305. Further, since there is provided optical filter 381 selectively transmitting laser beam having the wavelength of 780 nm only, the point of focus of bifocal collimator lens 300 is switched automatically.

[Embodiment 19]

The standard of the DVD is at present as shown in Table 1 above. However, it is expected that recording density of the DVD will be increased in the future. Here, a DVD having higher recording density than a standard DVD specified in Table 1 will be referred to as "high density DVD."

The optical pickup device in accordance with the embodiments described above is capable of compatible reproduction of CD-R and DVD. The pickup device may be capable of compatible reproduction of CD and high density DVD. Spec. values and conditions for reproduction of the CD and the high density DVD are shown in Table 2 below.

TABLE 2

|  |  | Type | CD-R | High Density DVD |
|---|---|---|---|---|
| Spec. Value |  | Substrate thickness of reading surface side | 1.2 mm (1.1~1.3 mm) | 0.6 mm (0.55~0.65 mm) |
|  |  | Shortest pit length | 0.83 $\mu$m (0.8~0.9 $\mu$m) | 0.30 $\mu$m (0.20~0.40 $\mu$m) |
|  |  | Pit Depth | 156 nm (130~195 nm) | 88 nm (78~98 nm) |
|  |  | Track Pitch | 1.6 $\mu$m (1.5–1.7 $\mu$m) | 0.56 $\mu$m (0.55~0.57 $\mu$m) |
|  |  | Reflectance | at least 70% | at least 40%   15~40% |
| Condition for Reproduction |  | Spot Diameter | 1.5 $\mu$m (1.4~1.6 $\mu$m) | 0.70 $\mu$m (0.65~0.75 $\mu$m) |
|  |  | Numerical Aperture | 0.40 (0.35~0.45) | 0.60 (0.55~0.65) |
|  |  | Wavelength | 635 nm (620~650 nm) | 480 nm (400~550 nm) |

A CD has a transparent substrate having the thickness of 1.2 (tolerance ±0.1)mm and reproduced by the laser beam having the wavelength of 635 nm. A high density DVD has a transparent substrate having the thickness of 0.6 (tolerance ±0.05)mm and reproduced by a laser beam having the wavelength of 480 nm. The track pitch of the standard DVD shown in Table 1 is 0.74 $\mu$m while the track pitch of the high density DVD shown in Table 2 is 0.56 $\mu$m.

[Embodiment 20]

In Embodiment 19 described above, the laser beam having the wavelength of 635 nm is used for reproducing a CD. However, the laser beam having the wavelength of 780 nm may be used as shown in Table 3 below. In that case, effective numerical aperture of the objective lens is set to 0.45 rather than 0.40.

TABLE 3

| | Type | CD | High Density DVD |
|---|---|---|---|
| Spec. Value | Substrate thickness of reading surface side | 1.2 mm (1.1~1.3 mm) | 0.6 mm (0.55~0.65 mm) |
| | Shortest pit length | 0.83 μm (0.8~0.9 μm) | 0.30 μm (0.20~0.40 μm) |
| | Pit Depth | 156 nm (130~195 nm) | 88 nm (78~98 nm) |
| | Track Pitch | 1.6 μm (1.5–1.7 μm) | 0.56 μm (0.55~0.57 μm) |
| | Reflectance | at least 70% | at least 40%   15~40% |
| Condition for Reproduction | Spot Diameter | 1.5 μm (1.4~1.6 μm) | 0.70 μm (0.65–0.75 μm) |
| | Numerical Aperture | 0.45 (0.42~0.48) | 0.60 (0.55~0.65) |
| | Wavelength | 780 nm (765~795 nm) | 480 nm (400~550 nm) |

[Embodiment 21]

The optical pickup device in accordance with Embodiment 21 of the present invention is capable of compatible reproduction of a CD-R and the high density DVD. Spec. values and conditions for reproduction of the CD-R and the high density DVD are shown in Table 4.

TABLE 4

| | Type | CD | High Density DVD |
|---|---|---|---|
| Spec. Value | Substrate thickness of reading surface side | 1.2 mm (1.1~1.3 mm) | 0.6 mm (0.55~0.65 mm) |
| | Shortest pit length | 0.83 μm (0.8~0.9 μm) | 0.30 μm (0.20~0.40 μm) |
| | Pit Depth | 156 nm (130~195 nm) | 88 nm (78~98 nm) |
| | Track Pitch | 1.6 μm (1.5–1.7 μm) | 0.56 μm (0.55~0.57 μm) |
| | Reflectance | 60~70% | at least 40%   15~40% |
| Condition for Reproduction | Spot Diameter | 1.5 μm (1.4~1.6 μm) | 0.70 μm (0.65–0.75) |
| | Numerical Aperture | 0.45 (0.40~0.50) | 0.60 (0.55~0.65) |
| | Wavelength | 780 nm (765~795 nm) | 480 nm (400~550 nm) |

The spec. values and the conditions for reproduction of the CD-R are basically the same as those of Table 1. However, reflectance is at least 60% according to Table 1, while reflectance is 60 to 70% according to Table 4. Spec. values and conditions for reproduction for the high density DVD are the same as those of Tables 2 and 3.

[Embodiment 22]

Figure 41:
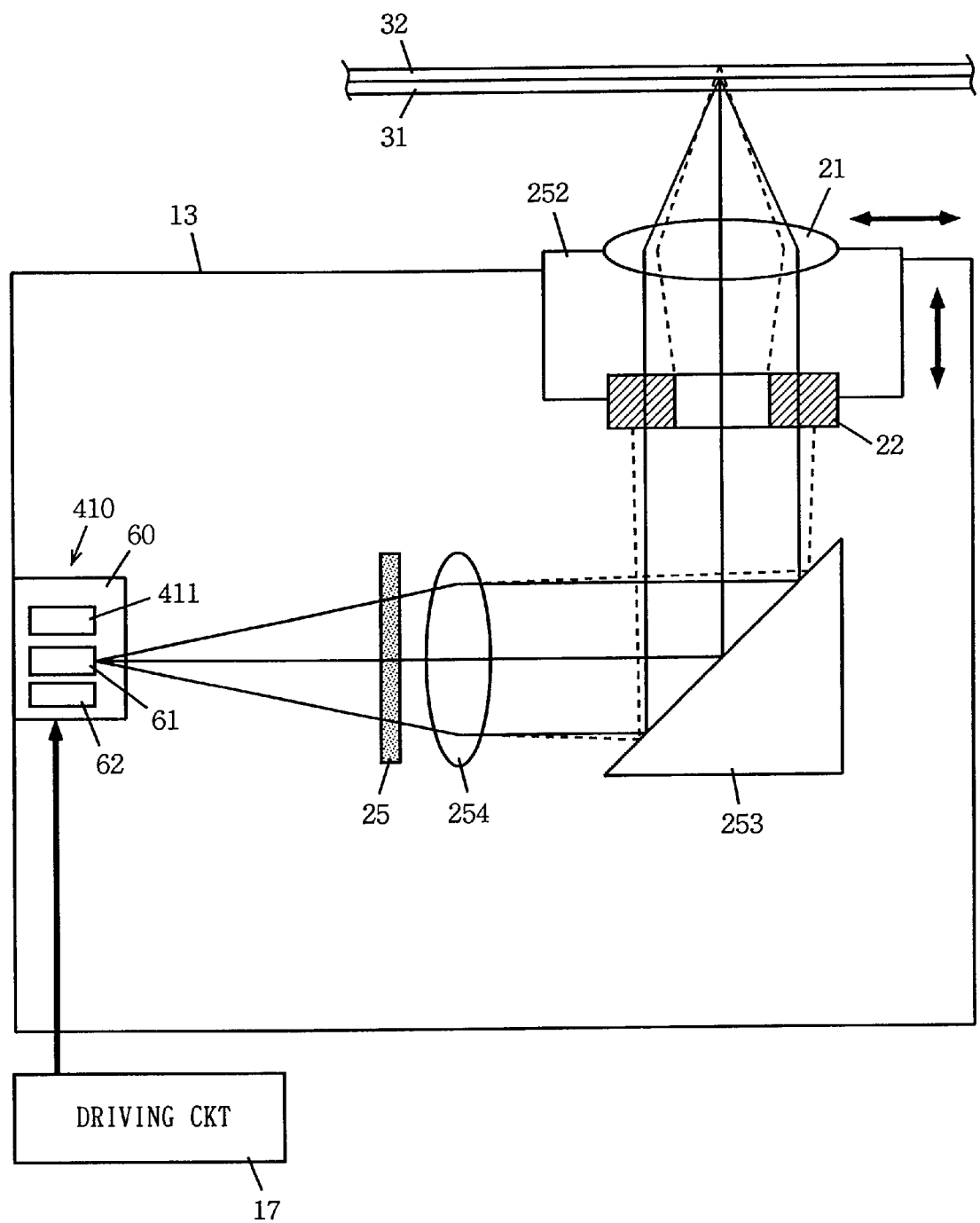
FIG. 41 shows arrangement of the optical system of the optical pickup device in accordance with Embodiment 22 of the present invention.

Referring to FIG. 41, optical pickup device 13 in accordance with Embodiment 22 of the present invention is characterized in that a photodetector 411 is provided with a semiconductor element 410 formed integrally with laser elements 61 and 62. In optical pickup device 13, hologram 25 is provided immediately preceding collimator lens 254 in the similar manner as Embodiment 3 shown in FIG. 11. Different from the above described embodiments, optical pickup device 13 is not provided with a beam splitter such as a half mirror. Semiconductor element 410 includes a cell plate 60, laser element 61 provided on substrate 60 for generating the laser beam having the wavelength of 635 nm, laser element 62 provided adjacent to laser element 61 on substrate 60 for generating the laser beam having the wavelength of 780 nm, and photodetector 411 formed on substrate 60 apart from laser elements 61 and 62, for detecting first order diffraction beam provided by hologram 25 out of beams reflected from the optical disc. When hologram 25 is provided, 0th order diffraction beam provided by hologram 25 of the beams reflected from the optical disc returns to laser element 61 or 62. However, the first order diffraction beam reaches a position different from laser elements 61 and 62. Photodetector 411 is provided at such position.

Figure 42:
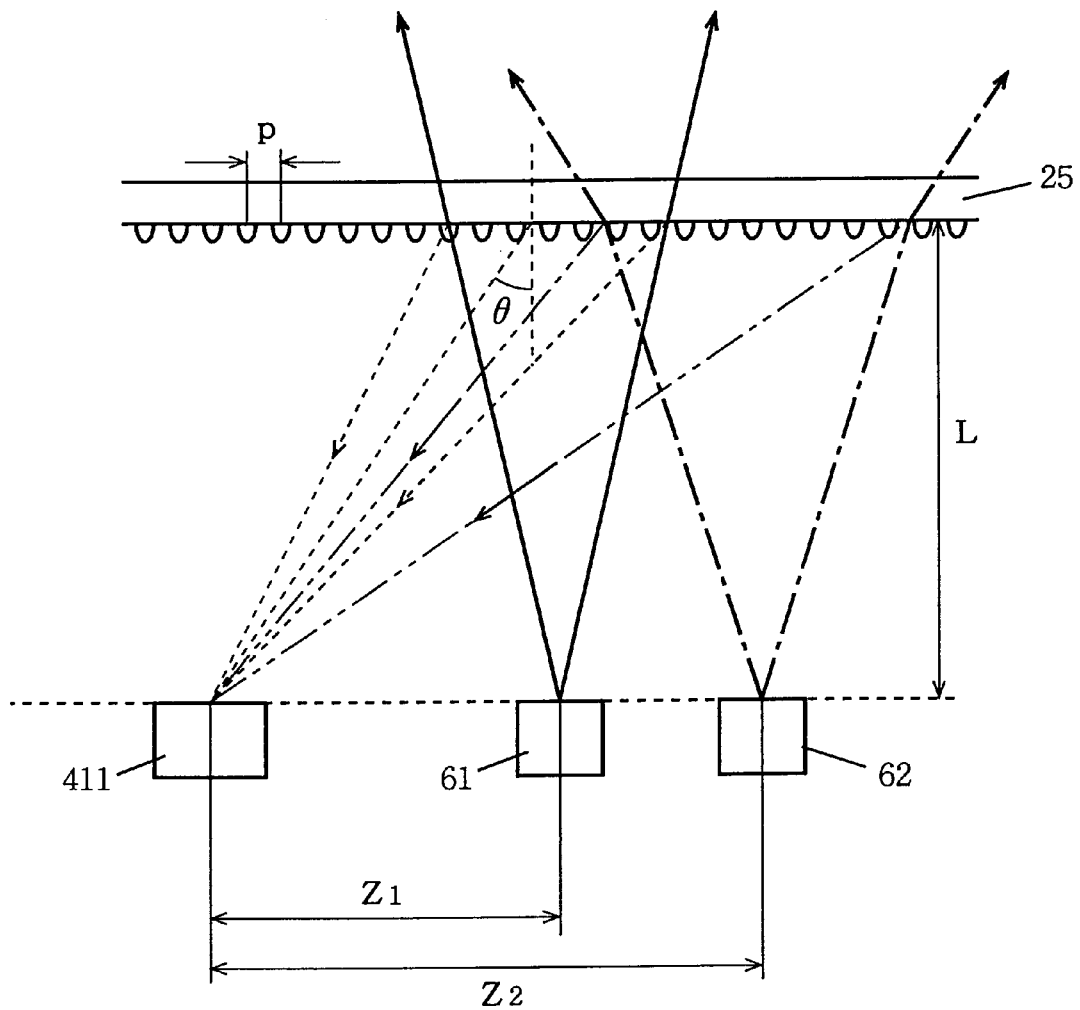
FIG. 42 is an illustration showing positional relation between the hologram, the laser element and the photodetector of FIG. 41.

Here, let us represent pitch of the recessed and protruded structure of hologram 25 as P (μm), distance from laser elements 61, 62 and photodetector 411 to hologram 25 as L(mm), distance from laser element 61 to photodetector 411 as Z1(mm) and distance from laser element 62 to photodetector 411 as Z2(mm), as shown in FIG. 42. In order for the first order diffraction beam to reach photodetector 411, the parameters P, L, Z1 and Z2 mentioned above have only to satisfy any of the relations shown in Table 5 below.

TABLE 5

| Hologram pitch: p ($\mu$m) | Distance Between Light Emitting Point and Hologram: L (mm) | Distance Between 635 nm Beam Emitting Point and Detecting Point: $Z_1$ (mm) | Distance Between 780 nm Beam Emitting Point and Detecting Point: $Z_2$ (mm) | $Z_2 - Z_1$ (mm) |
|---|---|---|---|---|
| 1.5 | 3 | 1.4018 | 1.8263 | 0.4245 |
| 2 | 3 | 1.0044 | 1.2706 | 0.2662 |
| 3 | 5 | 1.0828 | 1.3463 | 0.2635 |
| 3 | 4.5 | 0.9745 | 1.2116 | 0.2371 |
| 3 | 4 | 0.8663 | 1.0770 | 0.2107 |
| 5 | 5 | 0.6402 | 0.7897 | 0.1490 |
| 3 | 15 | 3.2486 | 4.0389 | 0.7903 |
| 4 | 15 | 2.4118 | 2.9823 | 0.5704 |
| 4.5 | 15 | 2.1381 | 2.6399 | 0.5019 |
| 5 | 15 | 1.9205 | 2.3690 | 0.4484 |
| 8 | 15 | 1.1944 | 1.4695 | 0.2750 |
| 10 | 10 | 0.6360 | 0.7823 | 0.1464 |
| 10 | 15 | 0.9544 | 1.1735 | 0.2192 |
| 10 | 8 | 0.5090 | 0.6259 | 0.1169 |
| 8 | 10 | 0.7963 | 0.9797 | 0.1834 |
| 5 | 10 | 1.2804 | 1.5793 | 0.2989 |
| 3 | 10 | 2.1657 | 2.6926 | 0.5268 |

When laser element 61 generates laser beam having the wavelength of 48 nm and laser element 62 generates laser beam having the wavelength of 635 nm, the parameters P, L, Z1 and Z2 have only to satisfy any of the relations shown in Table 6 below.

When laser element 61 generates the laser beam having the wavelength of 480 nm and laser element 62 generates the laser beam having the wavelength of 780 nm, the parameters P, L, Z1 and Z2 have only to satisfy any of the relations shown in Table 7 below.

TABLE 6

| Hologram pitch: p ($\mu$m) | Distance Between Light Emitting Point and Hologram: L (mm) | Distance Between 480 nm Beam Emitting Point and Detecting Point: $Z_1$ (mm) | Distance Between 635 nm Beam Emitting Point and Detecting Point: $Z_2$ (mm) | $Z_2 - Z_1$ (mm) |
|---|---|---|---|---|
| 12 | 10 | 0.4003 | 0.5299 | 0.130 |
| 12 | 15 | 0.6005 | 0.7949 | 0.1944 |
| 12 | 8 | 0.3203 | 0.4239 | 0.104 |
| 10 | 15 | 0.7208 | 0.9544 | 0.2340 |
| 10 | 10 | 0.4805 | 0.6363 | 0.1558 |
| 10 | 8 | 0.3844 | 0.5090 | 0.1246 |
| 10 | 7 | 0.3364 | 0.4454 | 0.1090 |
| 8 | 15 | 0.9016 | 1.1944 | 0.2930 |
| 8 | 10 | 0.6011 | 0.7963 | 0.1952 |
| 8 | 8 | 0.4808 | 0.6370 | 0.1562 |
| 8 | 6 | 0.3606 | 0.4778 | 0.1172 |
| 5 | 15 | 1.4467 | 1.9206 | 0.4740 |
| 5 | 10 | 0.9645 | 1.2804 | 0.3159 |
| 5 | 5 | 0.4822 | 0.6402 | 0.1580 |
| 5 | 3 | 0.2893 | 0.3841 | 0.0948 |
| 3 | 8 | 1.2967 | 1.7326 | 0.4359 |
| 3 | 5 | 0.8104 | 1.0829 | 0.2724 |
| 3 | 3 | 0.4863 | 06497 | 0.1634 |

TABLE 7

| Hologram pitch: p (μm) | Distance Between Light Emitting Point and Hologram: L (mm) | Distance Between 480 nm Beam Emitting Point and Detecting Point: $Z_1$ (mm) | Distance Between 780 nm Beam Emitting Point and Detecting Point: $Z_2$ (mm) | $Z_2 - Z_1$ (mm) |
|---|---|---|---|---|
| 12 | 10 | 0.4003 | 0.6514 | 0.251 |
| 12 | 15 | 0.6005 | 0.9771 | 0.3766 |
| 12 | 5 | 0.2002 | 0.3257 | 0.1255 |
| 10 | 15 | 0.7208 | 1.1746 | 0.4528 |
| 10 | 10 | 0.4805 | 0.7824 | 0.3019 |
| 10 | 8 | 0.3844 | 0.6259 | 0.2415 |
| 10 | 5 | 0.2403 | 0.3912 | 0.1509 |
| 8 | 15 | 0.9016 | 1.4695 | 0.5679 |
| 8 | 10 | 0.6011 | 0.9797 | 0.3786 |
| 8 | 5 | 0.3005 | 0.4898 | 0.1893 |
| 5 | 8 | 0.7716 | 1.2635 | 0.4919 |
| 5 | 5 | 0.4822 | 0.7897 | 0.3075 |
| 5 | 3 | 0.2893 | 0.4738 | 0.1845 |
| 5 | 2 | 0.1929 | 0.3159 | 0.1230 |

According to Embodiment 22, since photodetector 411 for detecting first order diffraction beam provided by hologram 25 out of beams reflected from the optical disc is provided adjacent to laser elements 61, 62, it is not necessary to provide a beam splitter such as a half mirror to detect the reflected beam.

[Embodiment 23]

Figure 43:
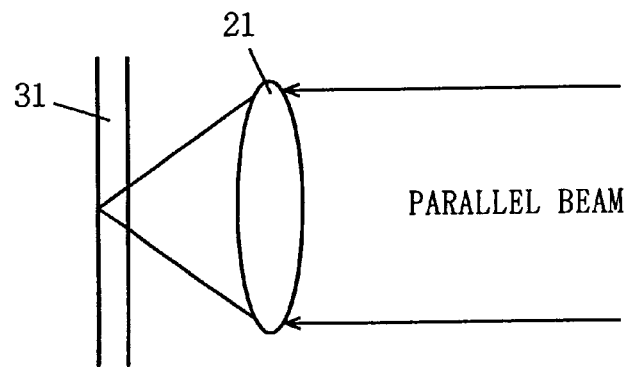
FIG. 43 is an illustration showing an optical system in which a parallel beam is focused on a recording surface of a CD by an objective lens.
Figure 44:
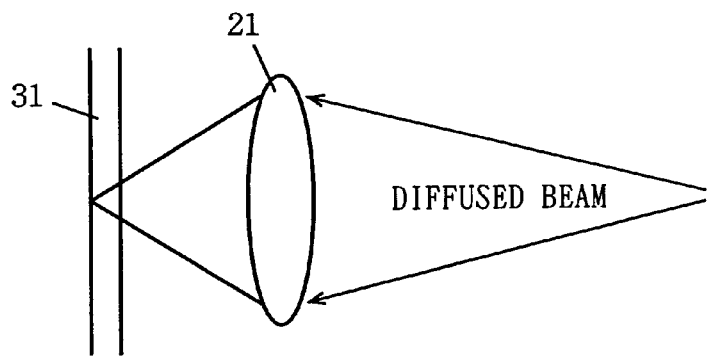
FIG. 44 is an illustration showing an optical system in which a diffused beam is converged on a recording surface of a CD by an objective lens.

As described above, objective lens 21 is designed such that it focuses the laser beam having the wavelength of 635 nm on the recording surface of the DVD. Therefore, when objective lens 21 focuses parallel laser beam having the wavelength of 780 nm on the recording surface of the CD as shown in FIG. 43, there is generated wave aberration. However, when diffusion beam (position of light source: finite) such as shown in FIG. 44 is incident on objective lens 21 rather than the aforementioned parallel beam (position of light source:infinite), the generated wave aberration is reduced.

Figure 45:
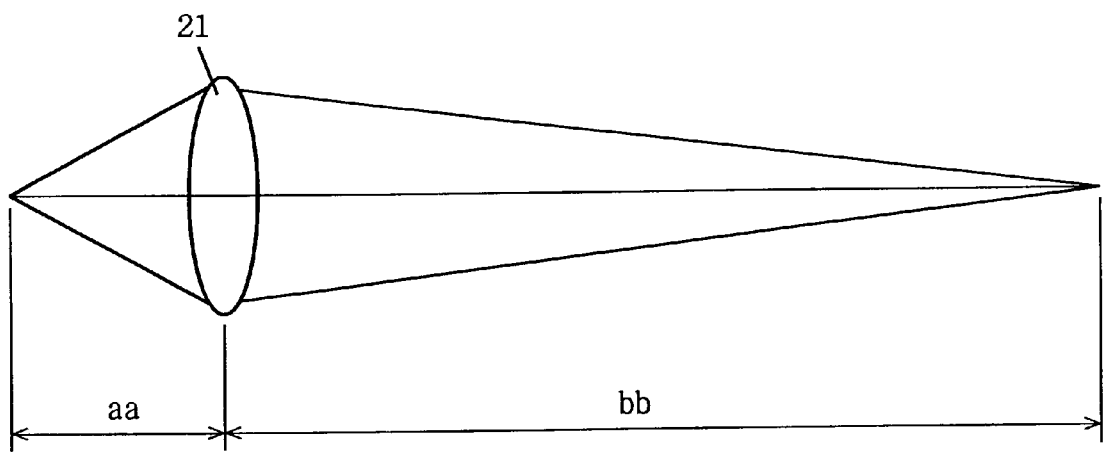
FIG. 45 is an illustration showing magnification of the objective lens.
Figure 46:
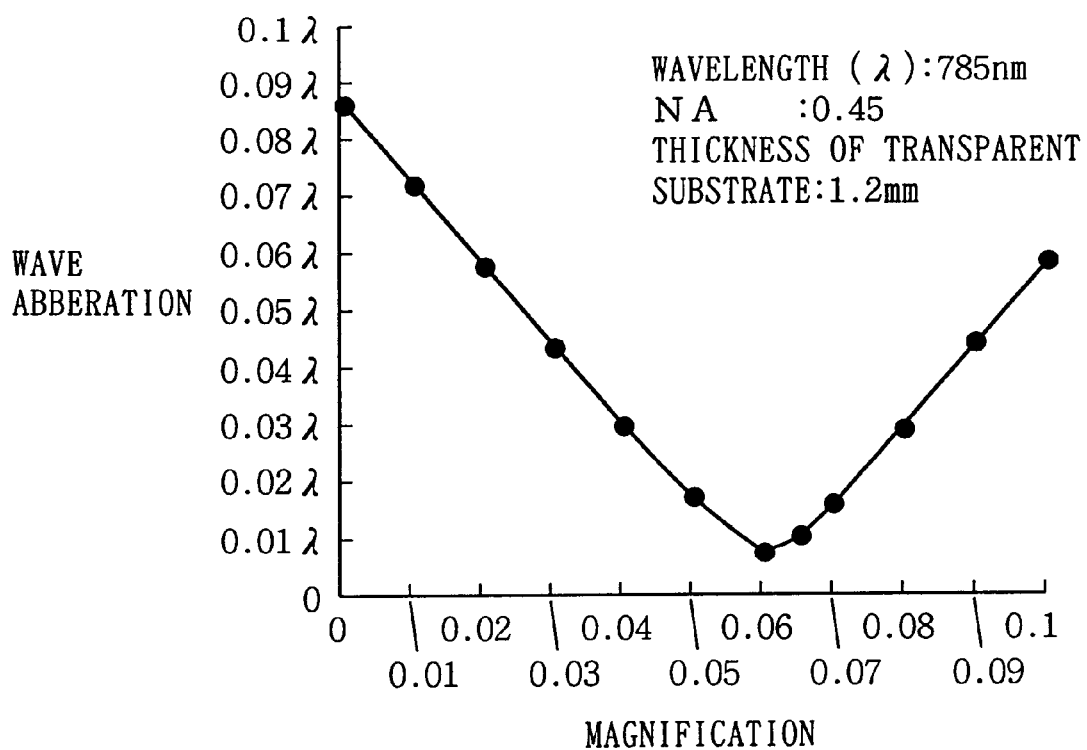
FIG. 46 shows relation between magnification of the objective lens and wave aberration.

When we represent distance from the light source (semiconductor laser 23) to objective lens 21 as bb, and distance from objective lens 21 to the point of focus (recording surface of the optical disc) as aa, then magnification of objective lens 21 is represented as aa/bb, as shown in FIG. 45. Relation between magnification aa/bb of objective lens 21 and the wave aberration is shown in FIG. 46. Here, simulation is performed under the condition that the laser beam having the wavelength of 785 nm (λ) is focused on the recording surface of a CD having transparent substrate 31 having the thickness of 1.2 mm, and the effective numerical aperture of objective lens 21 is set to 0.45.

Considering the relation between the magnification and the wave aberration shown in FIG. 46, it is understood that in order to minimize the wave aberration, semiconductor laser 23 should be arranged at such a position where magnification is about 0.06.

Figure 47:
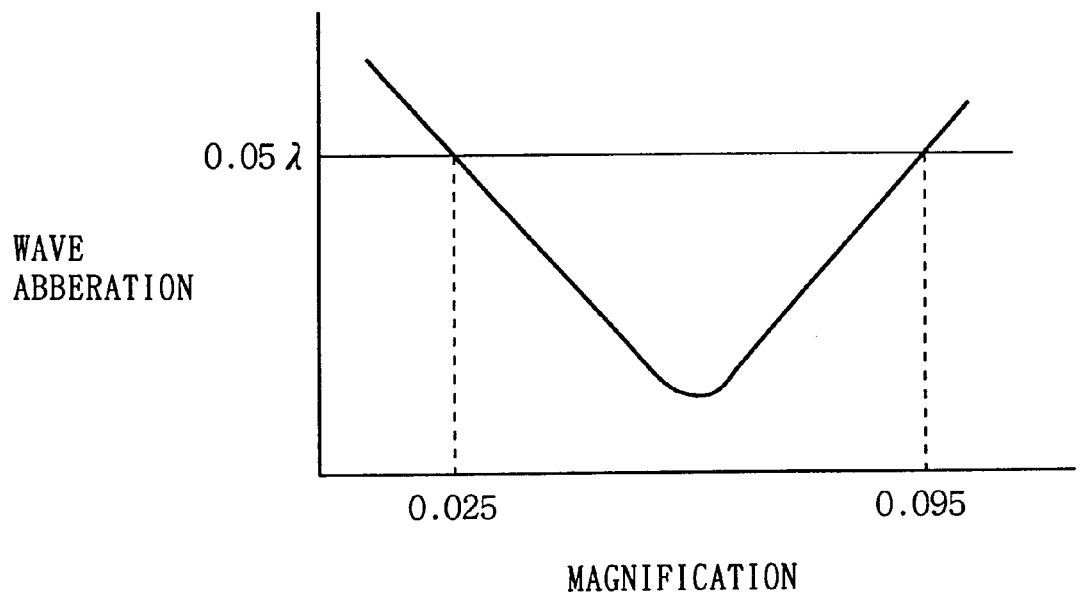
FIG. 47 is a partial enlargement of FIG. 46.

The wave aberration of not higher than 0.05λ (=785 nm) does not cause any practical problem. Therefore, the magnification of objective lens 21 preferably used is in the range of 0.025 to 0.095, as shown in FIG. 47.

Assuming that the diffusion beam is incident on objective lens 21, when objective lens 21 moves in the tracking direction by tracking control, the laser beam enters objective lens 21 obliquely. As a result, reproduction characteristic is deteriorated than when parallel beam enters objective lens 21.

Figure 48:
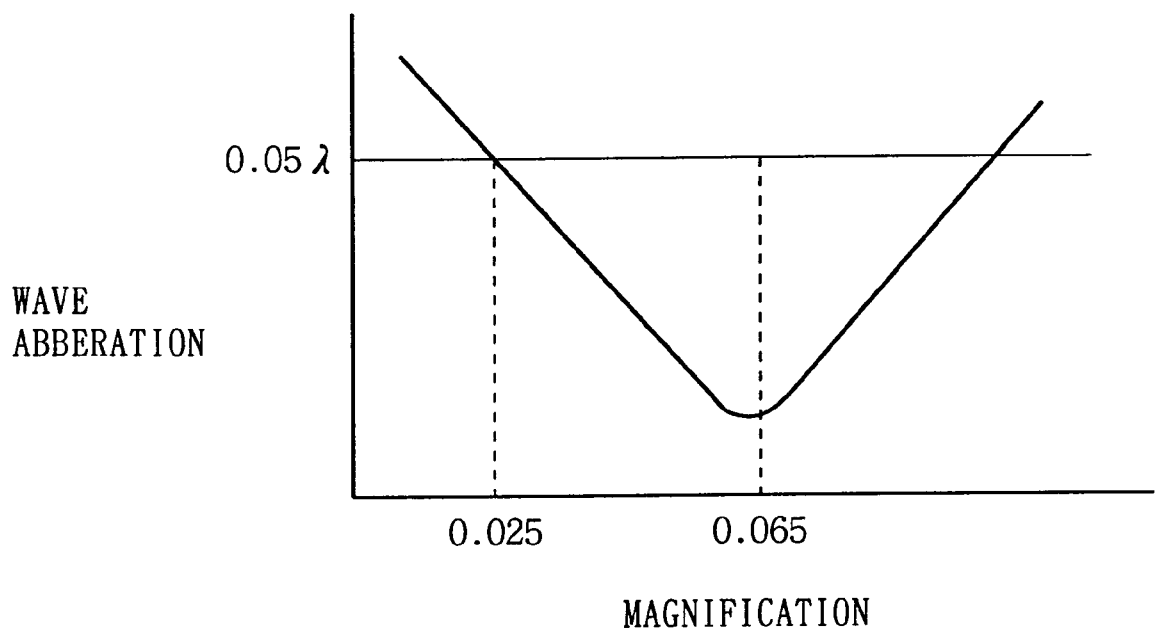
FIG. 48 is a partial enlargement of FIG. 46.

The laser beam entering objective lens 21 will be closer to parallel when distance bb is made larger, that is, when magnification aa/bb is made smaller. Deterioration of reproduction characteristic when objective lens 21 moves can be suppressed in this manner. Therefore, the preferable magnification of objective lens 21 used is in the range of 0.025 to 0.065, as shown in FIG. 48.

[Embodiment 24]

Figure 49:
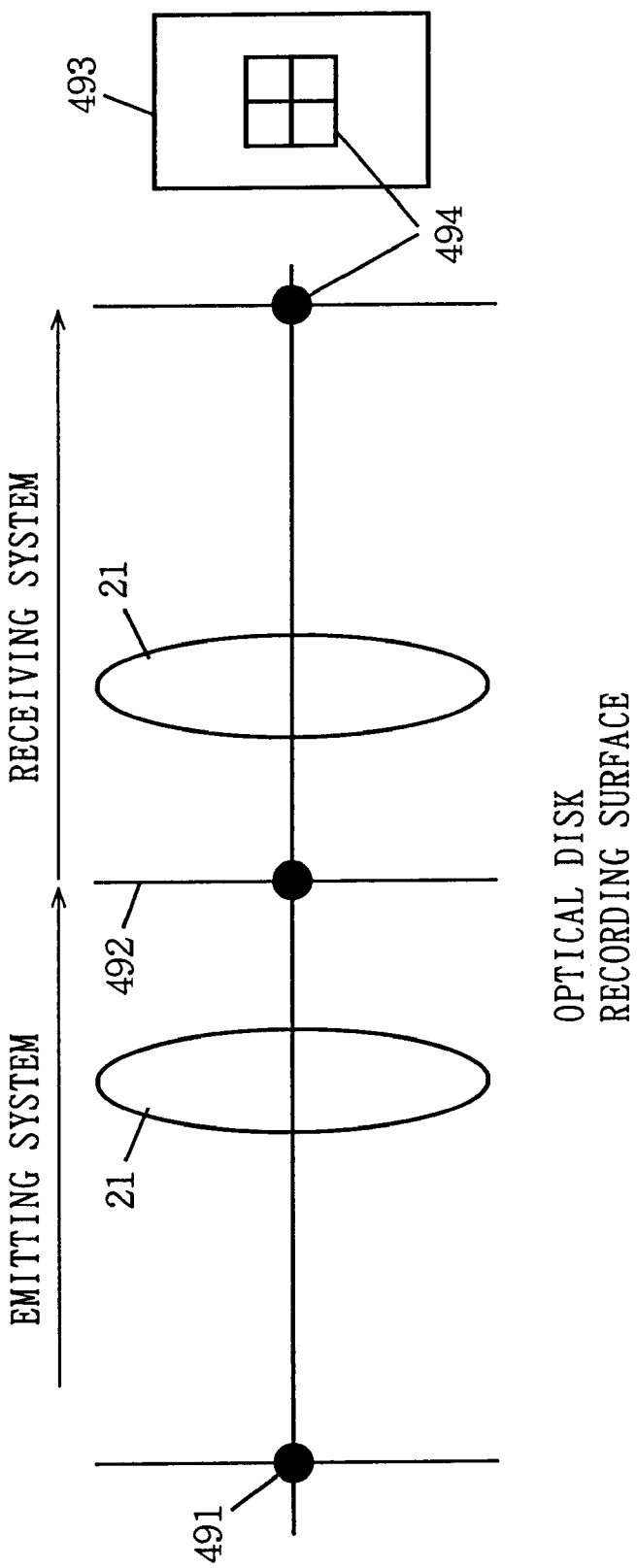
FIG. 49 shows, divided into an emitting system and a receiving system, an optical system of a typical optical pickup device using laser beam of single wavelength.

FIG. 49 shows the optical system of a typical optical pickup device using laser beam of a single wavelength, separated into an emitting system and a receiving system. The laser beam from a laser element 491 reaches a recording surface 492 of the optical disc through objective lens 21. The beam reflected from recording surface 492 of the optical disc again passes through objective lens 21 and reaches a photodetector 493. A light receiving portion 494 of photodetector 493 is divided into four for focusing control.

Figure 50:
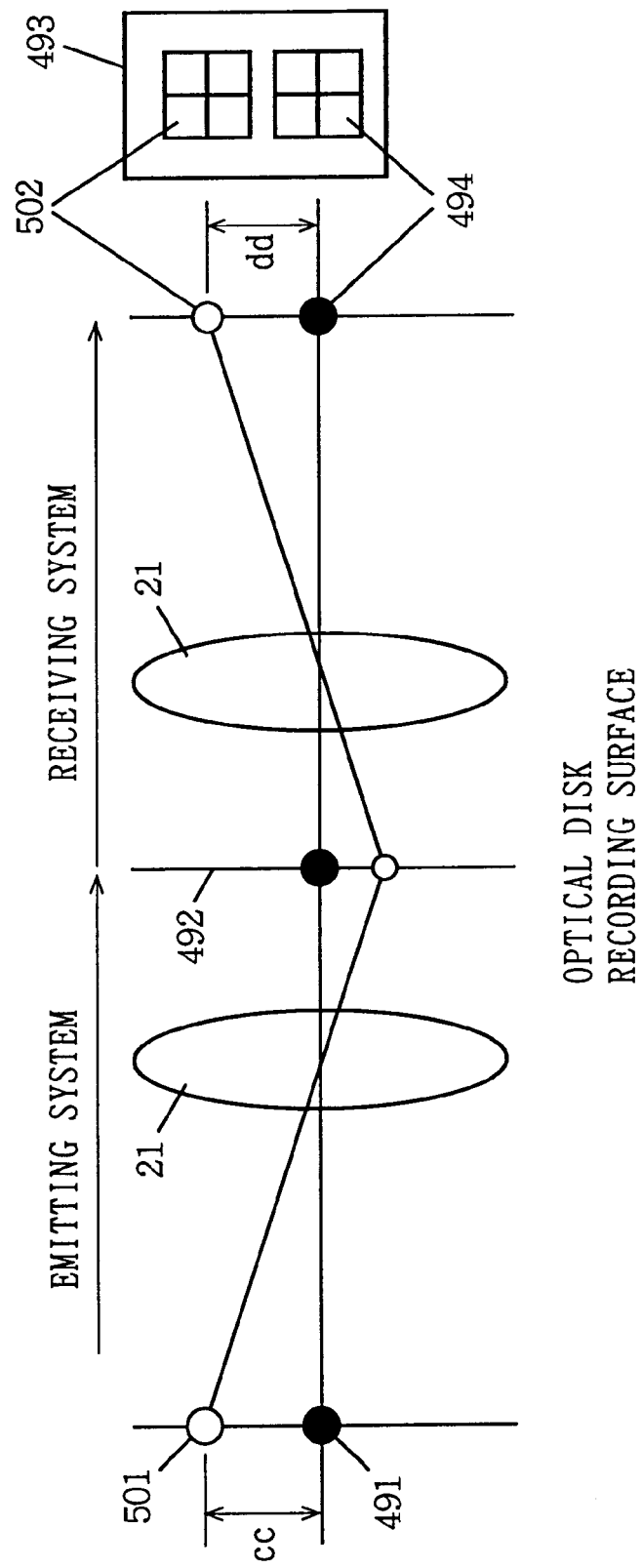
FIG. 50 shows, divided into an emitting system and receiving system, an optical system of an optical pickup device using laser beam of two wavelengths.

FIG. 50 shows the optical system of an optical pickup device using laser beams of two wavelengths, separated into an emitting system and a receiving system. A laser element 501 generating the laser beam having the wavelength of 780 nm is arranged space by a distance cc from laser element 491 generating the laser beam having the wavelength of 635 nm. Therefore, the laser beam having the wavelength of 780 nm reaches a position different from the laser beam having the wavelength of 635 nm.

It may be possible to provide a light receiving portion 502 for the beam having the wavelength of 780 nm spaced by a distance dd from light receiving portion 494 for the laser beam having the wavelength 635 nm. However, it is very difficult to arrange laser elements 491 and 501 at highly accurate distance cc. Therefore, there would be a problem that even when light receiving portions 494 and 502 are arranged spaced by the distance dd, the laser beams are not accurately focused on the centers of light receiving portions 494 and 502.

Embodiment 24 of the present invention was made to solve the above described problem, and its object is to provide an optical pickup device having one photodetector for detecting two laser beams of different wavelengths.

Referring to FIG. 51, optical pickup device 13 in accordance with Embodiment 24 of the present invention is characterized in that it is provided with a hologram plate 510 with wavelength selectivity between photodetector 28 and collimator lens 254. Hologram plate 510 with wavelength selectivity is movable in the direction of the optical axis.

Hologram plate 510 with wavelength selectivity has recesses and protrusion formed as stripes, as shown in FIG.

52(a). Hologram plate 510 with wavelength selectivity transmits the laser beam having the wavelength of 635 nm directly without diffraction, while it transmits the laser beam having the wavelengths of 780 nm diffracted in a prescribed direction, as shown in FIG. 52(b).

Figure 53:
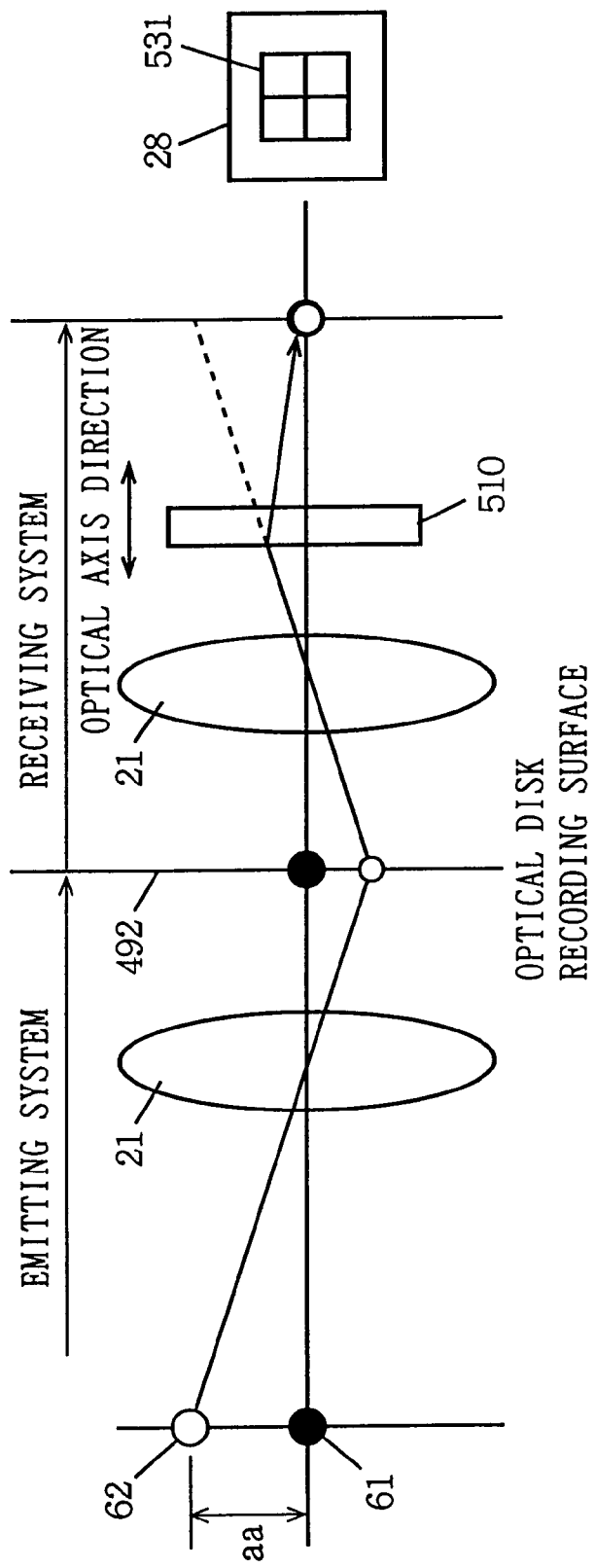
FIG. 53 shows, divided into an emitting system and a receiving system, the optical system of the optical pickup device shown in FIG. 51.

FIG. 53 shows the optical system of optical pickup device 13 shown in FIG. 51 separated into an emission system and a receiving system. The laser beam having the wavelengths of 635 nm from laser element 61 passes through objective lens 21 and is focused on recording surface 492 of the optical disc. The beam reflected from recording surface 492 of the optical disc passes through objective lens 21 and reaches hologram plate 510 with wavelength selectivity. Since the laser beam having the wavelength of 635 nm is not diffracted by hologram plate 510 with wavelength selectivity but is transmitted as it is, the laser beam is focused on the center of light receiving portion 531 which is divided into four, in photodetector 28. The laser beam having the wavelength of 780 nm from laser element 62 passes through objective lens 21 and is focused on recording surface 492 of the optical disc. The beam reflected from recording surface 492 of the optical disc passes through objective lens 21 and reaches hologram plate 510 with wavelength selectivity. The laser beam having the wavelength of 780 nm is diffracted inward by hologram plate 510 with wavelength selectivity. Hologram plate 510 with wavelength selectivity is arranged at a specific position in the direction of the optical axis so that the first order inward diffracted beam of the laser beam having the wavelength of 780 nm is focused on the center of light receiving portion 531.

According to Embodiment 24, even when the distance aa between laser elements 61 and 62 varies, it is possible to focus not only the laser beam having the wavelength of 635 nm but also the laser beam having the wavelength of 780 nm on the center of the light receiving portion 531 by appropriately adjusting the position of hologram plate 510 in the direction of the optical axis. Therefore, only one light receiving portion 531 commonly incorporating light receiving portions 494 and 502 shown in FIG. 50 has to be provided.

In the optical pickup device, the position of photodetector 28 may be adjusted so that the laser beam having the wavelength of 635 nm is focused on the center of light receiving portion 531 and thereafter, the position of hologram plate 510 may be adjusted so that the laser beam having the wavelength of 780 nm is focused on the center of the light receiving portion 531.

[Embodiment 25]

Figure 54:
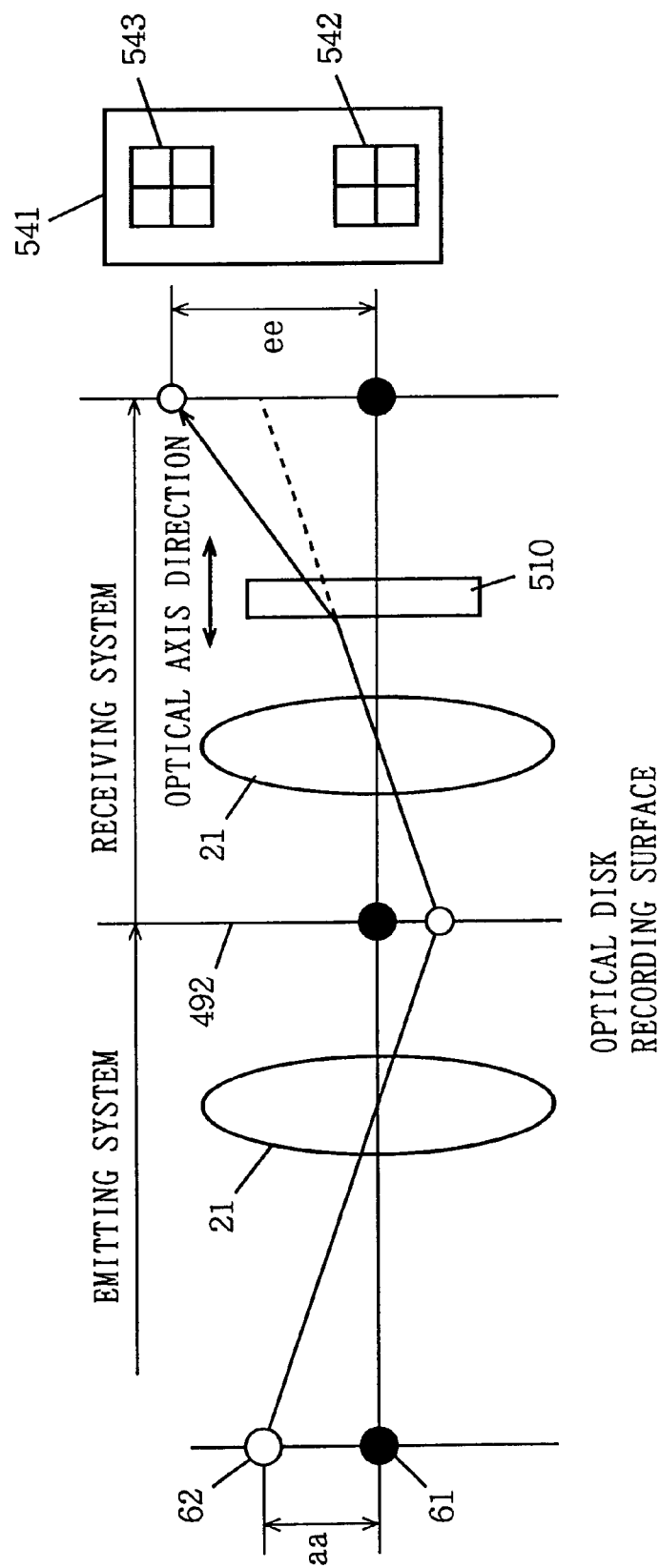
FIG. 54 shows, divided into an emitting system and a receiving system, the optical system of the optical pickup device in accordance with Embodiment 25 of the present invention.

Though only one light receiving portion 531 is provided in photodetector 28 in accordance with Embodiment 24 shown in FIG. 53, in Embodiment 25 shown in FIG. 54, a light receiving portion 542 for the wavelength of 635 nm and a light receiving portion 543 for the wavelength of 780 nm are provided separately in a photodetecting portion 541. The laser beam having the wavelength of 635 nm from laser element 61 is focused on the center of light receiving portion 542 as in Embodiment 24 described above. The laser beam having the wavelength of 780 nm from laser element 62 is diffracted outward by hologram plate 510 with wavelength selectivity. Hologram plate 510 with wavelength selectivity is arranged at a specific position in the direction of the optical axis so that the first order outward diffracted beam of the laser beam having the wavelength of 780 nm is focused on the center of light receiving portion 543.

[Embodiment 26]

Figure 55:
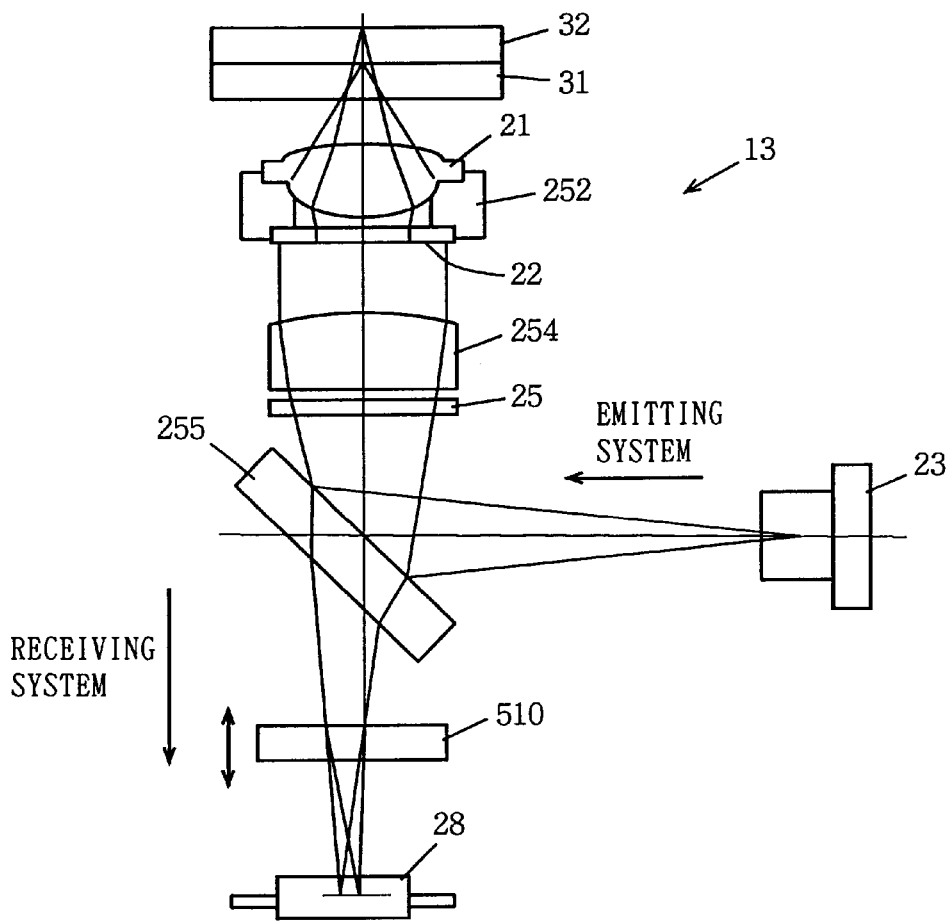
FIG. 55 shows arrangement of the optical system of the optical pickup device in accordance with Embodiment 26 of the present invention.

In optical pickup device 13 in accordance with Embodiment 26 shown in FIG. 55, a hologram plate 550 having polarization selectivity is arranged in place of hologram plate 510 with wavelength selectivity.

Figure 56A:
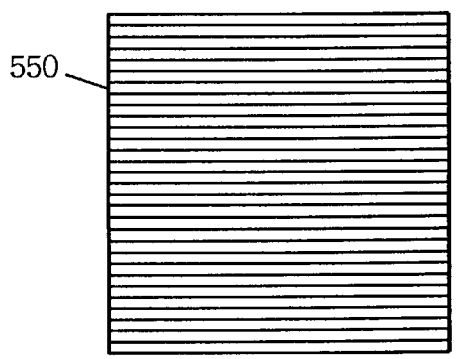
FIG. 56(a) is a plan view of the hologram plate with polarization selectivity shown in FIG. 55.
Figure 56B:
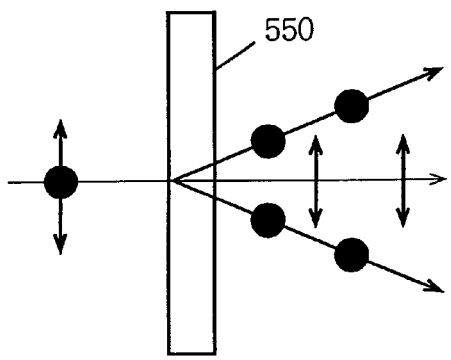
FIG. 56(b) is a side view showing the hologram plate with polarization selectivity together with its function.

Hologram plate 550 with polarization selectivity has a hologram pattern formed as stripes as shown in FIG. 56(a). Hologram plate 550 with polarization selectivity transmits the laser beam polarized in the longitudinal direction in the figure as shown in FIG. 56(b), while it diffracts in a prescribed direction the laser beam polarized in a direction perpendicular to the sheet, and transmits the beam.

Figure 57:
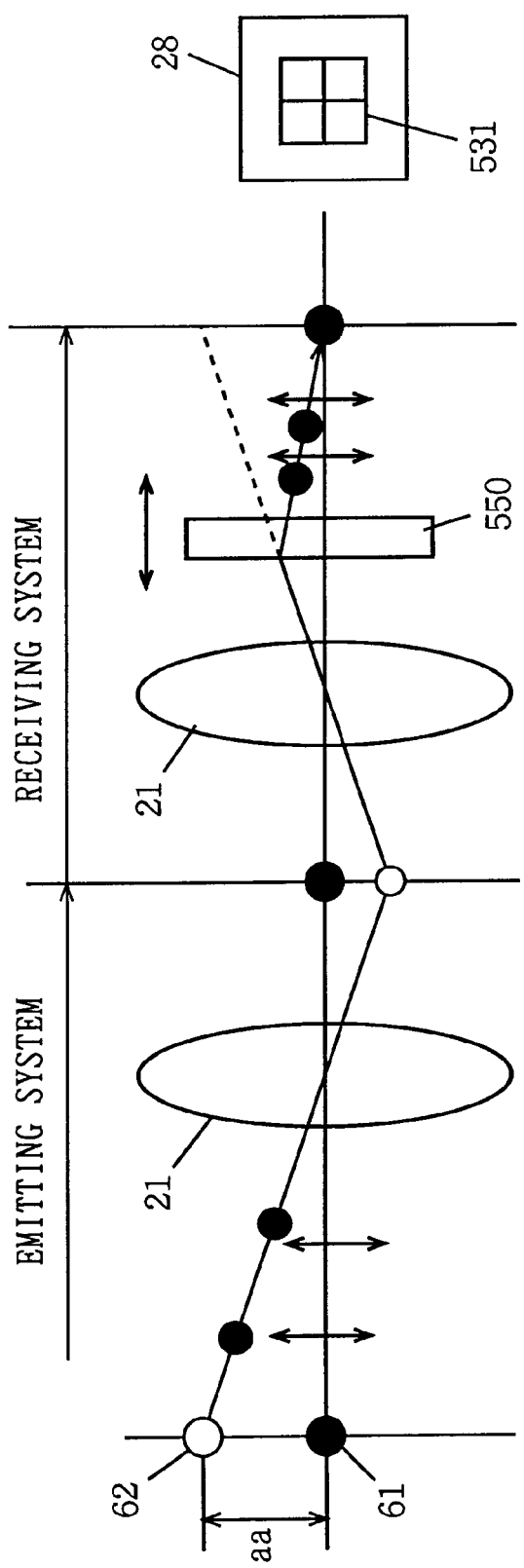
FIG. 57 shows, divided into an emitting system and a receiving system, the optical system of the optical pickup device shown in FIG. 55.

FIG. 57 shows the optical system of optical pickup device 13 shown in FIG. 55 separated in an emitting system and a receiving system. Since the laser beam having the wavelength of 635 nm from laser element 61 is polarized in the longitudinal direction in the figure, it is not diffracted but transmitted as it is through hologram plate 550 having polarization selectivity, and is focused on the center of light receiving portion 531 in photodetector 28. The laser beam having the wavelength of 780 nm from laser element 62 is polarized in the direction perpendicular to the sheet, and therefore it is diffracted inward by hologram plate 550 with polarization selectivity. Hologram plate 550 with polarization selectivity is arranged at a specific position in the direction of the optical axis so that first order inward diffracted beam of the laser beam having the wavelength of 780 nm is focused on the center of light receiving portion 531.

[Embodiment 27]

Figure 58:
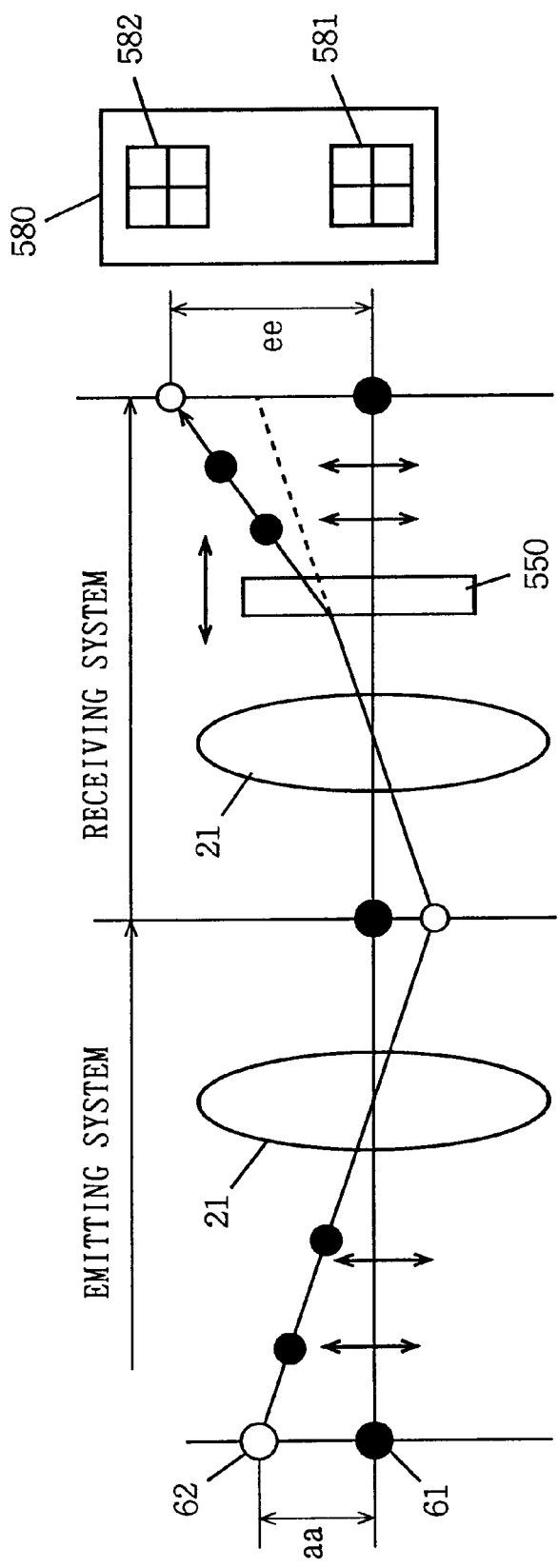
FIG. 58 shows, divided into an emitting system and a receiving system, the optical system of the optical pickup device in accordance with Embodiment 27 of the present invention.

Though only light receiving portion 531 is provided in photodetector 28 in accordance with Embodiment 26 shown in FIG. 57, a photodetector 580 in accordance with Embodiment 27 shown in FIG. 58 includes a light receiving portion 581 for the wavelength of 635 nm and a light receiving portion 582 for the wavelength of 780 nm arranged separately at a distance of ee.

The laser beam having the wavelength of 635 nm from laser element 61 is not diffracted but transmitted as it is through hologram plate 550 with polarization selectivity, and is focused on the center of light receiving portion 581. The laser beam having the wavelength of 780 nm from laser element 62 is diffracted outward by hologram plate 550 with polarization selectivity. Hologram plate 550 with polarization selectivity is arranged at a specific position in the direction of the optical axis so that the first order outward diffracted beam of the laser beam having the wavelength of 780 nm is focused on the center of light receiving portion 582.

[Embodiment 28]

Figure 59:
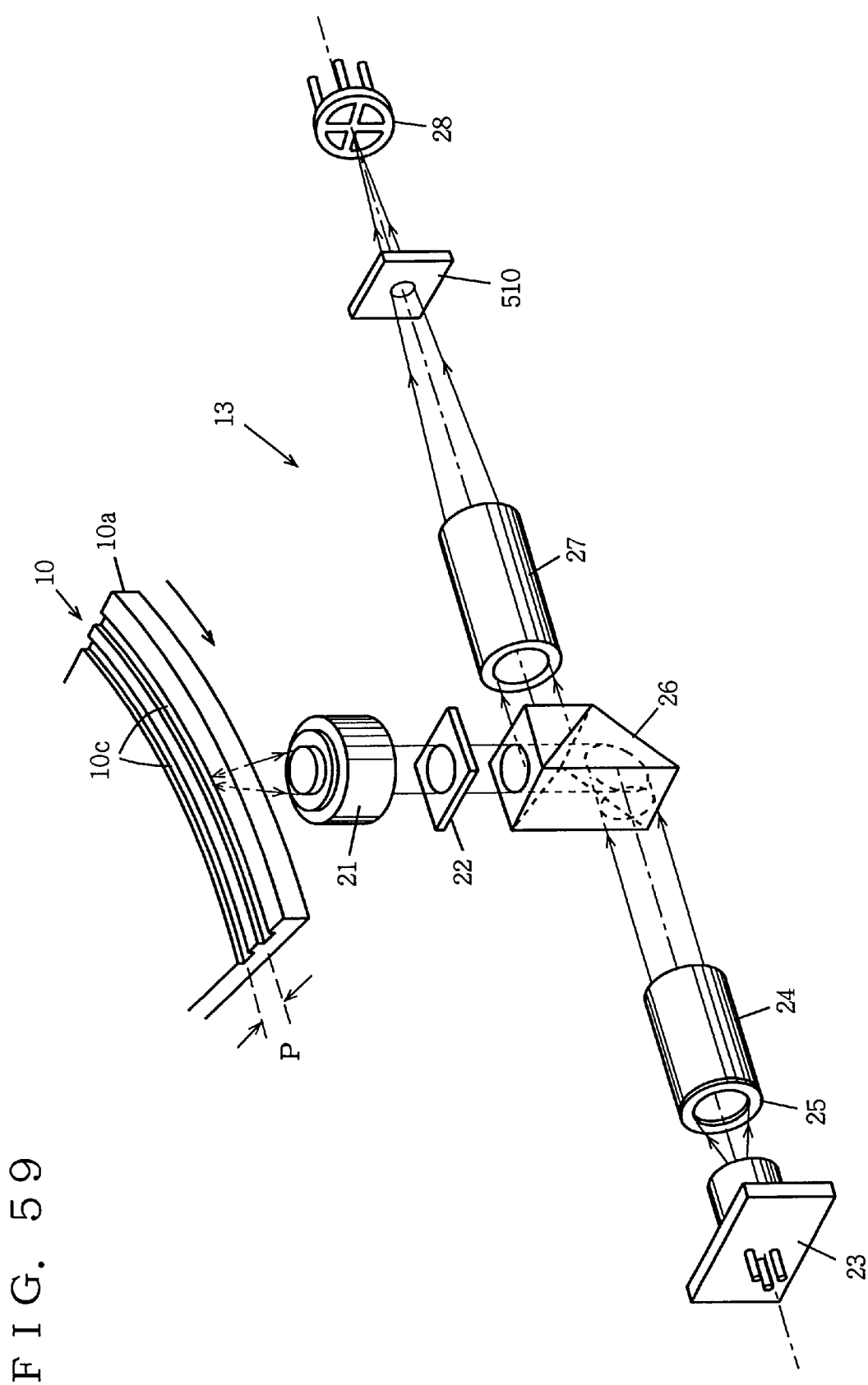
FIG. 59 is a perspective view showing the structure of the optical pickup device in accordance with Embodiment 28 of the present invention.

As shown in FIG. 59, optical pickup device 13 in accordance with Embodiment 28 employs the same optical system as that shown in FIG. 2, rather than the optical system shown in FIGS. 51 and 55. In optical pickup device 13, hologram plate 510 with wavelength selectivity is arranged between collimator lens 27 and photodetector 28. It goes without saying that hologram plate 550 with polarization selectivity may be arranged in place of hologram plate 510 with wavelength selectivity.

[Embodiment 29]

Figure 60:
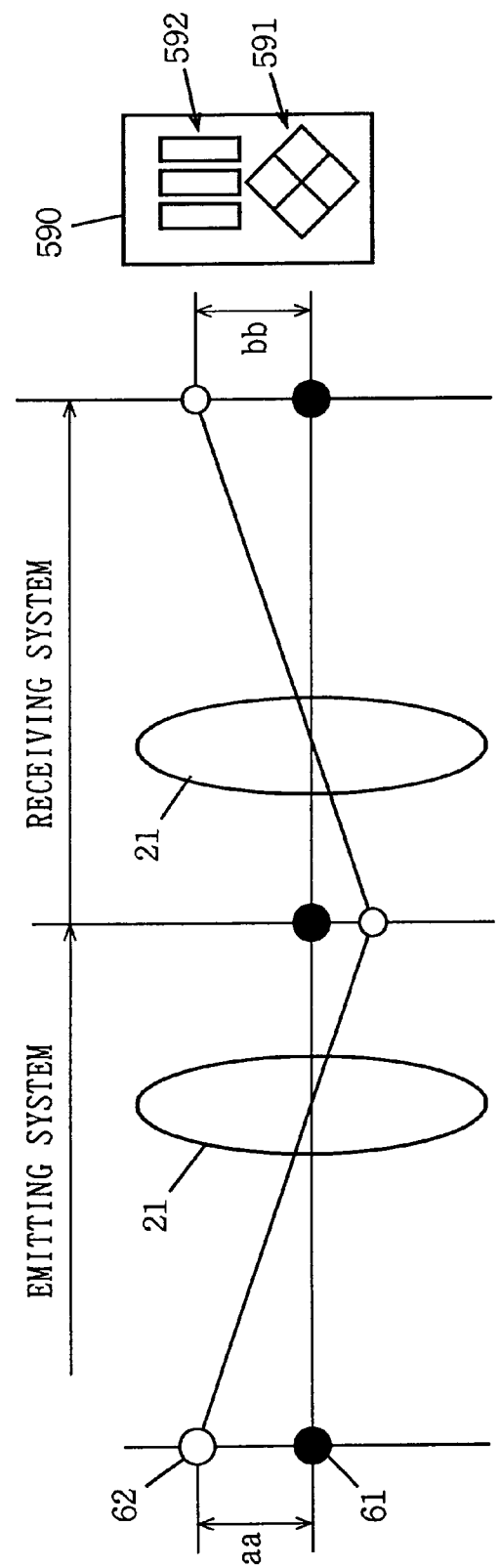
FIG. 60 shows, divided into an emitting system and a receiving system, the optical system of the optical pickup device in accordance with Embodiment 29 of the present invention.

In Embodiments 25 and 27 shown in FIGS. 54 and 58, light receiving portions 543 and 582 for the wavelength of 780 nm are of the same shape as light receiving portions 542 and 581 for the wavelength of 635 nm. However, in Embodiment 29 shown in FIG. 60, photodetector 590 is provided with a light receiving portion 591 for the wavelength of 635 nm and a light receiving portion 592 for the wavelength of 780 nm having a different shape.

Figure 61:
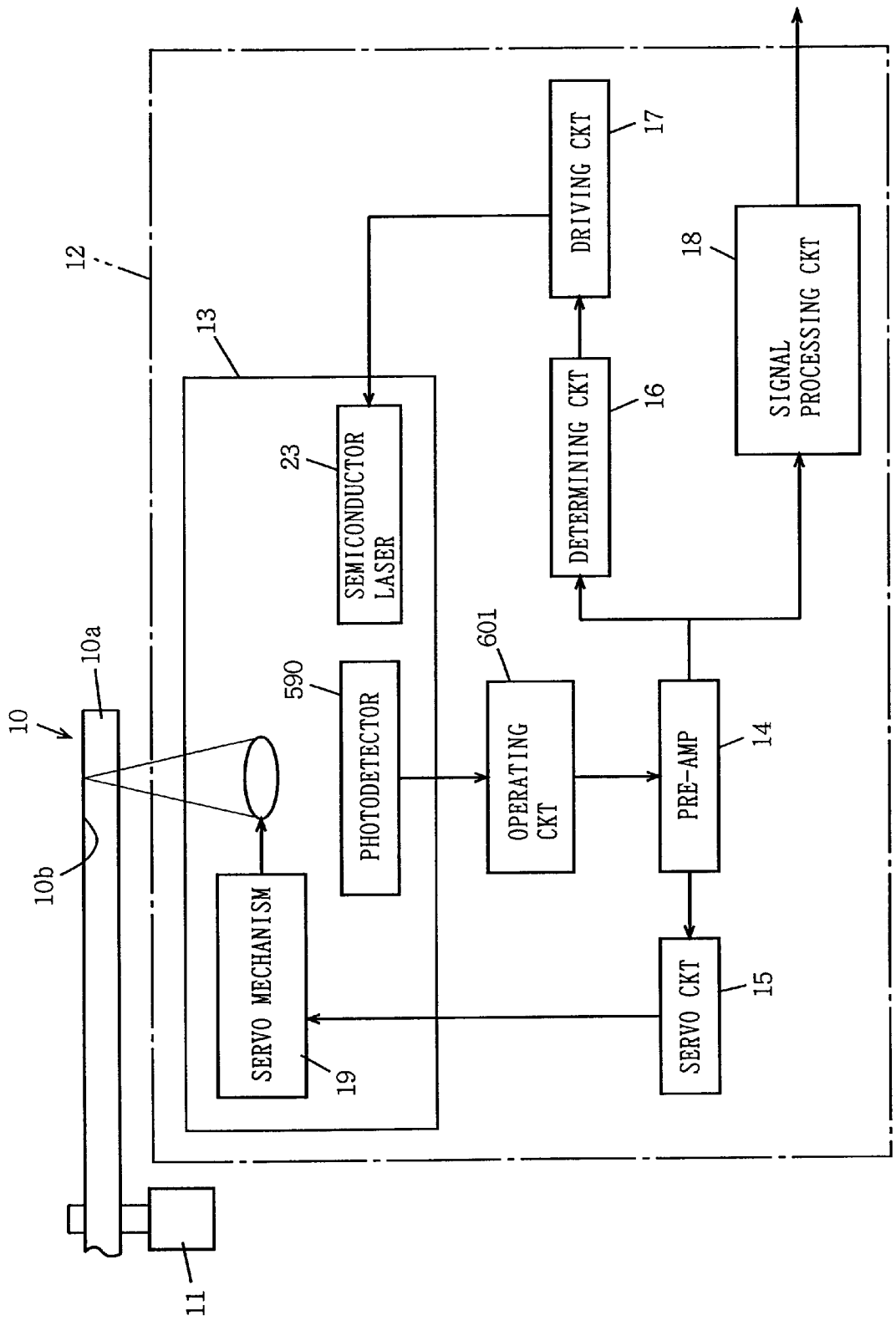
FIG. 61 is a block diagram showing a structure of an optical disc recording/reproducing apparatus including the optical pickup device shown in FIG. 60.
Figure 62:
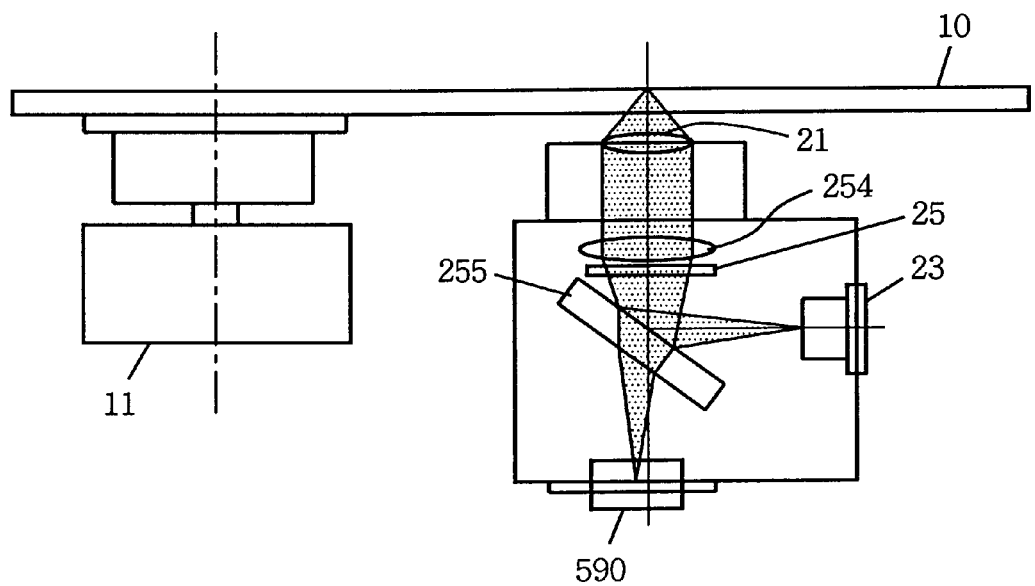
FIG. 62 is a side view showing the structure of the optical pickup device shown in FIGS. 60 and 61.

FIG. 61 is a block diagram showing a structure of optical disc recording/reproducing apparatus 12 including optical pickup device 13 in accordance with Embodiment 29. Referring to FIG. 61, optical disc recording/reproducing apparatus 12 includes an operation circuit 601 for generating a reproduction signal, a focus error signal and a tracking error signal based on a detection signal output from photodetector 590, and for supplying these signals to preamplifier 14.

Referring to FIGS. 61 an 62, optical pickup device 13 includes objective lens 21, servo mechanism 19, semiconductor laser 23, half mirror 255, collimator lens 254, hologram 25 and photodetector 590.

Figure 63:
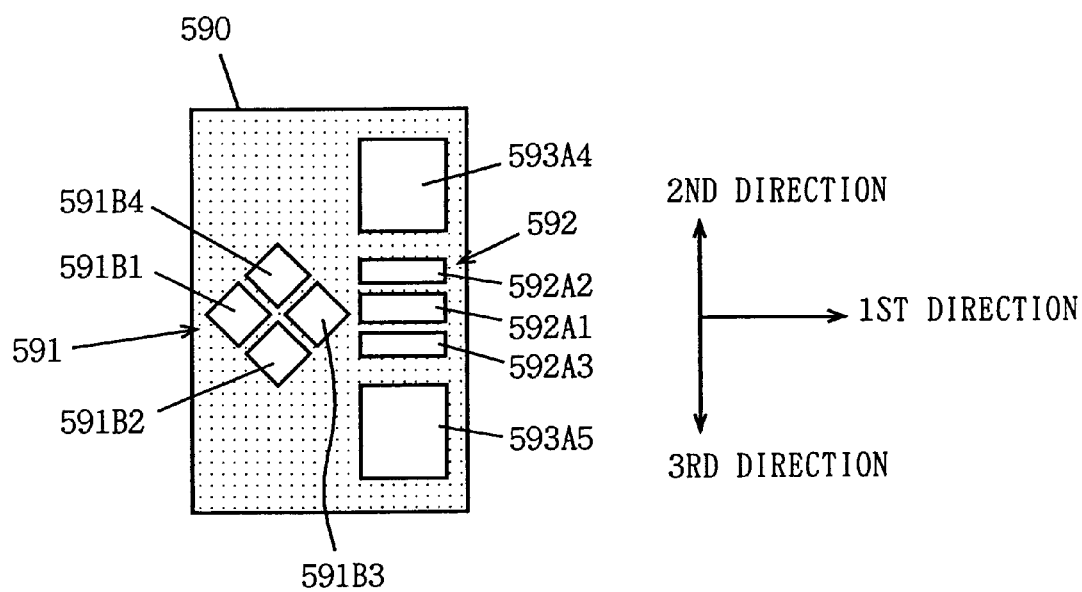
FIG. 63 is a plan view showing a structure of a photodetector shown in FIG. 62.

Optical pickup device 13 adopts astigmatism for focus servo, adopts one beam method for tracking servo of the DVD, and adopts three beam method for tracking servo for the CD. Therefore, as shown in FIG. 63, light receiving portion 591 receiving the laser beam having the wavelength of 635 nm for the DVD consists of four divided sensors 591B1 to 592B4. Light receiving portion 592 receiving the laser beam having the wavelength of 780 nm for the CD consists of three divided sensors 592A1 to 592A3. Light receiving portion 592 is arranged apart from light receiving portion 591 in a first direction. Each of divided sensors 592A1 to 592A3 has a rectangular shape extending in the first direction. Divided sensor 592A2 is arranged apart from divided sensor 592A1 in a second direction which is perpendicular to the first direction. Divided sensor 592A3 is apart from divided sensor 592A1 in a third direction which is opposite to the second direction. On both sides of light receiving portion 592 receiving a main laser beam, there are side sensors 593A4 and 593A5 receiving two sub laser beams, respectively.

Figure 64:
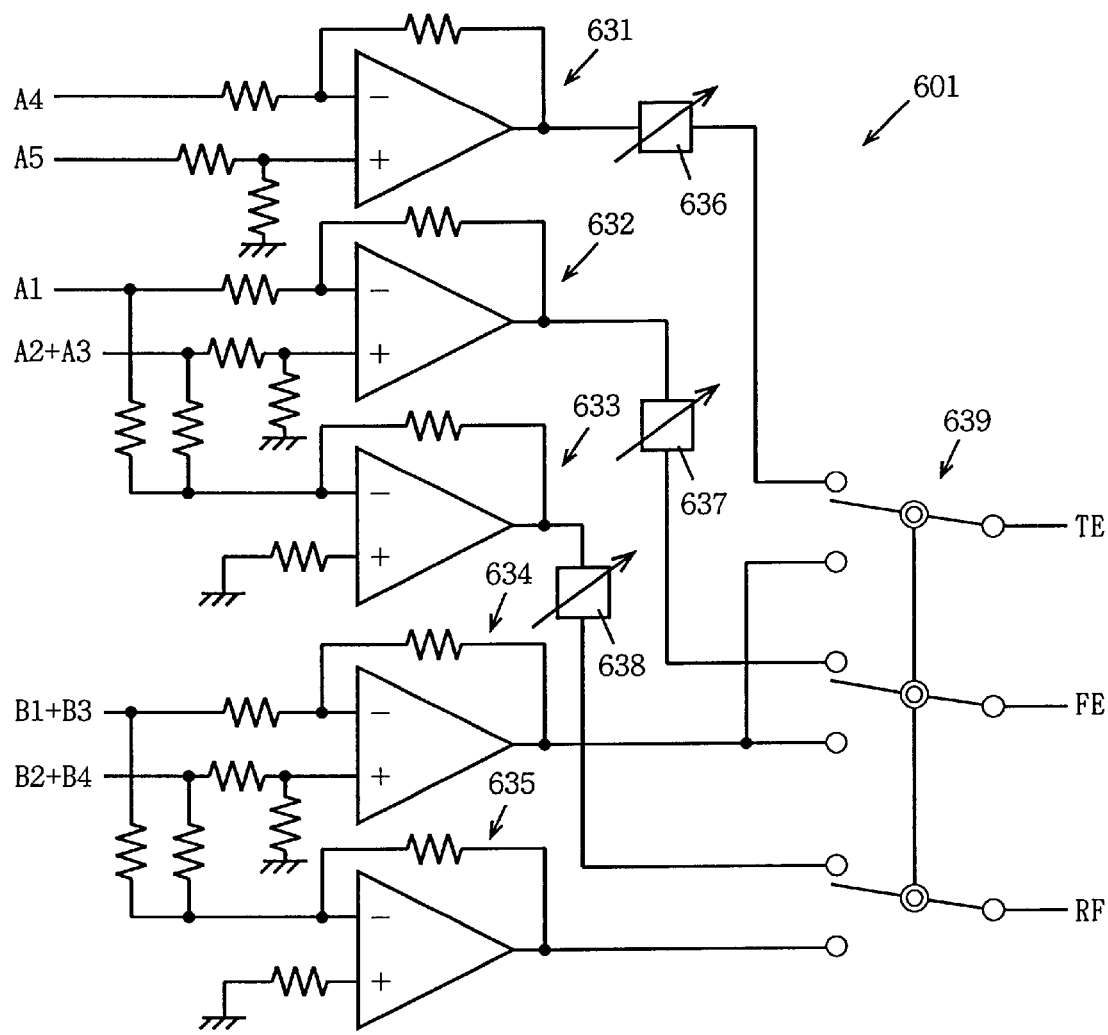
FIG. 64 is a circuit diagram showing the structure of an operation circuit shown in FIG. 61.

Operation circuit 601 includes, as shown in FIG. 64, a subtraction circuit 631 for calculating difference between a detection signal A5 from side sensor 593A5 and a detection signal A4 from side sensor 593A4 (A5–A4), a subtraction circuit 632 for calculating difference ((A2+A3)–A1) between a sum (A2+A3) of detection signals A2 and A3 from divided sensors 592A2 and 592A3 and a detection signal A1 from divided sensor 592A1, an adder circuit 633 for calculating a total sum of detection signals A1 to A3 (A1+A2+A3) from divided sensors 592A1 to 592A3, a subtractor circuit 634 for calculating a difference ((B2+B4)–(B1+B3)) between a sum (B2+B4) of detection signals B2 and B4 from divided sensors 591B2 and 591B4 and a sum (B1+B3) of detection signals B1 and B3 from divided sensors 591B1 and B591B3, an adder circuit 635 for calculating a total sum (B1+B2+B3+B4) of detection signals B1 to B4 from divided sensors 59 1B 1 to 591B4, and an amplifier 636 for amplifying an output signal from subtraction circuit 631 and having an adjustable gain, an amplifier 637 amplifying an output signal from subtraction circuit 632 and having an adjustable gain, an amplifier 638 amplifying an output signal from adder circuit 633 and having an adjustable gain, and a switching circuit 639 which is switched in response to a determination signal from determining circuit 16 shown in FIG. 61.

When a DVD is to be reproduced, the total sum (B1+B2+B3+B4) is output as a reproduction signal RF. The difference ((B2+B4)–(B1+B3)) is output as the focus error signal FE and tracking error signal TE.

When an CD is to be reproduced, the sum (A1+A2+A3) is output as the reproduction signal RF. The difference ((A2+A3)–A1) is output as the focus error signal FE. Further, the difference (A5–A4) is output as the tracking error signal TE.

The focus servo operation of the optical disc recording/reproducing apparatus will be described.

As shown in FIG. 65(*a*), when a DVD is reproduced, a beam spot 640 is formed on light receiving portion 591, and when a CD is reproduced, a beam spot 641 is formed on light receiving portion 592. In Embodiment 29, the position of beam spot 641 lies in the longitudinal direction in the figure in accordance with variation of distance aa between laser elements 61 and 62. However, since light receiving portion 592 consist of rectangular divided sensors 592A1 to 592A3 extending in the longitudinal direction in the figure, the reproduction signal RF, the focus error signal FE and the tracking error signal TE are generated appropriately even when beam spot 641 varies to some extent in the longitudinal direction of the figure.

When objective lens 21 comes closer to or goes away from optical disc 10, beam spots 640 and 641 are deformed in the lateral direction or longitudinal direction as shown in FIGS. 65(*b*) and (*c*). Accordingly, the focus error signal FE is generated and objective lens 21 is moved in the direction of the optical axis so that the laser beam is focused on the recording surface of optical disc 12.

The tracking servo operation of the optical disc recording/reproducing apparatus will be described.

When a DVD is reproduced, the tracking error signal TE is generated in the similar manner as the focus error signal FE described above, and objective lens 21 is moved in a direction perpendicular to the track, so that the laser beam is always directed to the track.

Meanwhile, when a CD is reproduced, when main laser beam and two sub laser beams are directed to optical disc 10, as shown in FIG. 66. One main laser beam is reflected from the signal recording surface of optical disc 10 and enters light receiving portion 592 of photodetector 590. The two sub laser beams are reflected by the signal recording surface of optical disc 10 and enters side sensors 593A4 and 593A5 of photodetector 590. Consequently, beam spot 641 is formed on light receiving portion 592, and beam spots 650 and 651 are formed on side sensors 593A4 and 593A5, respectively. When the position of the main laser beam directed to optical disc 10 deviates from the track, the tracking error signal TE is generated accordingly. Therefore, objective lens 21 is moved in the direction perpendicular to the track so that the track is always irradiated with the main laser beam.

According to Embodiment 29, divided sensors 592A1 to 592A3 for the CD arranged separate in the first direction from divided sensors 591B1 to 591B4 for the DVD each have a rectangular shape extending in the first direction. Therefore, even when the distance aa between laser elements 61 and 62 varies to some extent, accurate reproduction signal RF and accurate focus error signal FE can be generated.

[Embodiment 30]

Figure 67:
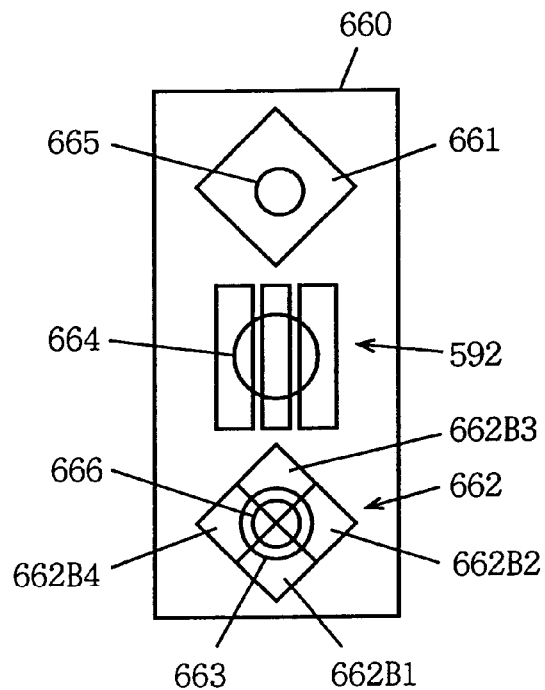
FIG. 67 is a plan view showing a structure of a photodetector in the optical pickup device in accordance with Embodiment 30 of the present invention.

As shown in FIG. 67, a photodetector 660 of the optical pickup device in accordance with Embodiment 30 includes light receiving portion 592 receiving the main laser beam for the CD, a light receiving portion 661 receiving one of the two sub laser beams for the CD and a light receiving portion 662 receiving the other one of the sub laser beams and the laser beam for the DVD. Light receiving portion 662 consist of four divided sensors 662A1 to 662A4 and shared for reproducing both DVD and CD.

When a DVD is reproduced, a beam spot 663 is formed on light receiving portion 662. The reproduction signal RF, the focus error signal FE and the tracking error signal TE are generated in the similar manner as described above. When a CD is reproduced, a main laser spot 664 is formed on light receiving portion 592, and sub laser spots 665 and 666 are formed on light receiving portions 661 and 662, respectively. The reproduction signal RF and the focus error signal FE are generated in the similar manner as described above. The tracking error signal TE is generated by calculation of difference between the detection signal from light receiving portion 661 and the total sum (B1+B2+B3+B4) of detection signals from divided sensors 662B1 to 662B4.

According to Embodiment 30, since light receiving portion 662 is commonly used for reproducing the DVD and the CD, the number of sensors can be reduced.

[Embodiment 31]

Though hologram 25 is separated from diffraction grating 130 with wavelength selectivity for changing the numerical aperture of objective lens 21 in the above described embodiments, hologram 22 and diffraction grating 130 with wavelength selectivity may constitute a single optical element.

Figure 68:
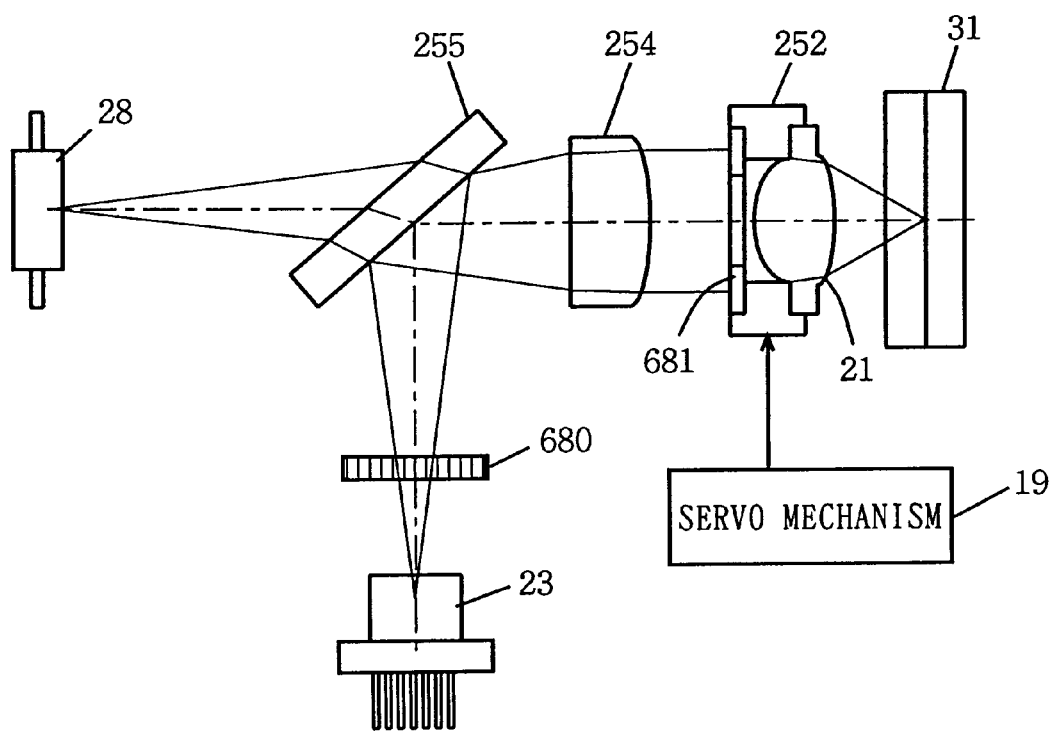
FIG. 68 shows arrangement of the optical system of the optical pickup device in accordance with Embodiment 31 of the present invention, together with an operation at the time of DVD reproduction.
Figure 69:
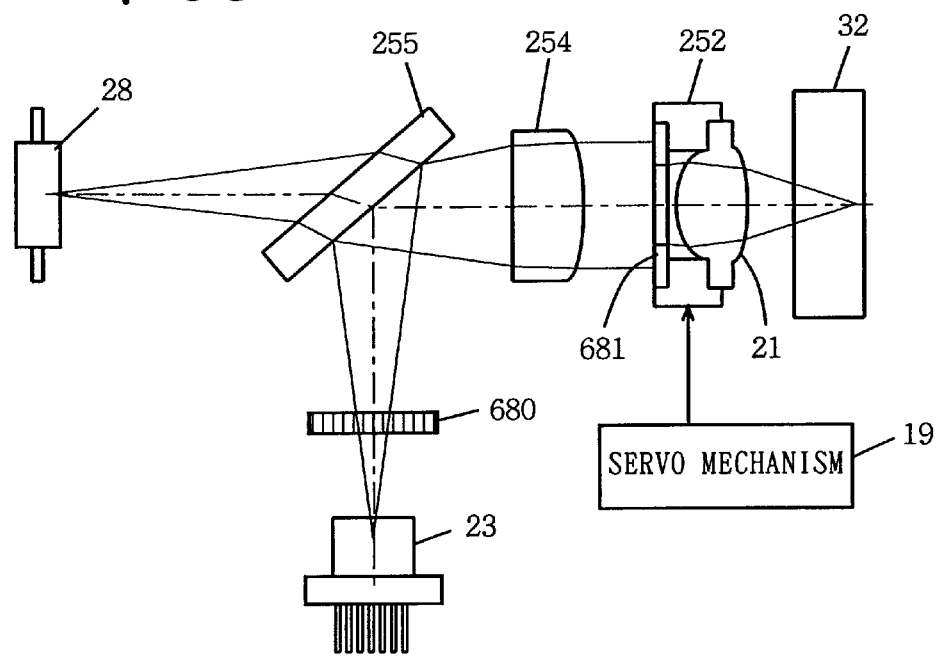
FIG. 69 shows arrangement of the optical system of the optical pickup device shown in FIG. 68 together with operation at the time of CD-R reproduction.
Figure 70A:
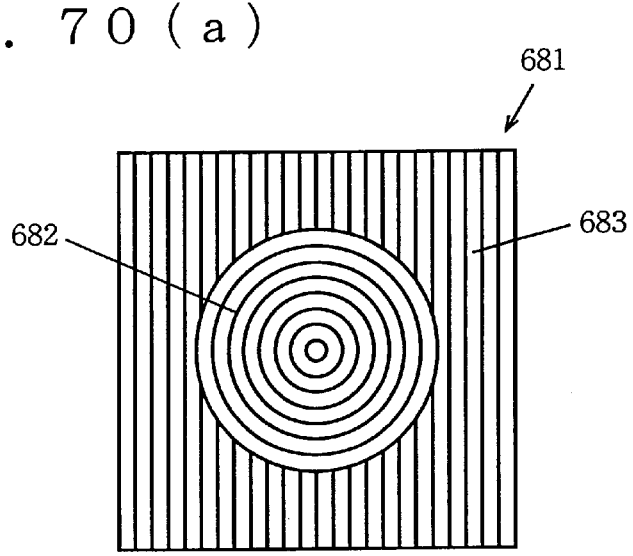
FIG. 70(a) is a front view showing a hologram aperture element of FIGS. 68 and 69.
Figure 70B:
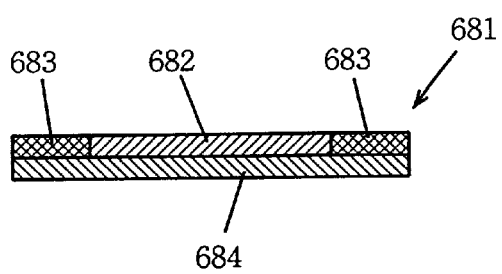
FIG. 70(b) is a cross section of the hologram aperture element shown in FIG. 70(a).

For example, the optical pickup device in accordance with Embodiment 31 shown in FIGS. 68 and 69 includes a hologram aperture element 681 having a hologram and a diffraction grating with wavelength selectivity formed integrally. Hologram aperture element 681 includes, as shown in FIGS. 70(a) and (b), a glass plate 684, a hologram 682 formed at the center of glass plate 684, and a diffraction grating 683 with wavelength selectivity formed on the periphery of hologram 682 on glass plate 684.

Figure 71:
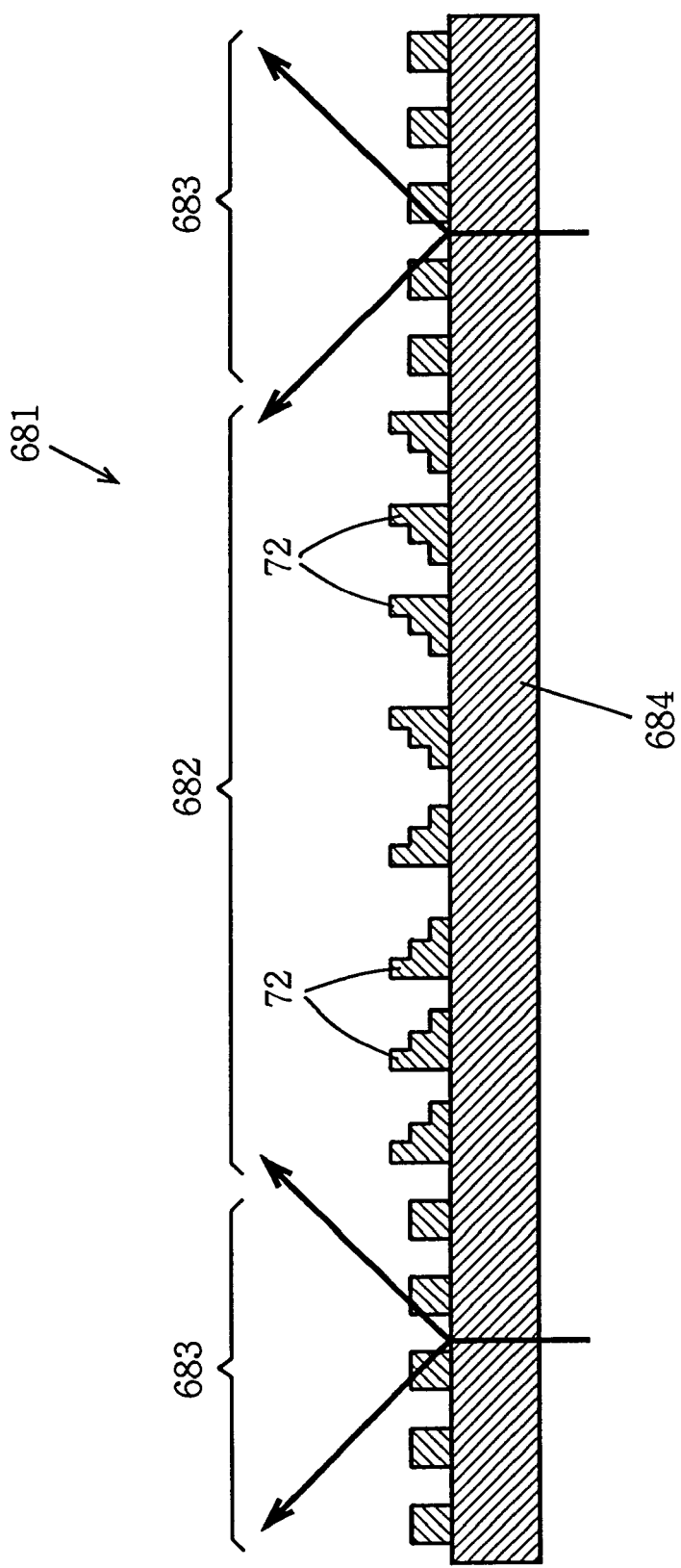
FIG. 71 is an enlarged cross section of the hologram aperture element shown in FIGS. 70(a) and 70(b).
Figure 72:
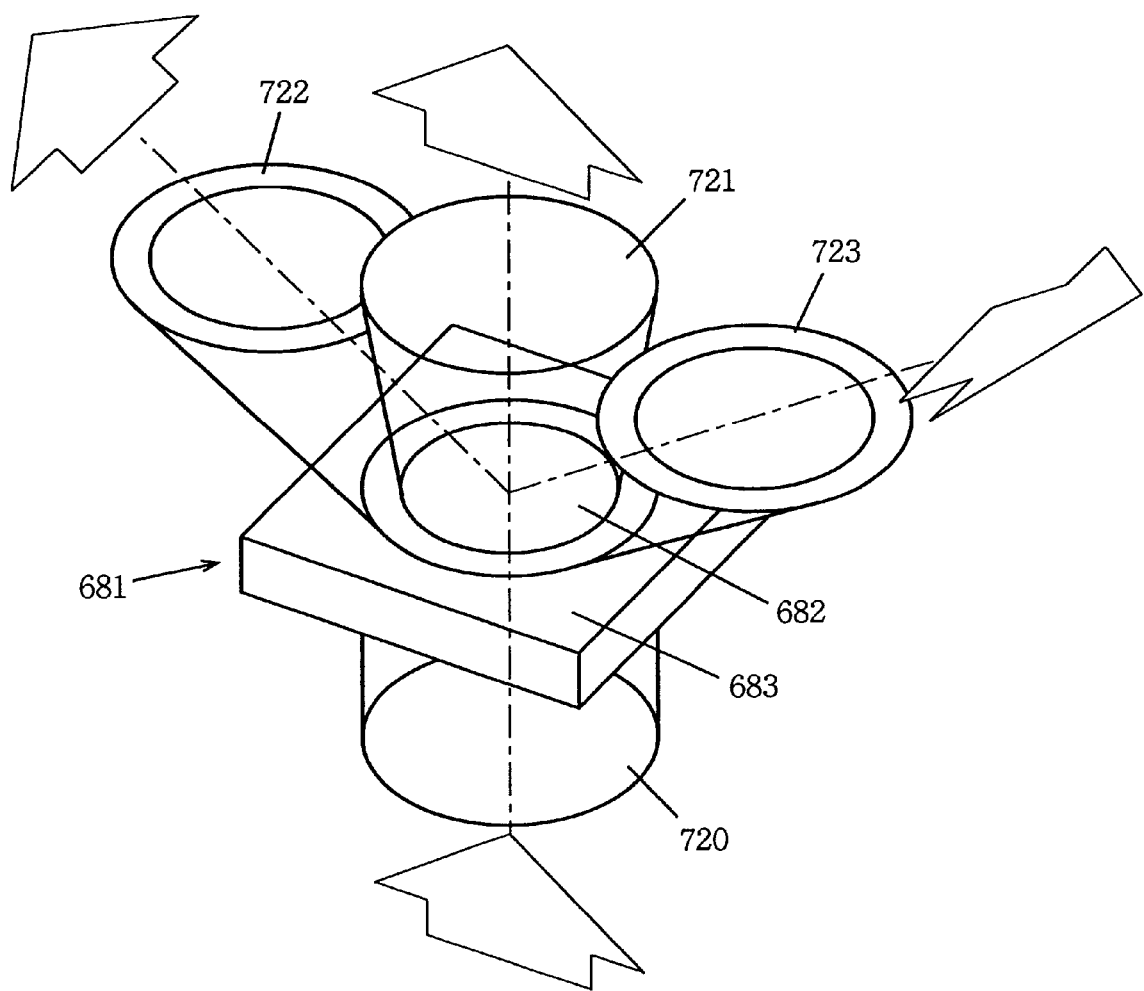
FIG. 72 is a perspective view showing diffraction effect of the hologram aperture element shown in FIGS. 70(a), 70(b) and 71.
Figure 73:
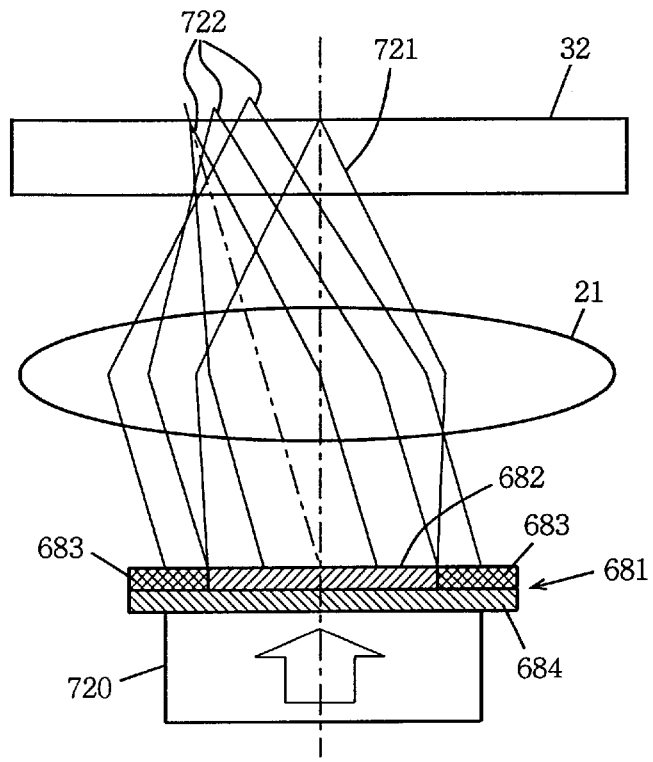
FIG. 73 is a side view illustrating the diffraction effect of the hologram aperture element shown in FIG. 72.

At the central region where hologram 682 is formed, there are annular protrusions 72 formed concentrically, as shown in FIG. 71. In order that hologram 682 has lens effect, the pitch of protrusions 72 is gradually narrowed from the inside to the outside. Further, in order that hologram 682 functions as a lens only for the laser beam having the wavelength of 780 nm, the step of protrusions 72 is set to integer multiple of 635 nm. The recesses and protrusions of diffraction grating 683 are formed at a constant pitch, and therefore diffraction grating 683 has a prescribed grating constant.

The diffraction function of hologram aperture element 681 will be described with reference to FIGS. 72 to 75.

Figure 74:
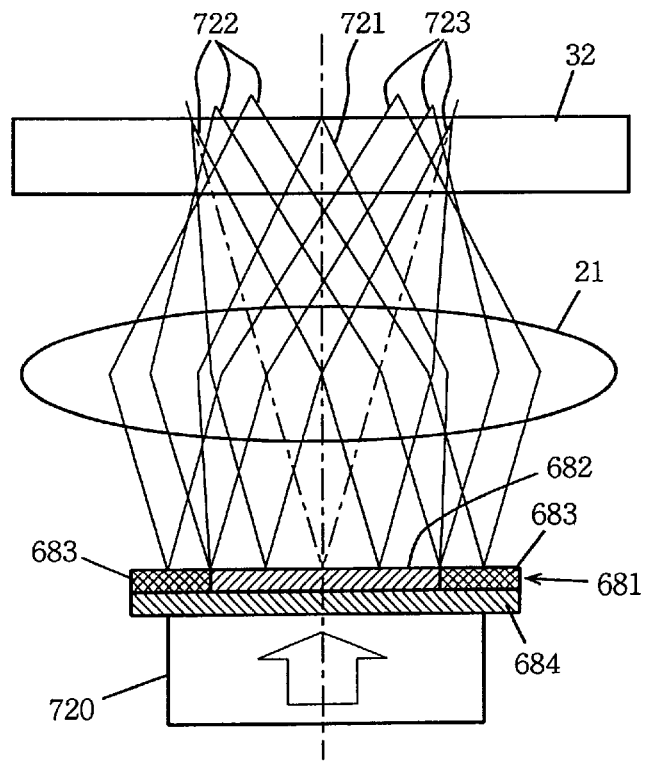
FIG. 74 is another side view illustrating the diffraction effect of the hologram aperture element shown in FIG. 72.
Figure 75:
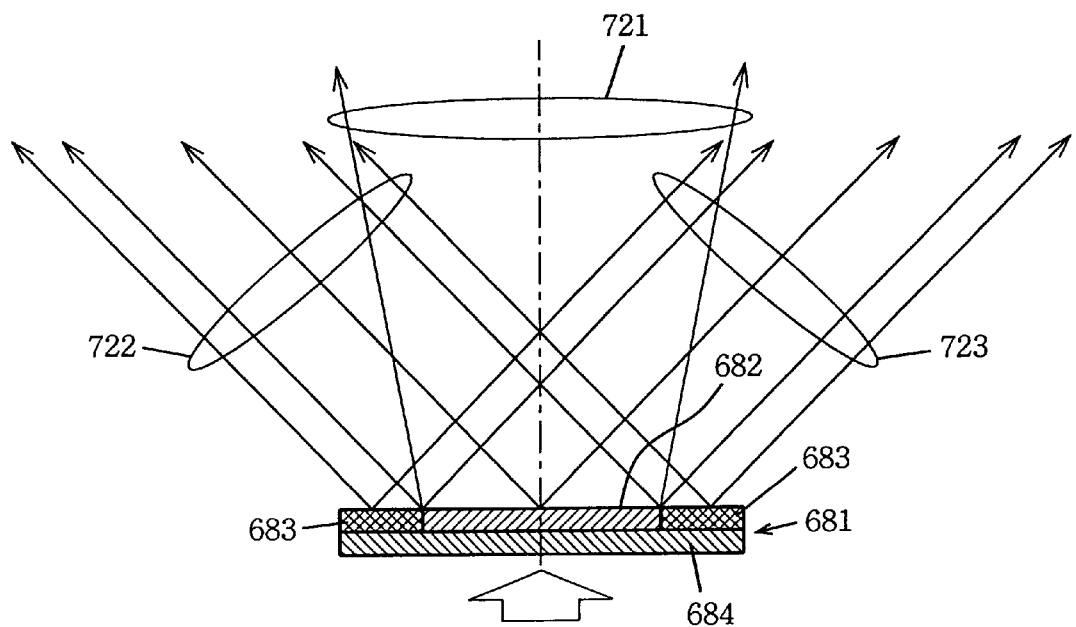
FIG. 75 is a still further side view illustrating the diffraction effect of the hologram aperture element shown in FIGS. 72 to 74.

When parallel laser beam 720 having the wavelength of 780 nm enters hologram aperture element 681, laser beam 721 which is part of the laser beam 720 which has passed through hologram 682 proceeds with its diameter gradually enlarged. Since diameter of laser beam 720 entering hologram aperture element 681 is larger than the diameter of hologram 682, laser beam 720 also enters the diffraction grating 683. Outer peripheral portion of laser beam 720 is significantly diffracted both to the left and right sides, with the part 721 of laser beam being the center. More specifically, referring to FIG. 73, +first order diffracted beam 722 provided by diffraction grating 683 proceeds to the left with respect to laser beam 721. Referring to FIG. 74, −first order refracted beam 723 provided by diffraction grating 683 proceeds to the right with respect to laser beam 721.

When laser beam 720 having the wavelength of 635 nm enters hologram aperture element 681, hologram aperture element 681 does not function at all on laser beam 720 having the wavelength of 635 nm.

Therefore, the incident laser beam 720 is not diffracted but transmitted as it is through hologram aperture element 681.

Hologram aperture element 681 is fixed on actuator 252 for holding objective lens 21, as does polarizing glass 22 shown in FIG. 25. Actuator 252 is coupled to servo mechanism 19. Servo mechanism 19 moves actuator 252 in the direction of the optical axis in response to the focus error signal from photodetector 28, and moves actuator 252 in a direction perpendicular to the track running direction of the optical disc, in response to the tracking error signal from photodetector 28. Since hologram aperture element 681 is fixed on objective lens 21, hologram aperture element moves together with objective lens 21.

When a DVD is reproduced, the laser beam having the wavelength of 635 nm generated by two wavelength semiconductor laser 23 is transmitted through diffraction grating 680 for the three beam method, reflected by half mirror 255 and collimated by collimator lens 254. The collimated laser beam enters hologram aperture element 681. However, hologram aperture element 681 does not function at all on the laser beam having the wavelength of 635 nm. Therefore, the incident laser beam is not diffracted but transmitted directly through hologram aperture element 681 and enters objective lens 21. Therefore, the laser beam having the wavelength of 635 nm is focused on the recording surface of transparent substrate 31 of the DVD.

When a CD is reproduced, the laser beam having the wavelength of 780 nm generated by two wavelength semiconductor laser 23 enters hologram aperture element 681 as laser beam having the wavelength of 635 nm, as shown in FIG. 69. However, hologram aperture element 681 has the above described function on the laser beam having the wavelength of 780 nm. Therefore, outer peripheral portion of the incident laser beam is significantly diffracted outward. As a result, only the central portion of the incident laser beam enters the objective lens 21 with its diameter being gradually enlarged. Therefore, the laser beam having the wavelength of 780 nm is focused on the recording surface of transparent substrate 32 of the CD.

According to Embodiment 31, since hologram 682 and diffraction grating 683 with wavelength selectivity are formed integrally, the size of the optical pickup device is made smaller than those of the above described embodiments. Further, since hologram aperture element 681 is fixed on objective lens 21, the laser beam can be focused accurately on the recording surface even when objective lens 21 moves for focusing and tracking.

[Embodiment 32]

Figure 76A:
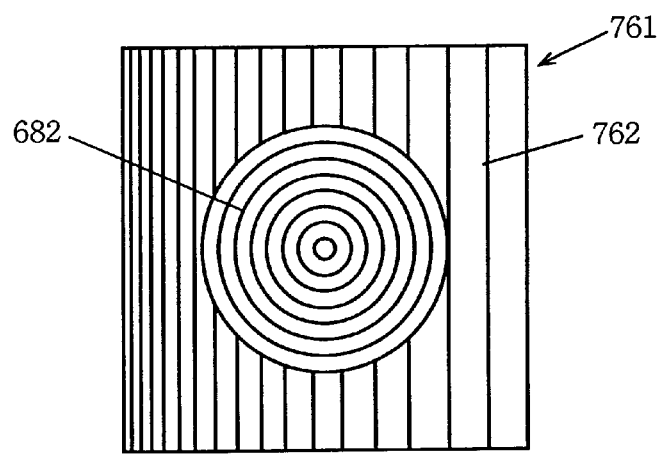
FIG. 76(a) is a front view showing another hologram aperture element used in the optical pickup device in accordance with Embodiment 32 of the present invention.
Figure 76B:
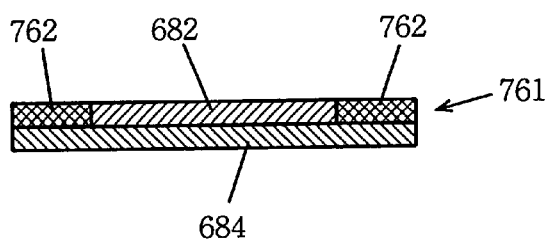
FIG. 76(b) is a side view of the hologram aperture element shown in FIG. 76(a).
Figure 77:
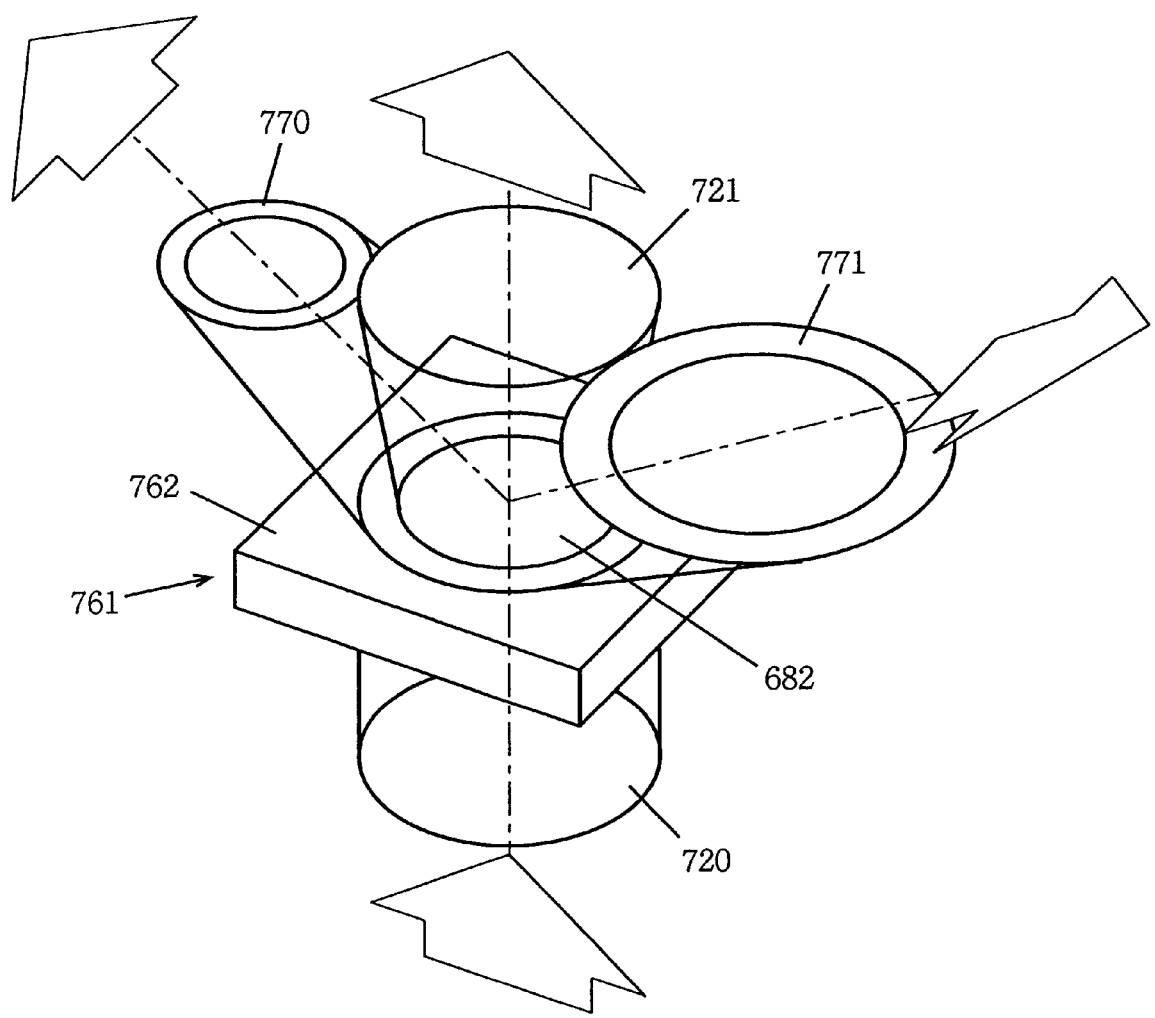
FIG. 77 is a perspective view illustrating the diffraction effect of the hologram aperture element shown in FIGS. 76(a) and (76b).
Figure 78:
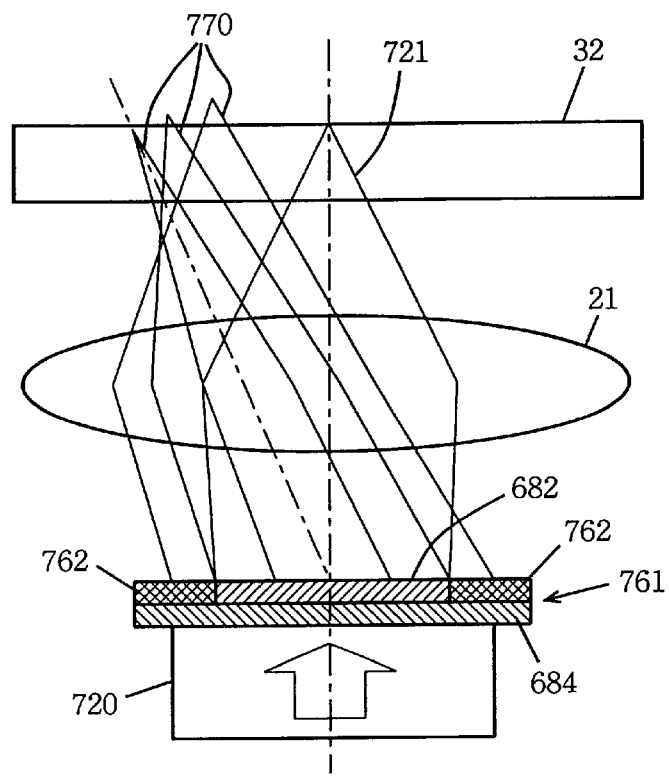
FIG. 78 is a side view illustrating the diffraction effect of the hologram aperture element shown in FIG. 77.
Figure 79:
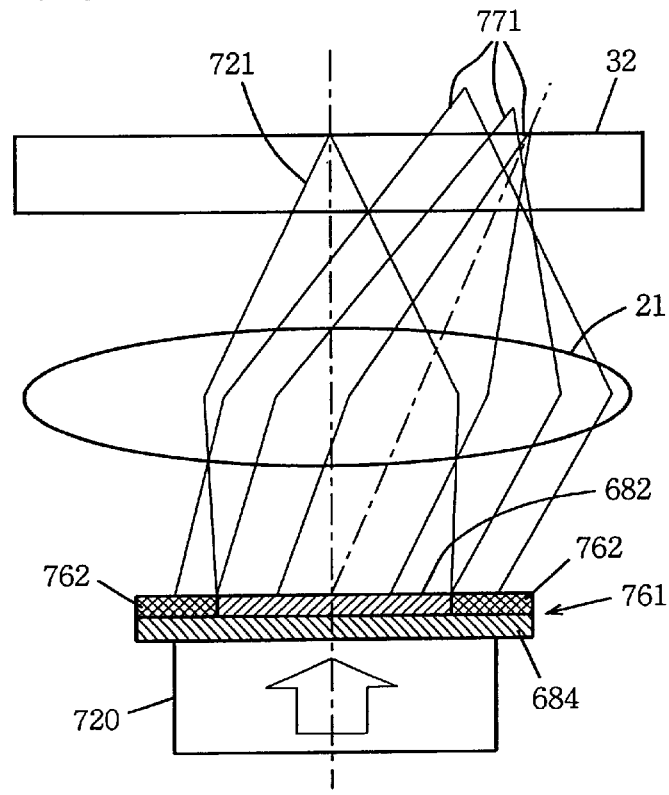
FIG. 79 is another side view illustrating the diffraction effect of the hologram aperture element shown in FIG. 77.
Figure 80:
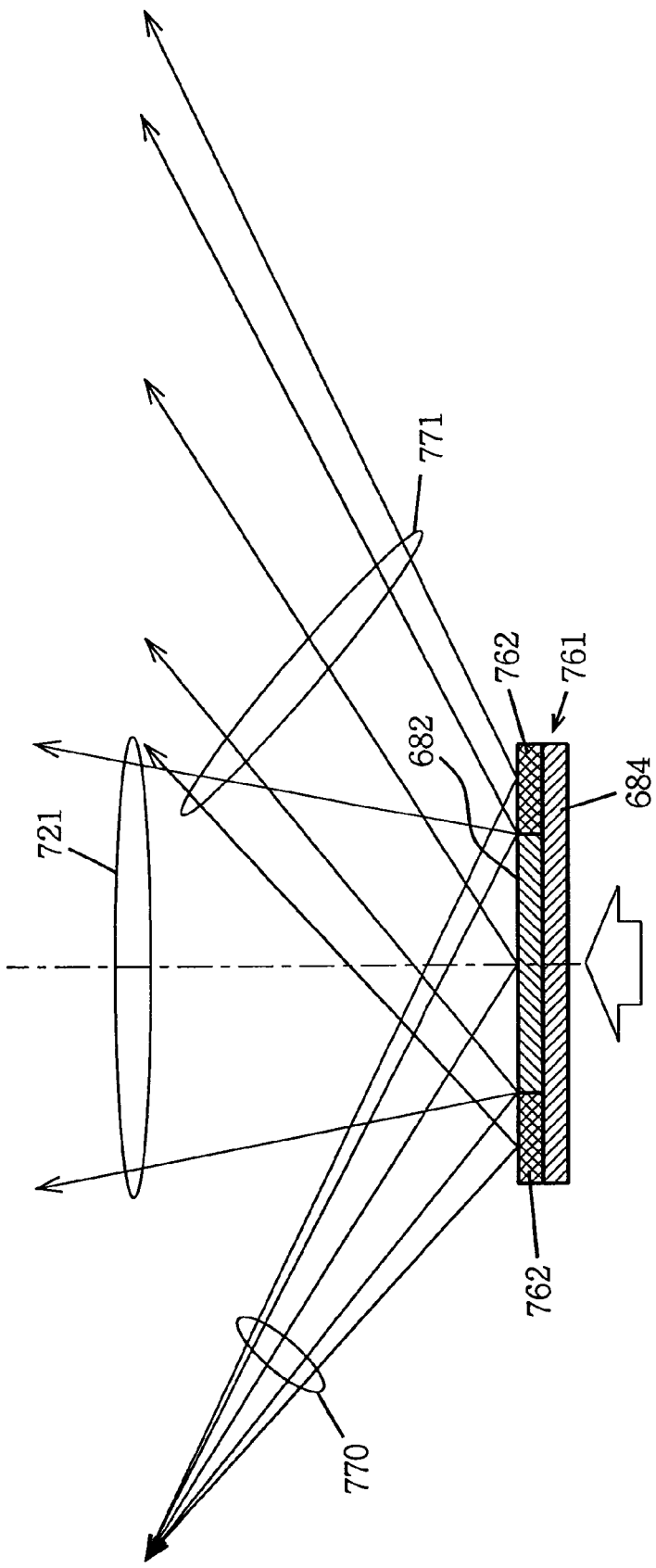
FIG. 80 is still another side view illustrating the diffraction effect of the hologram aperture element shown in FIG. 77.

In Embodiment 31 above, diffraction grating 683 of hologram aperture element 681 has a prescribed grating constant. However, in Embodiment 32, as shown in FIGS. 76(a) and (b), a diffraction grating 762 with wavelength selectivity of a hologram aperture element 761 has uneven grating constant. More specifically, the pitch of recesses and protrusions of diffraction grating 762 is made gradually narrower from the right to the left of the figure.

The diffraction function of hologram aperture element 761 will be described with reference to FIGS. 77 to 80.

When laser beam 720 having the wavelength of 780 nm enters hologram aperture element 761, the central portion of laser beam 720 entering hologram 682 would be laser beam 721 of which diameter is gradually enlarged, as described above. The outer peripheral portion of laser beam 720 entering diffraction grating 762 with wavelength selectivity is significantly diffracted to the left and to the right with the laser beam 721 being the center. However, different from hologram aperture element 681 in accordance with Embodiment 31 above, the +first order diffracted beam 770 on the left side proceeds with its diameter gradually reduced, while −first order diffracted beam 721 on the right side precedes with its diameter gradually enlarged.

In Embodiment 31 described above, the grating constant of diffraction grating 683 with wavelength selectivity is constant. Therefore, both +first order diffracted beam 722 and −first order diffracted beam 723 are incident on the optical disc in symmetry, through objective lens 21, and therefore it is possible that the beams reflected from the optical disc return through the same path as the going path to hologram aperture element 681. However, according to Embodiment 32, since diffraction grating 762 with wavelength selectivity has uneven grating constant, the reflected beams derived from +first order diffracted beam 770 and −first order diffractive beam 771 do not return to hologram aperture element 761 through the same path as the going path. Accordingly, noise caused by diffracted beams 770 and 771 can be reduced.

[Embodiment 33]

Figure 81:
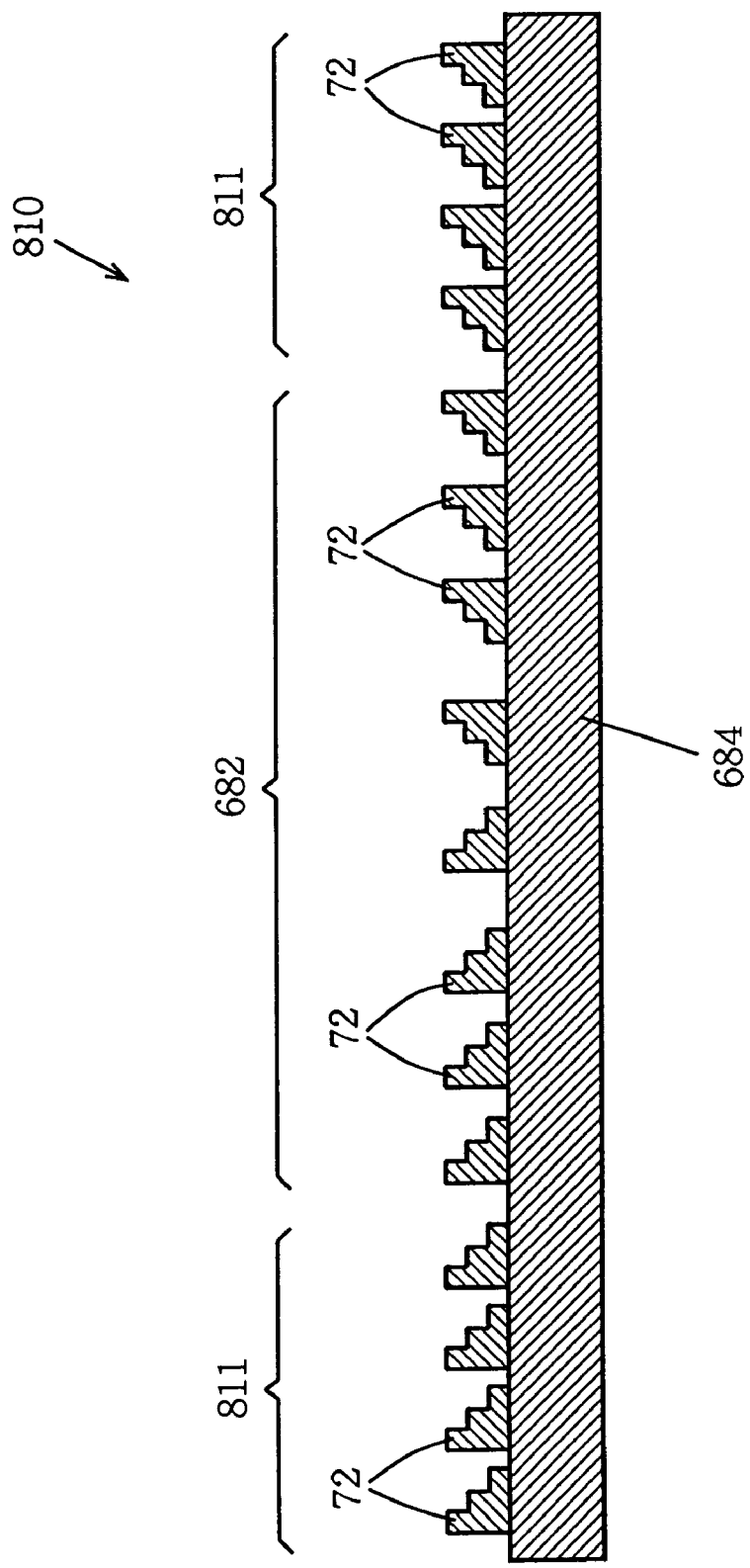
FIG. 81 is a cross section showing a still another hologram aperture element used in the optical pickup device in accordance with Embodiment 33 of the present invention.

Diffraction gratings 683 and 762 with wavelength selectivity are formed outside hologram 682 in Embodiments 31 and 32 described above. Alternatively, a hologram 811 may be formed on the outside of hologram 682, as shown in FIG. 81. Though protrusions 72 of the outer hologram 811 are formed concentrically as protrusion 72 of inner hologram 682, the protrusions of the outer hologram are formed with a constant pitch, different from the protrusions 72 of the inner hologram 682.

As shown in FIG. 71, when diffraction grating 683 with wavelength selectivity is formed outside hologram 682, the beam diffracted by diffraction grating 683 goes not only to the outside of objective lens 21 but =also to the center. Therefore, it is possible that the laser beam entering the center of objective lens 21 causes noise.

By contrast, according to Embodiment 33 shown in FIG. 81, since hologram 811 is formed additionally on the outside of hologram 682, the beam diffracted by hologram 811 goes only to the outside of objective lens 21, and therefore noise caused by the diffracted beam can be reduced.

Further, in the above described embodiments, it is possible that the beam diffracted by diffraction grating with wavelength selectivity may enter the objective lens, since the hologram aperture element is close to the objective lens. Therefore, the hologram aperture element may be arranged apart from the objective lens so that the beam diffracted by the diffraction grating with wavelength selectivity does not enter the objective lens.

[Embodiment 34]

Figure 82:
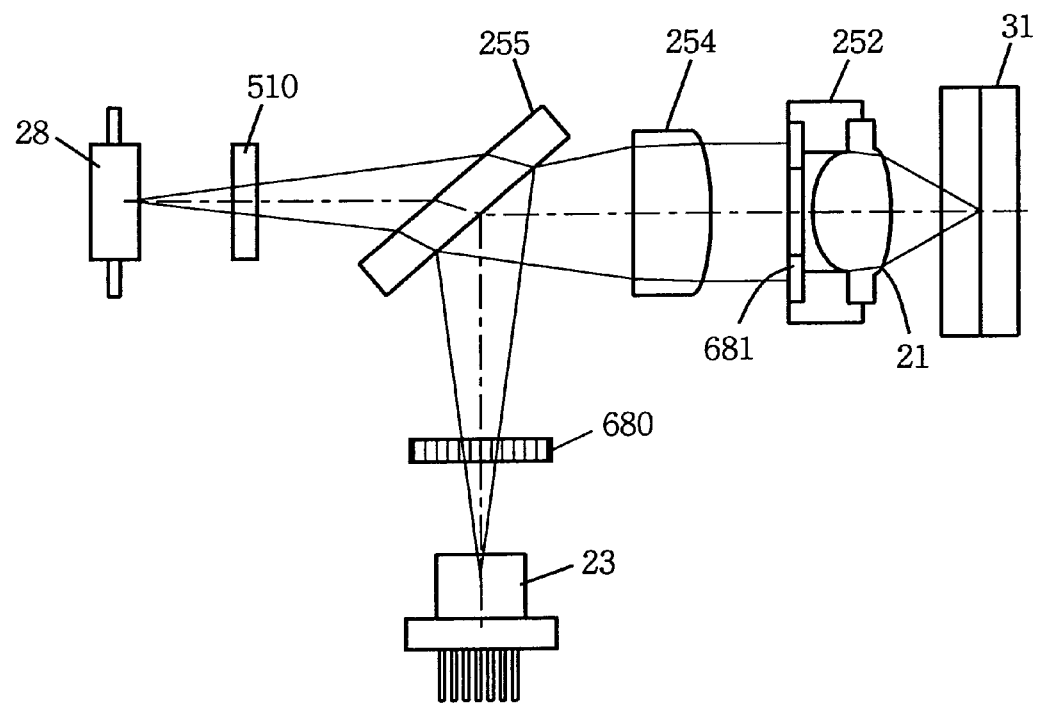
FIG. 82 shows arrangement of the optical system of the optical pickup device in accordance with Embodiment 34 of the present invention, together with operation at the time of DVD reproduction.
Figure 83:
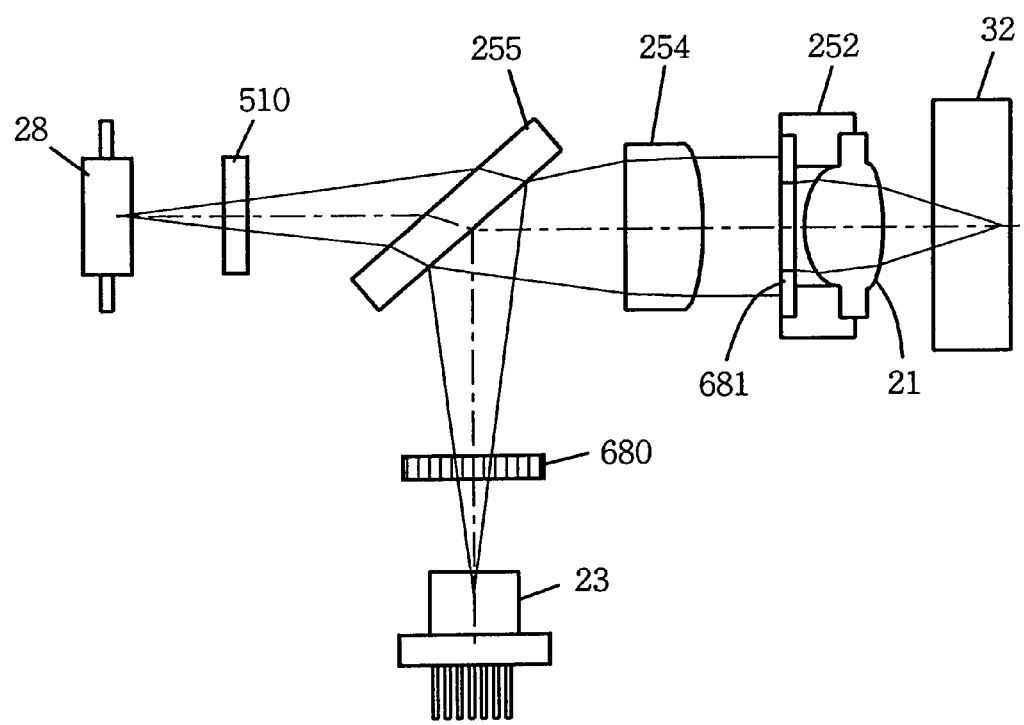
FIG. 83 is a block diagram showing the optical system of the optical pickup device shown in FIG. 82 together with operation at the time of CD reproduction.

As in Embodiment 24 described shown in FIG. 51, in order to allow adjustment of the position of focusing of the laser beam on photodetector 23, hologram plate 510 with wavelength selectivity may further be provided as shown in FIGS. 82 and 83.

[Embodiment 35]

Figure 84:
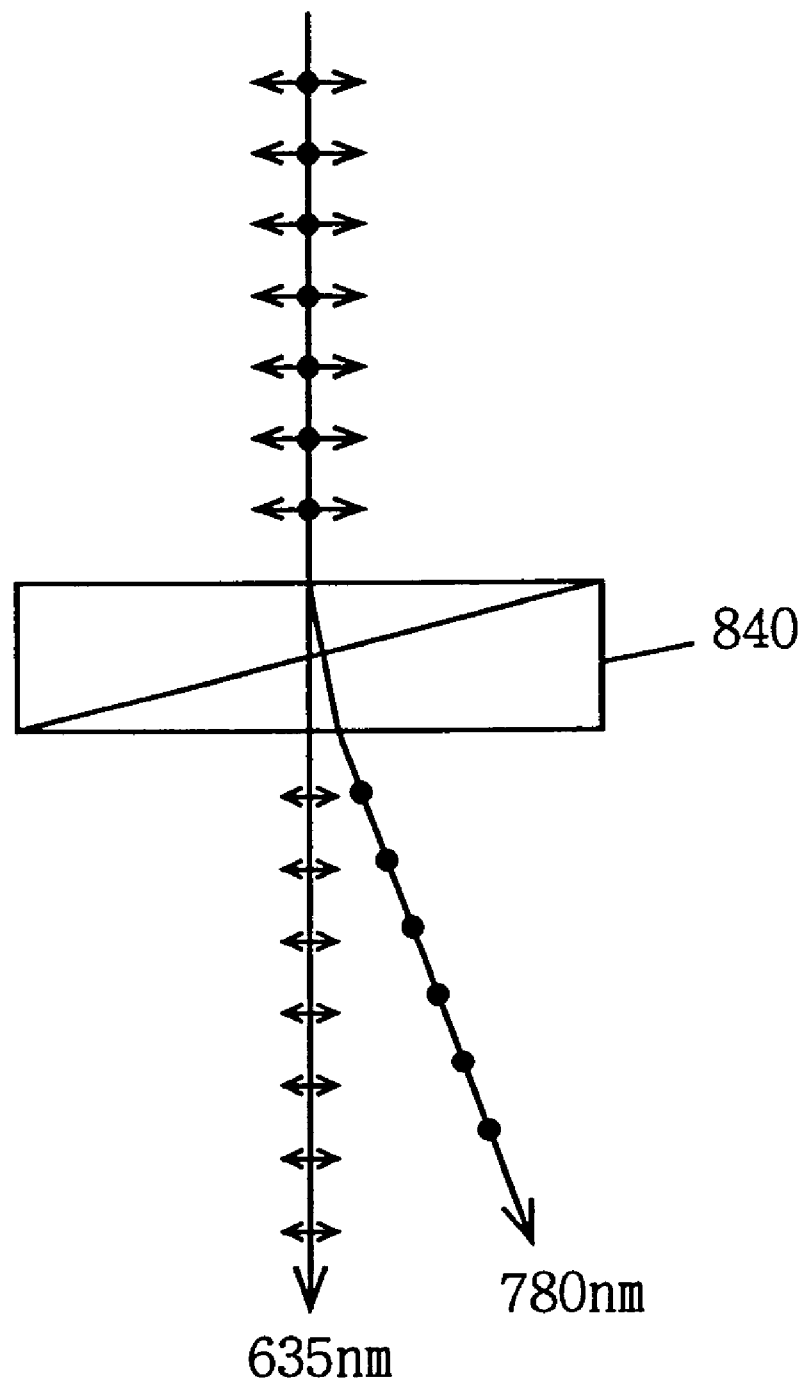
FIG. 84 is an illustration showing the diffraction effect of Wollaston polarizing prism used as an optical element with waveform selectivity in the optical pickup device in accordance with Embodiment 35 of the present invention.

In place of the hologram and diffraction grating with polarization selectivity and with wavelength selectivity, a Wollaston polarizing prism 840 which does not diffract but transmits the laser beam having the wavelength of 635 nm and diffracts and transmits the laser beam having the wavelength of 780 nm may be used, as shown in FIG. 84.

[Embodiment 36]

In Embodiment 3 shown in FIG. 11, the laser beam having the wavelength of 780 nm only is diffracted outward. In other words, hologram 25 moves forward only the light source 850 for the wavelength of 780 nm. Therefore, virtual light source 851 of the beam having the wavelength of 780 nm is closer to hologram 25 than a light source 852 for the beam having the wavelength of 635 nm.

Figure 86:
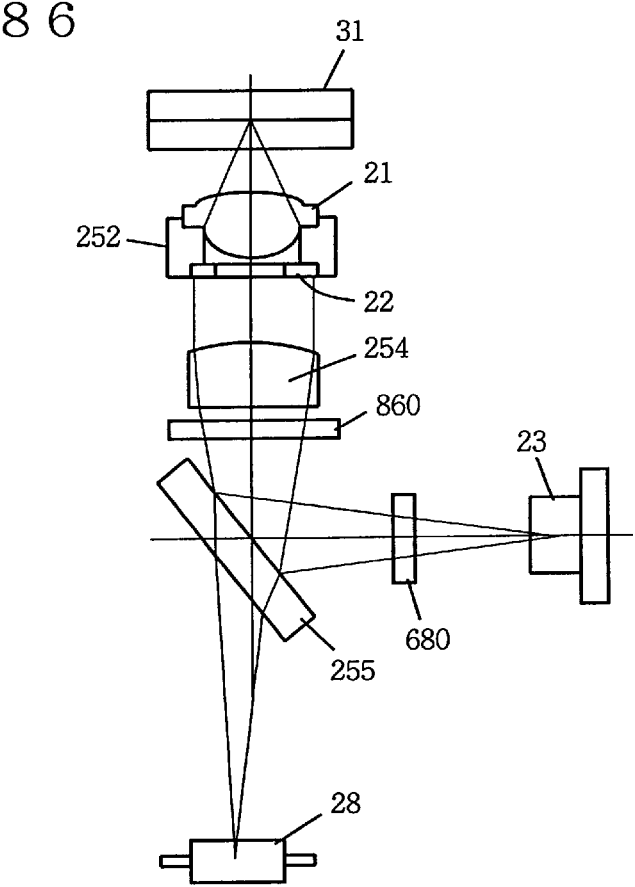
FIG. 86 shows an arrangement of the optical system of the optical pickup device in accordance with Embodiment 36 of the present invention.

In place of hologram 25, in Embodiment 36 shown in FIG. 86, a hologram 860 which diffracts only the laser beam having the wavelength of 635 nm inward is used.

Figure 85:
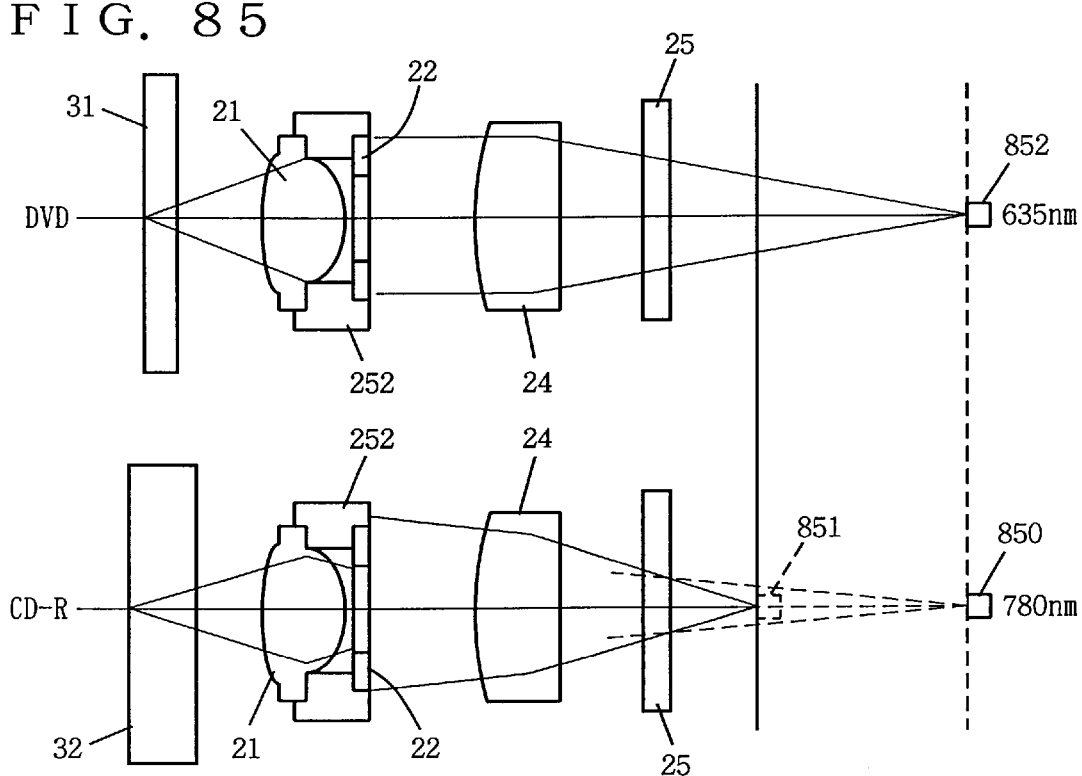
FIG. 85 is an illustration showing position of a light source in the optical pickup device shown in FIG. 11.
Figure 87:
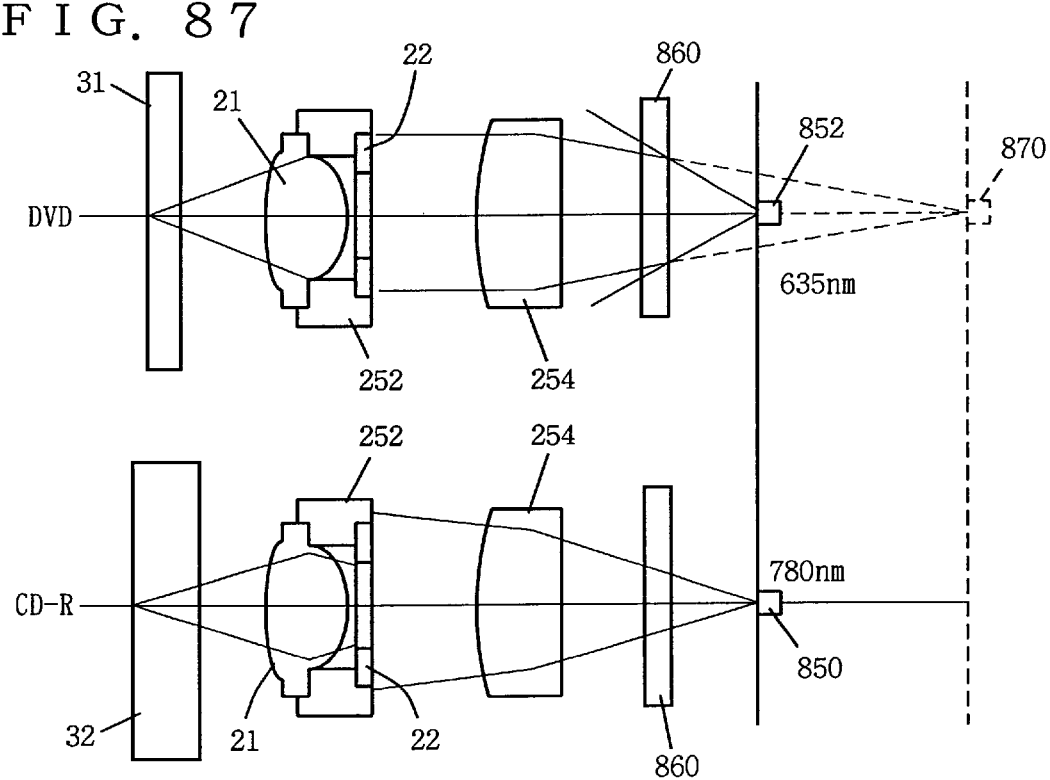
FIG. 87 is an illustration showing the position of the light source in the optical pickup device shown in FIG. 86.
Figure 88:
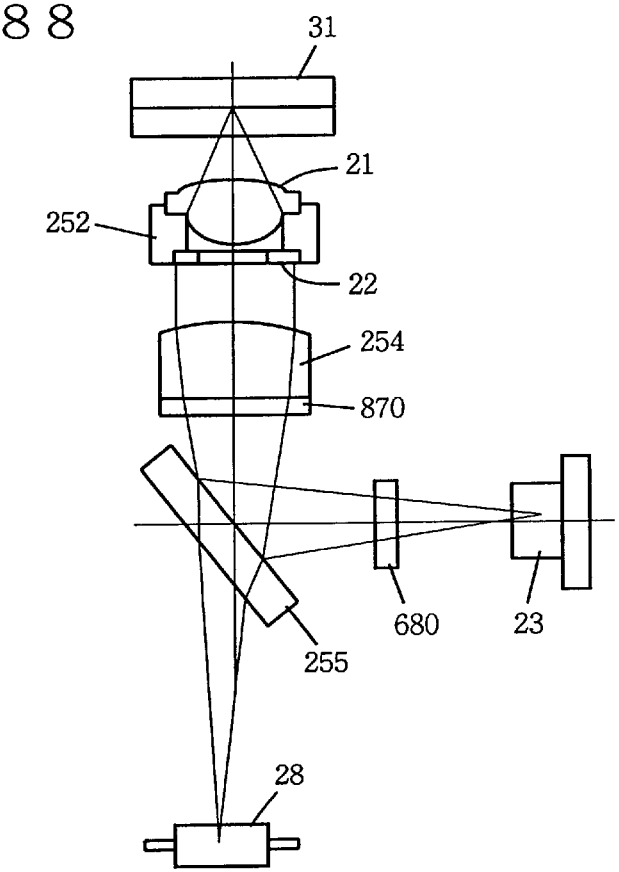
FIG. 88 shows an arrangement of the optical system in the optical pickup device in accordance with Embodiment 37 of the present invention.

Referring to FIG. 87, hologram 860 does not diffract but transmits the laser beam having the wavelength of 780 nm, and it diffracts and transmits the laser beam having the wavelength of 635 nm. In other words, hologram 860 moves backward only the light source 852 for the beam having the wavelength of 635 nm virtually. Therefore, virtual light source 870 for the beam having the wavelength of 635 nm is away from hologram 860 than light source 850 for the beam having the wavelength of 780 nm. Substantially the same optical system as that shown in FIG. 85 can be realized by using such hologram 860.

According to Embodiment 36 described above, since hologram 860 which diffracts only the laser beam having the wavelength of 635 nm inward is used, the distance between two wavelength semiconductor laser and hologram 860 can be made shorter than the above described embodiments. As a result, the size of the optical pickup device can be reduced in accordance with the thirty-sixth embodiment.

[Embodiment 37]

In Embodiment 36 described above, hologram 860 which diffracts only the laser beam having the wavelength of 635 nm inward is provided immediately preceding collimator lens 254. However, as in Embodiment 1 shown in FIG. 3, a hologram 870 which diffracts only the laser beam having the wavelength of 635 nm inward may be formed on a surface of collimator lens 254.

[Embodiment 38]

As described above, a single beam method is used for reproducing a DVD, and the three beam method is used for reproducing a CD. Generally, in order to divide one laser beam into three, a diffraction grating is used. The diffraction grating has only to function only on the laser beam having the wavelength of 635 nm which is used for reproducing the DVD.

Figure 89:
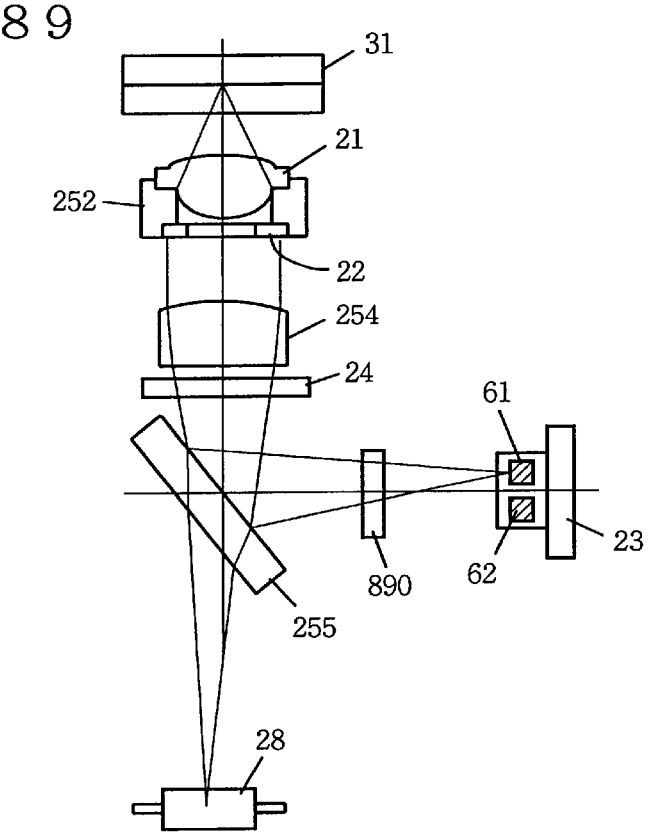
FIG. 89 shows an arrangement of the optical system of the optical pickup device in accordance with Embodiment 38 of the present invention, together with operation at the time of DVD reproduction.
Figure 90:
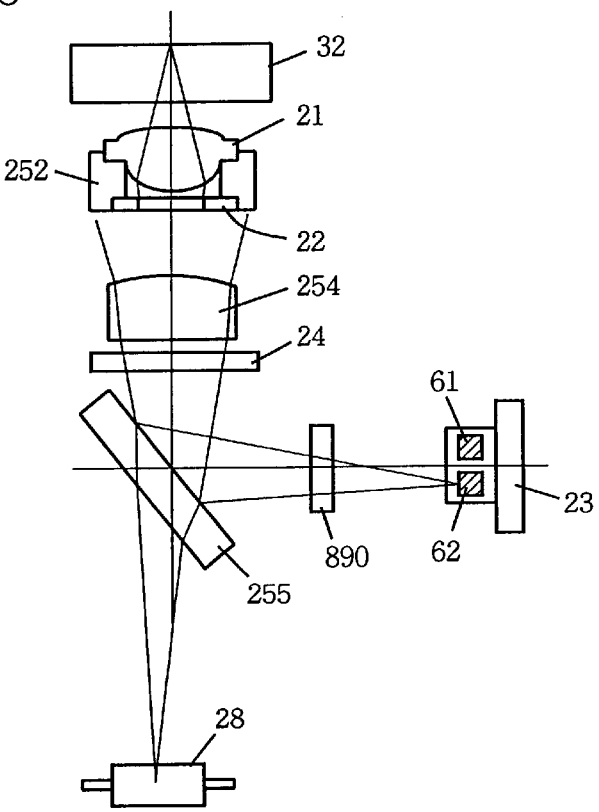
FIG. 90 shows an arrangement of the optical system of the optical pickup device shown in FIG. 89 together with operation at the time of CD reproduction.
Figure 91:
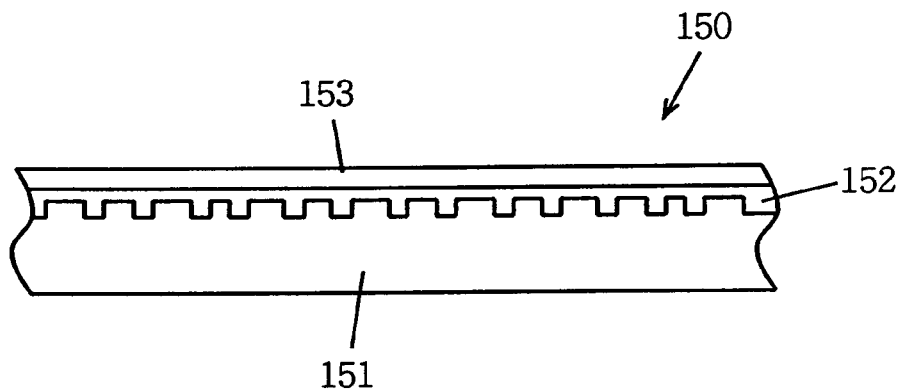
FIG. 91 is a side view showing a partial structure of a CD-R.
Figure 92:
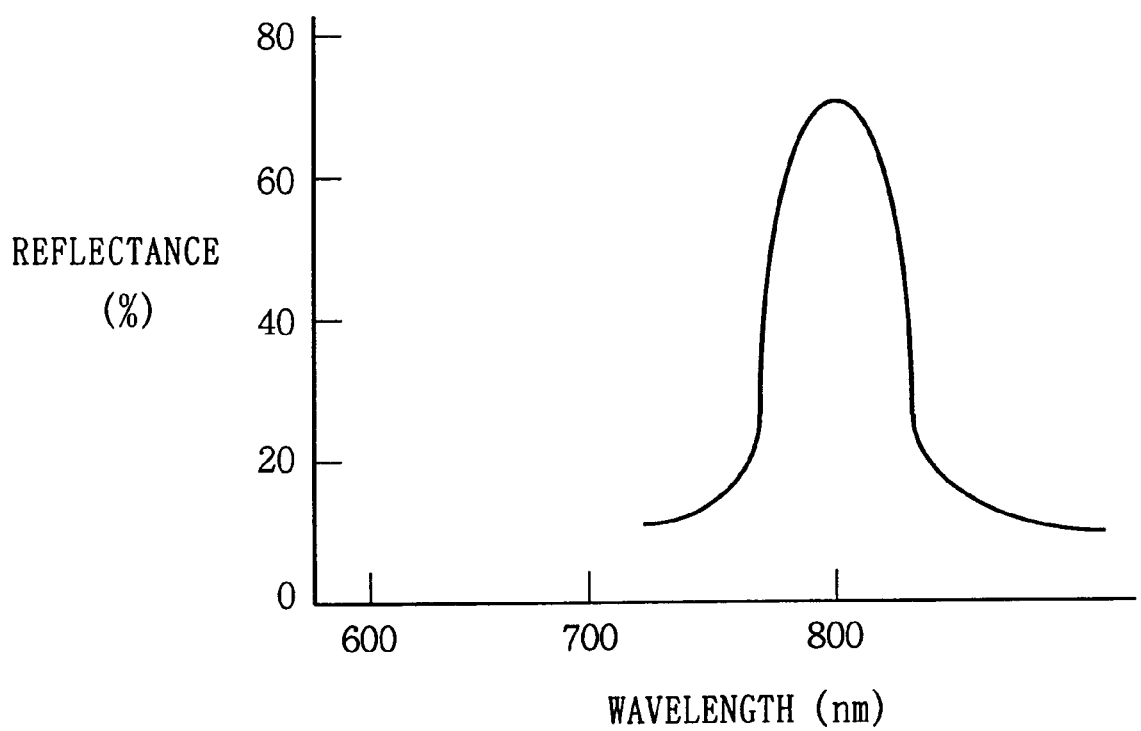
FIG. 92 shows relation between laser beam wavelength and reflectance of the CD-R shown in FIG. 91.

Therefore, as shown in FIGS. 89 and 90, a diffraction grating 890 with wavelength selectivity which divides the laser beam having the wavelength of 635 nm into three by diffraction, and which does not diffract but transmits as it is the laser beam having the wavelength of 780 nm may be provided. Diffraction grating 890 with wavelength selectivity is formed in the similar manner as diffraction grating 130 with wavelength selectivity described above.

As shown in FIG. 89, when a DVD is reproduced, laser element 61 generates the laser beam having the wavelength of 635 nm, and the generated laser beam is not divided but transmitted as it is through diffraction grating 890 with wavelength selectivity.

Referring to FIG. 90, when a CD is reproduced, laser element 62 generates the laser beam having the wavelength of 780 nm, and the generated laser beam is divided into three by diffraction grating 890 with wavelength selectivity and transmitted.

According to Embodiment 38, since diffraction grating 890 with wavelength selectivity dividing only the laser beam having the wavelength of 780 nm into three is provided, noise caused by undesirable diffracted beam can be reduced when a DVD is reproduced.

It is understood that various improvements, modifications and variations are possible within the scope of the present invention, for example, laser beam having the wavelength of 650 (tolerance ±20)nm may be used in place of the laser beam having the wavelength of 635 nm, and the wavelength of the laser beam is not specifically limited.

What is claimed is:

1. An optical pickup device for recording and/or reproducing a first optical disc having a transparent substrate (31) of a first thickness and a second optical disc having a transparent substrate (32) of a second thickness different from said first thickness, comprising an objective lens (21) provided opposing to said first or second optical disc, a numerical aperature changing element (22, 100, 120, 130, 180, 186, 210, 215, 683, 762, 811) for changing numerical aperature of said objective lens (21) in accordance with the thickness of the transparent substrate (31, 32) of said first or second optical disc, a laser beam generator (23, 410) for selectively generating a first laser beam having a first wavelength and a second laser beam having a second wavelength different from said first wavelength, an optical system (25,263,271,300,340,350,682) for guiding said first laserbeam to a first direction, said second laser beam to a second direction different from said first direction, and guiding said first or second laser beam to said objective lens, and wherein said optical system includes a bifocal collimator lens (271, 300, 340, 350) having two focal points.

2. The optical pickup device according to claim 1, wherein said optical system includes a hologram (25, 263, 682, 860, 870) which does not diffract said first laser beam and diffracts said second laser beam.

3. The optical pickup device according to claim 2, wherein said optical system further includes a collimator lens (24, 254, 271, 300, 340, 350) receiving said first or second laser beam from said laser beam generator (23, 410) and guiding the received laser beam to said objective lens.

4. The optical pickup device according to claim 3, wherein said hologram (25, 870) is provided on a surface of said collimator lens (24, 254).

5. The optical pickup device according to claim 2, further comprising a diffraction grating plate (251) having a main surface on which a diffraction grating (261) for three beam method for dividing said first or second laser beam into three is formed, wherein said hologram (263) is provided on a surface opposite to said main surface of said diffraction grating plate (251).

6. The optical pickup device according to claim 2, wherein said laser beam generator means (410) includes a semiconductor laser (23) including a substrate (60), a first laser element (61) provided on said substrate (60) for generating said first laser beam, and a second laser element (62) provided on said substrate (60) adjacent to said first laser element (61) for generating said second laser beam, and an activating circuit (17) for s electively activating said first and second laser elements, said pickup device further comprising a photodetector (411) provided apart from said first and second laser elements (61, 62) on said substrate (60) of said semiconductor laser (23), for detecting, of beams reflected from said first or second optical disc, a beam diffracted by said hologram (25, 263, 682, 860, 870).

7. The optical pickup device according to claim 1, further comprising a diffraction grating plate (890) having a main surface on which a diffraction grating for three beam method for not diffracting said first laser beam and diffracting said second laser beam to divide said first and second laser beam into three is formed.

8. The optical pickup device according to claim 1, wherein said bifocal collimator lens includes a first lens (272, 341), a second lens (273, 342) provided opposing to said first lens (272, 341), and a member (274, 305) sandwiched between said first and second lenses (272, 273, 341, 342) and having refractive index changing in accordance with said first or second wavelength.

9. The optical pickup device according to claim 8, wherein said member (274) is a cyanine dye.

10. The optical pickup device according to claim 8, wherein said member includes a first transparent electrode (303, 351), a second transparent electrode (304, 352) provided opposing to said first transparent electrode (303, 351) and liquid crystal (305) sandwiched between said first and second transparent electrodes (303, 304, 351, 352), said optical pickup device further comprising an application circuit (306) for applying a prescribed voltage between said first and second transparent electrodes (303, 304) in accordance with said first or second wavelength.

11. The optical pickup device according to claim 10, wherein said first and second transparent electrodes (351, 352) are formed as stripes.

12. The optical pickup device according to claim 10, further comprising a photodetector (28) for detecting a beam reflected from said first or second optical disc, and a beam splitter (255) receiving said first or second laser beam from said laser beam generator (23) and said reflected beam, for guiding part of the received laser beam to said objective lens (21) and for guiding part of the received reflected beam to said photodetector (28), wherein said application circuit includes an optical filter (381) receiving remaining part of the laser beam received by said beam splitter, and selectively transmitting either said first or second laser beam, an energy converter (382) for converting optical energy of the laser beam transmitted through said optical filter (381) to electrical energy, and driving means (306) for driving said liquid crystal based on said electric energy from said converting means.

13. The optical pickup device according to claim 1, wherein said laser beam generator includes a semiconductor laser (23) including a substrate (60), a first laser element (61) provided on said substrate (60) for generating said first laser beam, and a second laser element (62) provided on said substrate (60) for generating said second laser beam, and an activating circuit (17) for selectively activating said first and second laser elements.

14. The optical pickup device according to claim 1, wherein said first optical disc is a digital video disc and said second optical disc is a compact disc.

15. The optical pickup device according to claim 14, wherein said first wavelength is 620 to 670 nm and said second wavelength is 765 to 795 nm.

16. The optical pickup device according to claim 15, wherein said first wavelength is 625 to 645 nm.

17. The optical pickup device according to claim 1, wherein said numerical aperture changing element is a polarizing glass (22) having an annular polarizing region.

18. The optical pickup device according to claim 1, wherein said numerical aperture changing element is a diffraction grating (110) with polarization selectivity having an annular polarizing region of which center is an optical axis of said objective lens.

19. The optical pickup device according to claim 1, wherein said numerical aperture changing means is a polarizing filter (120) having an annular polarizing region of which center is an optical axis of said objective lens.

20. The optical pickup device according to claim 1, wherein said numerical aperture changing element is a diffraction grating (130, 180) with wavelengths electivity having an annular wavelength selecting region of which center is an optical axis of said objective lens.

21. The optical pickup device according to claim 1, wherein said diffraction grating (180) with wavelength selectivity includes
a diffraction grating plate (181) having a main surface on which diffraction grating (182) is formed, and
a film (183) formed on said main surface of said diffraction grating plate (181) and having refractive index changing in accordance with said first or second wavelength.

22. The optical pickup device according to claim 21, wherein said film (183) is a cyanine dye.

23. The optical pickup device according to claim 1, wherein magnification of said objective lens (21) is 0.025 to 0.095.

24. The optical pickup device according to claim 23, wherein magnification of said objective lens (21) is 0.025 to 0.065.

25. The optical pickup device according to claim 1, wherein said laser beam generator includes
a semiconductor laser (23) including a first laser element (61) for generating said first laser beam, and a second laser element (62) provided apart from said first laser element (61) and for generating said second laser beam, and
an activating circuit (17) for selectively activating said first and second laser elements,
said optical means includes a collimator lens (254) receiving said first or second laser beam from said laser beam generating means and guiding the received laser beam to said objective lens (21),
said optical pickup device further comprising
a photodetector (411, 590) for detecting beam reflected from said first or second optical disc, and
a hologram (25) provided between said collimator lens (254) and said photodetector (411, 590), which does not diffract said first laser beam and diffracts said second laser beam.

26. The optical pickup device according to claim 25, wherein said hologram (25) has polarization selectivity.

27. The optical pickup device according to claim 25, wherein said hologram (25) has wavelength selectivity.

28. The optical pickup device according to claim 25, wherein said photodetector (590) includes
a first light receiving portion (591) receiving a beam reflected from said first optical disc, and
a second light receiving portion (592) provided apart from said first light receiving portion (591) in a first direction, and receiving a beam reflected from said second optical disc,
said second light receiving portion (592) including
a first sensor (592A1) extending in said first direction,
a second sensor (592A2) provided apart from said first sensor (592A1) in a second direction perpendicular to said first direction, and
a third sensor (592A3) provided apart from said first sensor (592A1) in a third direction opposite to said second direction.

29. The optical pickup device according to claim 1, wherein said optical means and said numerical aperture changing means constitute a single optical element (681, 761).

30. The optical pickup device according to claim 29, wherein said optical means is a hologram (682) which does not diffract said first laser beam and diffracts said second laser beam, formed as circles of which center is an optical axis of said objective lens (21), and
said numerical aperture changing means is a diffraction grating (683, 762) which does not diffract said first laser beam and diffracts said second laser beam, formed around said hologram (682).

31. The optical pickup device according to claim 30, wherein said diffraction grating (762) has uneven grating constant.

32. The optical pickup device according to claim 29 further comprising
a servo mechanism (19) for moving said objective lens (21), wherein
said optical element (681, 761) is fixed to said objective lens (21).

33. A diffraction grating with wavelength selectivity, comprising
a diffraction grating plate (181) having a main surface on which a diffraction grating (182) is formed, and
a film (183) formed on said main surface of said diffraction grating plate (181) and having refractive index changing in accordance with wavelength of an incident beam.

34. The diffraction grating with wavelength selectivity according to claim 33, wherein said film (183) is a cyanine dye.

* * * * *